(12) United States Patent
Miyashita

(10) Patent No.: US 8,220,168 B2
(45) Date of Patent: Jul. 17, 2012

(54) SPECTACLE LENS FRAME SHAPE MEASURING APPARATUS

(75) Inventor: Kenji Miyashita, Itabashi-ku (JP)

(73) Assignee: Kabushiki Kaisha TOPCON, Itabashi-ku, Tokyo (JP)

( * ) Notice: Subject to any disclaimer, the term of this patent is extended or adjusted under 35 U.S.C. 154(b) by 329 days.

(21) Appl. No.: 12/561,011

(22) Filed: Sep. 16, 2009

(65) Prior Publication Data

US 2010/0064533 A1    Mar. 18, 2010

(30) Foreign Application Priority Data

Sep. 16, 2008 (JP) ................. 2008-235915

(51) Int. Cl.
*G01B 5/20* (2006.01)
*G01B 21/20* (2006.01)

(52) U.S. Cl. .......................... 33/200; 33/507
(58) Field of Classification Search ............. 33/28, 200, 33/507; 356/127
See application file for complete search history.

(56) References Cited

U.S. PATENT DOCUMENTS

| | | | |
|---|---|---|---|
| 5,097,600 A | 3/1992 | Brule et al. | |
| 5,228,242 A | 7/1993 | Matsuyama | |
| 5,594,992 A * | 1/1997 | Suzuki et al. | 33/200 |
| 6,163,967 A | 12/2000 | Suzuki et al. | |
| 6,728,656 B2 * | 4/2004 | Suzuki | 702/168 |
| 7,681,321 B2 * | 3/2010 | Shibata | 33/200 |
| 2009/0064512 A1 * | 3/2009 | Matsuyama | 33/28 |
| 2011/0085132 A1 * | 4/2011 | Dubois et al. | 351/177 |

FOREIGN PATENT DOCUMENTS

| | | |
|---|---|---|
| EP | 0 639 754 | 2/1995 |
| JP | 2-214810 A | 8/1990 |
| JP | 4-093163 A | 3/1992 |
| JP | 06-241772 | 9/1994 |
| JP | 8-294855 A | 11/1996 |
| JP | 10-328992 A | 12/1998 |
| WO | WO 2008/097564 A1 | 8/2008 |

OTHER PUBLICATIONS

Office Action dated Jun. 27, 2011, issued in the corresponding Korean Patent Application No. 10-2009-0087586.

* cited by examiner

*Primary Examiner* — Richard A. Smith
(74) *Attorney, Agent, or Firm* — Buchanan Ingersoll & Rooney PC

(57) ABSTRACT

A spectacle lens frame shape measuring apparatus includes a holding device including upper pins and lower pins respectively holding upper rims and lower rims of frames for a spectacle lens, the upper pins holding the frames at different positions in a right-left direction from the positions at which the lower pins hold the frames and being placed at a same height as the lower pins in a vertical direction, a probe brought into contact with lens fitting grooves of the frames held by the holding device, a swinging mechanism swinging the holding device around a predetermined virtual axis, and a calculation controller calculating an axial shift amount or angle of the frames held by the holding device on the basis of a carved angle of the frames and an inclination angle of any one of the upper and lower rims, and correcting a shape of the frames obtained by the probe in accordance with the calculated axial shift amount or angle.

6 Claims, 42 Drawing Sheets

Z DIRECTION DIFFERENCE-CURVE VALUE RELATIONSHIP $y = 3.3695 \Delta L + 0.0809$ (SPECTACLE FRAME NOT HELD)

(SPECTACLE FRAME HELD)

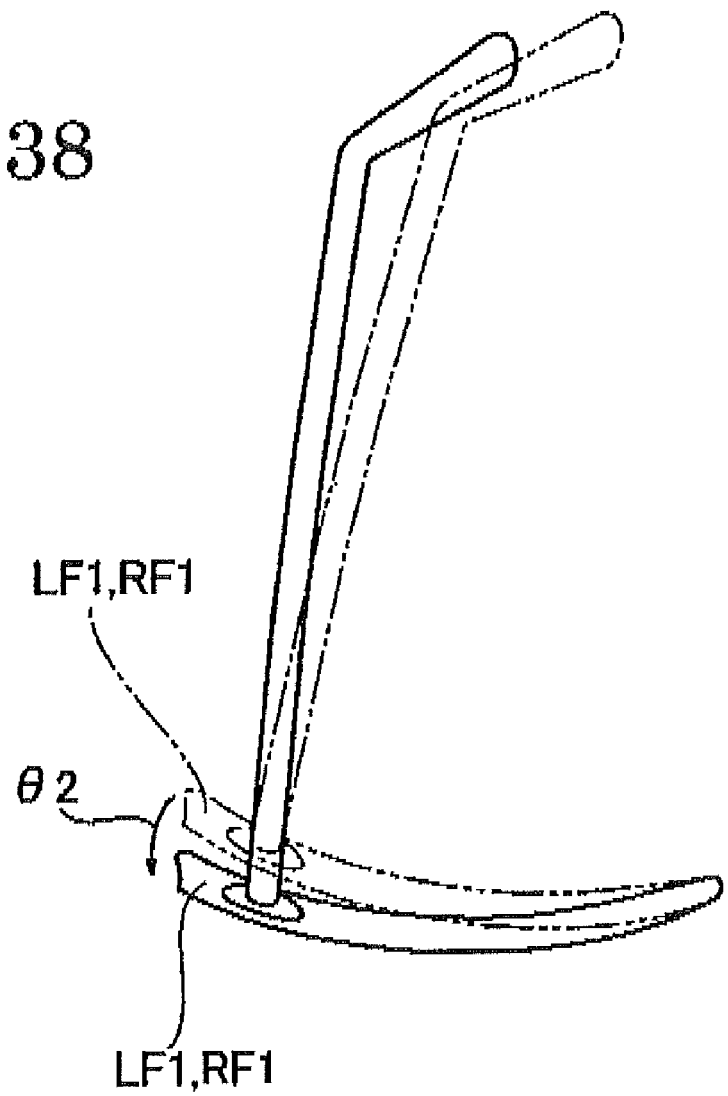

SPECTACLE LENS FRAME SHAPE MEASURING APPARATUS

CROSS REFERENCE TO RELATED APPLICATIONS

The present application is based on and claims priority from Japanese Application Number 2008-235915, filed on Sep. 16, 2008, the disclosure of which is hereby incorporated by reference herein in its entirety.

BACKGROUND OF THE INVENTION

1. Field of the Invention

The present invention relates to a spectacle lens frame shape measuring apparatus measuring the shape of a lens (a lens frame or a frame) of spectacles and specifically relates to an improvement of the measuring apparatus in which upper holding pins hold upper rims of spectacle lens frames at different positions in a right-left direction from positions at which lower holding pins hold lower rims thereof.

2. Description of the Related Art

For processing lenses to be attached to a spectacle lens frame, it is necessary to previously measure the shape of the spectacle lens frame. As an apparatus for measuring the shape of the spectacle lens frame, a spectacle lens frame shape measuring apparatus is known.

Such a spectacle lens frame shape measuring apparatus includes: a holding device holding upper and lower rims of spectacle lens frames with holding pins; and a probe moving (rotating as well as advancing and retracting in a radial direction) along the entire circumference of the lens frame while abutting on the lens fitting grooves of the spectacle lens frames held by the holding device.

For example, Japanese Unexamined Patent Application Publication Nos. H2-214810 (reference numbers 18B, 18C, and 18D in FIG. 2) and H4-93163 (reference numbers 2114a to 2114c and 2214a to 2214c in FIGS. 3-1 and 3-5) show the following configuration for measurement of spectacle lens frames. In the configuration, a linear section of the upper rim of each spectacle lens frame (a section extending in a cross-wise direction (in a right-left direction of the spectacle frame)) is longer than a linear section of the lower rim thereof. Specifically, in order to provide stable hold with the upper holding pins holding the upper rims and the lower holding pins holding the lower rims for such a spectacle frame, the upper holding pins are placed at different positions from those of the lower holding pins in the right-left direction (each of the upper holding pins is not positioned on an extension of the corresponding lower holding pin).

When the upper rim is longer than the lower rim, the distance between the upper holding pin of the left lens frame and the upper holding pin of the right lens frame is set longer than the distance between the lower holding pin of the left lens frame and the lower holding pin of the right lens frame. The lens frames can be therefore stably held even when subjected to load by the probe coming into contact with the lens frames.

The same goes when the upper rim is shorter than the lower rim.

In recent years, spectacle lens frames which are highly curved and cambered so as to fit a spectacle wearer's face (having a large curved angle (rising angle)) have appeared, such as sunglasses for sport.

At measurement of the lens frame shape of a spectacle frame having lens frames with such a large curved angle (for example, not less than 15 degrees), the probe moves by a larger amount in regions of the lens frames closer to right and left outer edges and is more likely to be disengaged from the lens fitting grooves, or the lens frames are more likely to be deformed. Accordingly, proper measurement values may not be obtained.

Accordingly, a measuring apparatus including a holding device swinging mechanism which swings holder pins around a virtual axis is proposed. (International Publication No. WO2008-97564 (FIG. 7, etc.)). In the measuring apparatus, the holding device is swung by the holding device swinging mechanism so that the target lens frames may be placed at a substantially uniform attitude with respect to the probe.

Note that, each of the upper holding pins in International Publication We. WO2008-97564 is placed on an extension of the corresponding lower holding pin.

As shown in FIG. 35, even in the case of measuring the shape of spectacle lens frames RF and LF with a large curved angle as described above, in the light of stable holding of the spectacle lens frames RF and LF, it is preferable to place upper holding pins 3b4 holding upper rims RF1 and LF1 at positions which are not on extensions of lower holding pins 3b6 holding lower rims RF2 and LF2, respectively.

Meanwhile, for example, a spectacle lens frame shape measuring apparatus in which a distance L1 between the right and left upper holding pins 3b4 and 3b4 is not equal to a distance L2 between the right and left lower holding pine 3b6 and 3b6 (L1≠L2), similar to the conventional spectacle lens frame shape measuring apparatus in which the distance L1 is set equal to the distance L2 (L1=L2), is configured so that the upper holding pins 3b4 and 3b4 may hold the lens frames RF and LF at the same height as the lower holding pins 3b6 and 3b6 hold the lens frames RF and LF.

In other words, in the lens frames RF and LF held by the upper and lower holding pins 3b4, 3b4, 3b6, and 3b6, the upper rims RF1 and LF1 and the lower rims RF2 and LF2 are at the same height.

In the spectacle lens frames RF and LF held by the spectacle lens frame shape measuring apparatus configured as described above, if the distance L1 between the right and left upper holding pins 3b4 and 3b4 is longer than the distance L2 between the right and left lower holding pins 3b6 and 3b6 (L1>L2) as shown in FIG. 35, for example, the upper holding pins 3b4 and 3b4 hold portions on the outside of the lower holding pins 3b6 and 3b6 in the right-left direction.

At this time, when the spectacle lens frames RF and LF have a large curved angle (for example, not less than 15 degrees), as shown in FIG. 36, the height of the frames from a reference surface h0 increases toward outsides in the right-left direction corresponding to the inclination of the curved angle. Accordingly, as shown in FIG. 36 and FIG. 37A showing the spectacle lens frames RF and LF not yet held, the portions of the upper rims RF1 and LF1 held by the upper holding pins 3b4 and 3b4 are higher by Δh than the portions of the lower rims RF2 and LF2 held by the lower holding pins 3b6 and 3b6 (h1>h2).

It should be noted that the aforementioned height difference between the upper holding pins 3b4 and 3b4 and the lower holding pins 3b6 and 3b6 is for the sake of explanatory convenience. In practice, the upper holding pins 3b4 and 3b4 and lower holding pins 3b6 and 3b6 are fixed at the same height (for example, at a height h2) and cannot move in a height direction. In other words, FIG. 37A is a view assuming the case of the conventional spectacle lens frame shape measuring apparatus in which the upper holding pins 3b4 and 3b4 are arranged on respective extensions of the lower holding pins 3b6 and 3b6.

However, the upper holding pins 3b4 and 3b4 and lower holding pins 3b6 and 3b6 are set at the same height h2 in a state where the spectacle lens frames RF and LF are held as shown in FIG. 37B. Accordingly, the frames are held with the upper rims RF1 and LF1 pressed down (to an inclined position) by the original height difference Δh (=h1−h2) according to the curved angle and the distance difference between the upper and lower holding pins (ΔL=L1−L2).

When the spectacle lens frames RF and LF are swung by the holding device swinging mechanism for measurement of the spectacle lens frame shape with the upper rims RF1 and LF1 inclined to a position indicated by solid lines in FIG. 38, instead of the position indicated by two-dot chain lines in the same drawing where the spectacle lens frames RF and LF should be originally hold, because of the influence of the inclination of the upper rims RF1 and LF1, the result of the measurement with the upper rims RF1 and LF1 inclined as indicated by solid lines of FIGS. 39A and 39B is shifted by an axial shift amount or angle θ3 from the result of measurement which would be obtained with the upper rims RF1 and LF1 not inclined as indicated by two-dot chain lines of the same drawings.

Accordingly, the shapes of the spectacle lens frames RF and LF may not be obtained with high accuracy.

When the distance L1 between the right and left upper holding pins 3b4 and 3b4 is shorter than the distance L2 between the right and left lower holding pins 3b6 and 3b6 (L1<L2), the upper holding pins 3b4 and 3b4 hold the spectacle lens frames RF and LF on the inside of the lower holding pins 3b6 and 3b6 in the right-left direction. In the case where the spectacle lens frames RF and LF have a large curved angle, the portions of the upper rims RF1 and LF1 held by the upper holding pins 3b4 and 3b4 are lower than the portions of the lower rims RF2 and LF2 held by the lower holding pins 3b6 and 3b6. If the upper holding pins 3b4 and 3b4 are set at the same height as the lower holding pins 3b6 and 3b6 (at the height h2 when the lower holding pins 3b6 and 3b6 are taken as a reference), the spectacle lens frames RF and LF are held with the upper rims RF1 and LF1 pressed up. Accordingly, this case also results in an axial shift with respect to the result of measurement which would be obtained with the upper rims RF1 and LF1 not inclined.

Herein, the axial shift amount or angle θ3 occurs in the following manner. When the spectacle lens frames RF and LF are held while being inclined or the spectacle lens frames RF and LF are swung to the right or left while being inclined, the shape of the spectacle lens frames RF and LF projected onto a horizontal plane are twisted at the inclined right and left end portions. Accordingly, the shapes of the spectacle lens frames RF and LF calculated based on the measured shapes of the spectacle lens frames are tilted with respect to those which would be obtained with the not-inclined frames at the deviation angle θ3 with a geometrical central position C1' of the spectacle lens frame indicated by two-dot chain lines of FIG. 39A being shifted from an original geometrical central position C1 of the spectacle lens frame not inclined (solid lines). Alternatively, as shown in FIG. 39B, the calculated shapes of the spectacle lens frames RF and LF are tilted at the deviation angle θ3 with the geometrical central position C1' of the spectacle lens frame indicated by the two-dot chain lines being substantially coincident with the original geometrical central position C1 of the not-inclined spectacle lens frame (the solid lines). This tilt angle θ3 results in an axial shift amount.

This axial shift will adversely affect the measurement result of the shape of a normal spectacle lens frame. To be specific, when the shape of each spectacle lens frame obtained by measurement is tilted at the deviation angle θ3, FPD, which is a distance between geometrical centers of the right and left spectacle lens frames, differs from an original FPD of spectacle lens frames not inclined. This makes it impossible to accurately grinding spectacle lenses fit to the spectacle lens frames.

SUMMARY OF THE INVENTION

The present invention has been made in the light of the aforementioned circumstances, and an object of the present invention is to provide a spectacle lens frame shape measuring apparatus capable of properly correcting an axial shift which is produced because upper and lower holding pins hold upper and lower rims of spectacle lens frames having a large curved angle at different positions in the right-left direction.

In the spectacle lens frame shape measuring apparatus of the present invention, a calculation controller calculates an axial shift amount or angle of held spectacle lens frames on the basis of a curved angle of the spectacle lens frames and an inclination angle of an upper or lower rim, and corrects the shape of the spectacle lens frames obtained through measurement according to the calculated axial shift amount or angle, thus achieving a highly accurate shape of the spectacle lens frames.

Specifically, the spectacle lens frame shape measuring apparatus of the present invention includes: holding device including upper holding pins and lower holding pins respectively holding upper rims and lower rims of spectacle lens frames, the upper holding pins holding the spectacle lens frames at different positions in a right-left direction from the positions at which the lower holding pins hold the spectacle lens frames and being placed at a same height as the lower holding pins in a vertical direction; a probe brought into contact with lens fitting grooves of the spectacle lens frames held by the holding device; a holding device swinging mechanism swinging the holding device around a predetermined virtual axis; and a calculation controller calculating an axial shift amount or angle of the spectacle lens frames held by the holding device on the basis of a curved angle of the spectacle lens frames and an inclination angle of the upper or lower rim, and correcting the shape of the spectacle lens frames obtained by the probe according to the calculated axial shift amount or angle.

BRIEF DESCRIPTION OF THE DRAWINGS

FIG. 28B is a cross-sectional view taken along a line C1-C1 of FIG. 23A.

FIG. 31B showing a case where the guiderail has a convex upper surface.

FIG. 37A showing the spectacle lens frames not held; FIG. 37B showing the held spectacle lens frames.

FIG. 38 is a schematic view showing an inclination of the spectacle lens frame, dashed double dotted lines indicating a normal state of the spectacle lens frame not inclined, and solid lines indicating the inclined spectacle lens frame.

FIG. 40B showing a curved angle scale; and FIG. 40C is a schematic view showing a state where the spectacle frame of FIG. 40A is set on the scale of FIG. 40B to obtain the curved angle.

DETAILED DESCRIPTION OF THE PREFERRED EMBODIMENTS

Hereinafter, a description is given of embodiments of the present invention based on the drawings.

[Configuration]

Figure 1A:
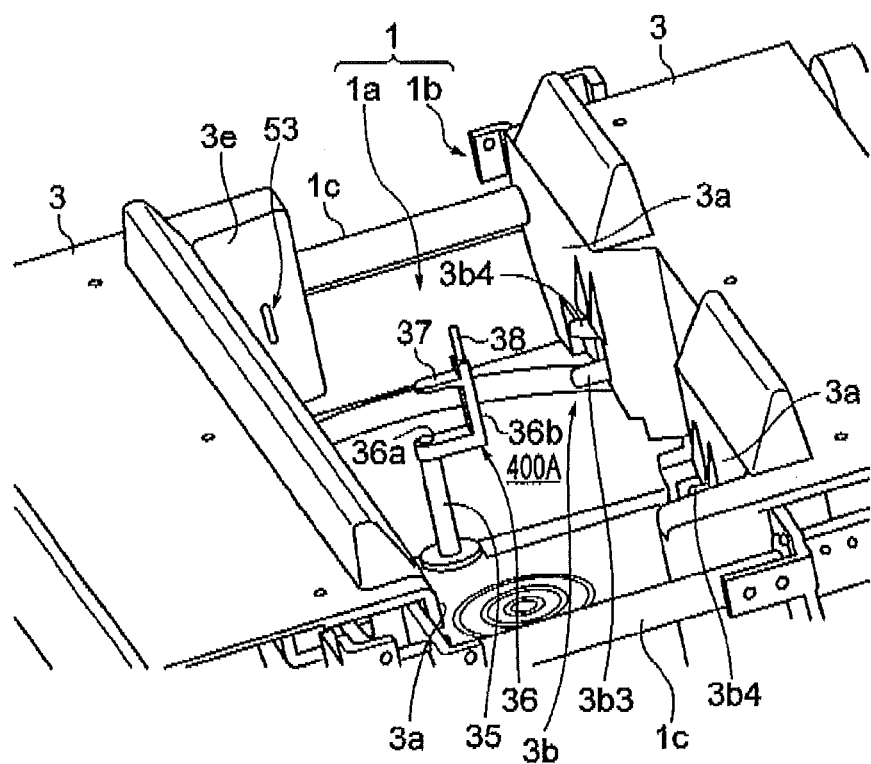
FIG. 1A is a partial schematic perspective view of a spectacle lens frame shape measuring apparatus according to the present invention.
Figure 2:
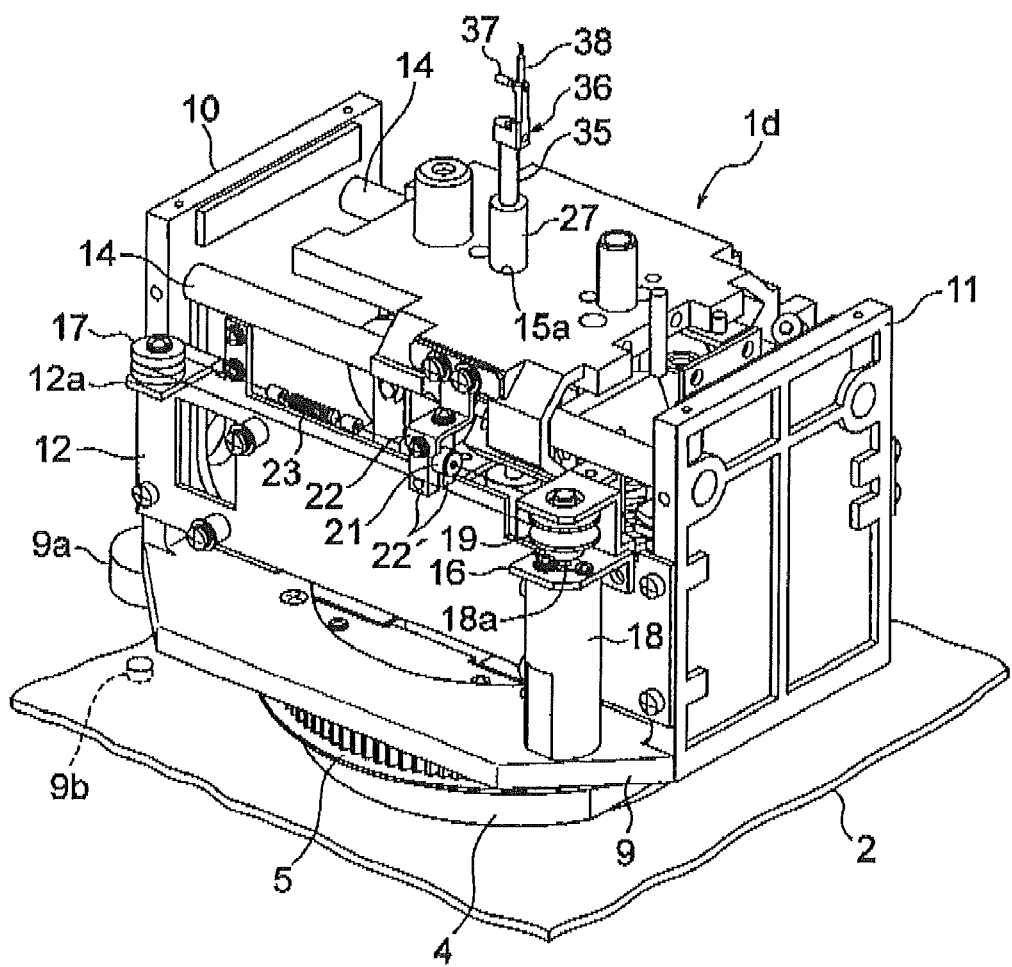
FIG. 2 is a perspective view of a measuring mechanism of the spectacle lens frame shape measuring apparatus of FIG. 1.

FIG. 1A shows a configuration of a main portion of a spectacle lens frame shape measuring apparatus according to the present invention (also serving as a lens shape measuring apparatus), which includes a measuring apparatus body 1. The measuring apparatus body 1 includes: a case section 1*a* for accommodating a measuring mechanism located in lower part; and a lens frame holding mechanism 1*b* provided above the case section 1*a*. In the bottom of the case section 1*a* of FIG. 1A, a base 2 shown in FIG. 2 is provided.

The lens frame holding mechanism 1*b* includes a pair of parallel guide rods (guide members) 1*c* and 1*c* which are fixed to the case section 1*a*. On the guide members 1*c* and 1*c*, slide frames 3 and 3 are held so as to approach and separate from each other.

The slide frames 3 and 3 are biased by a not-shown coil spring or the like so as to approach to each other. Each of the slide frames 3 and 3 includes: a vertical wall 3*a* which faces a vertical wall 3*a* of the other slide frame 3 and is caused to abut on spectacle lens frames (not shown); and lens frame holders (holding device) 3*b* holding the spectacle lens frames.

Each of the lens frame holders 3*b* includes a lower holding bar 3*b*1 (holding pin) protruding from the vertical wall 3*a* and an upper holding bar 3*b*2 (holding pin) attached to the slide frame 3 so as to open and close from above the holding bar 3*b*1. The lens frame holders 3*b* are provided to right and left lens frames of not-shown spectacles, respectively.

Such lens frame holding mechanisms 1*b* can employ a configuration disclosed in, for example, Japanese Patent Application Publication No. H10-328992 or the like or can employ other known techniques.

Hereinbelow, if necessary, the holding bars 3*b*2 and 3*b*1 holding upper rims of the spectacle lens frames are referred to as upper holding bars 3*b*4 and 3*b*3 (upper holding pins), and the holding bars 3*b*2 and 3*b*1 holding lower rims thereof are referred to as lower holding bars 3*b*6 and 3*b*5 (lower holding pins).

Figure 1B:
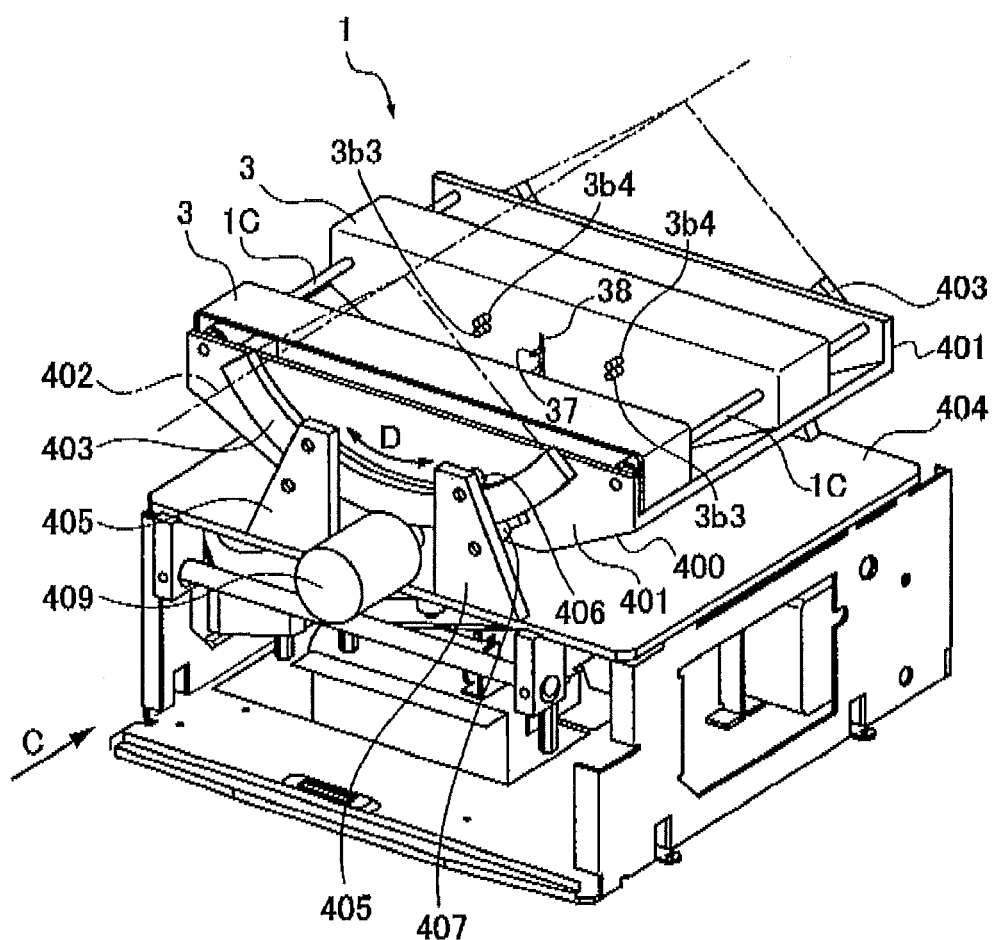
FIG. 1B is a perspective view of the spectacle lens frame shape measuring apparatus according to the present invention.
Figure 1C:
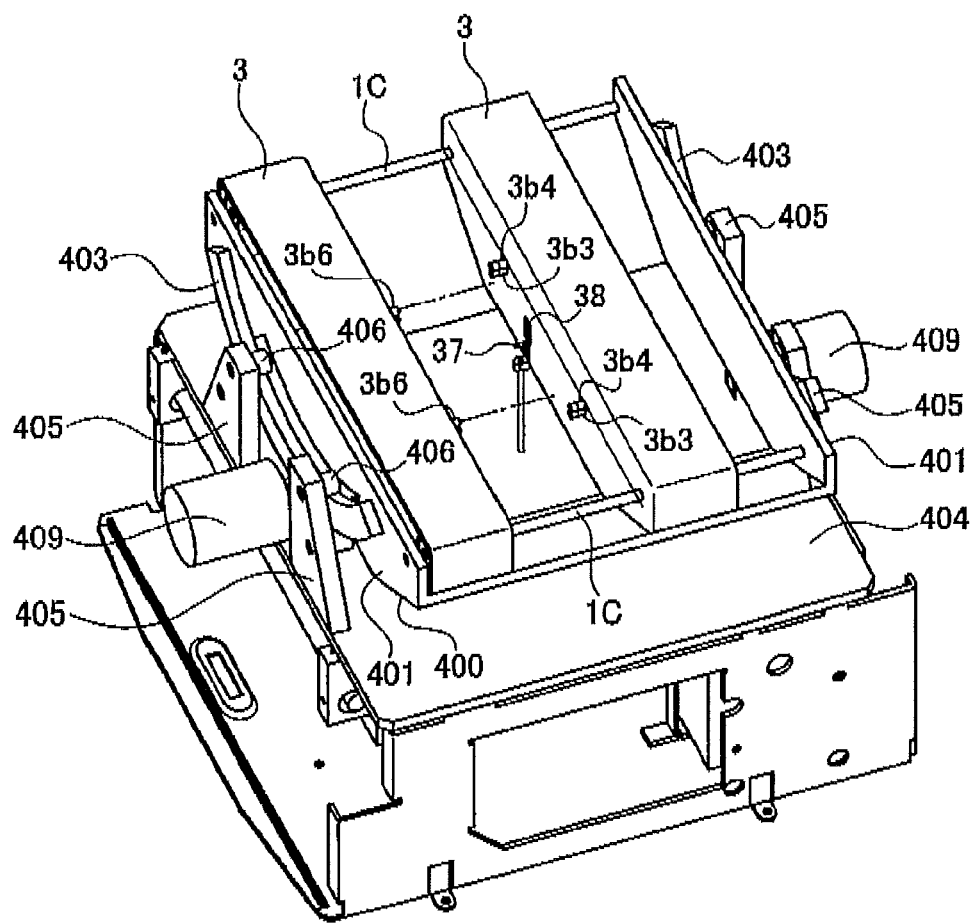
FIG. 1C is a perspective view of the spectacle lens frame shape measuring apparatus of FIG. 1B from another viewpoint.
Figure 1D:
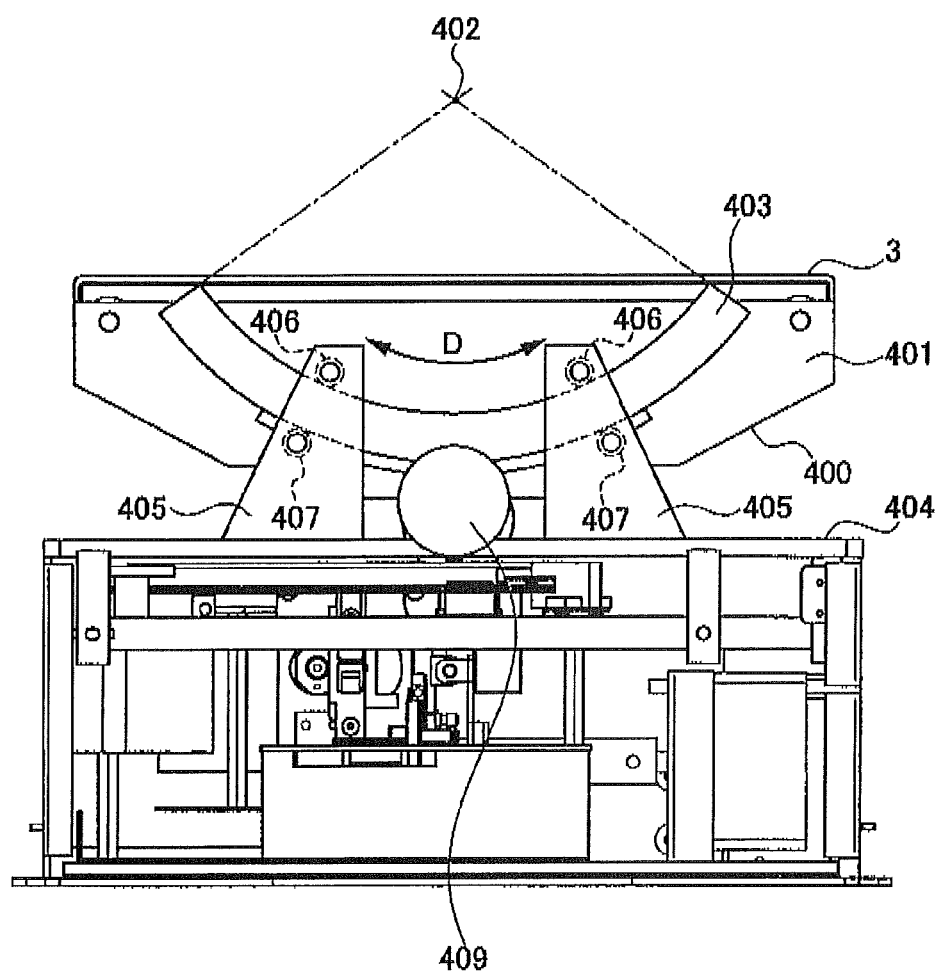
FIG. 1D is a side view of the spectacle lens frame shape measuring apparatus of FIG. 1B in a direction of an arrow C.
Figure 1E:
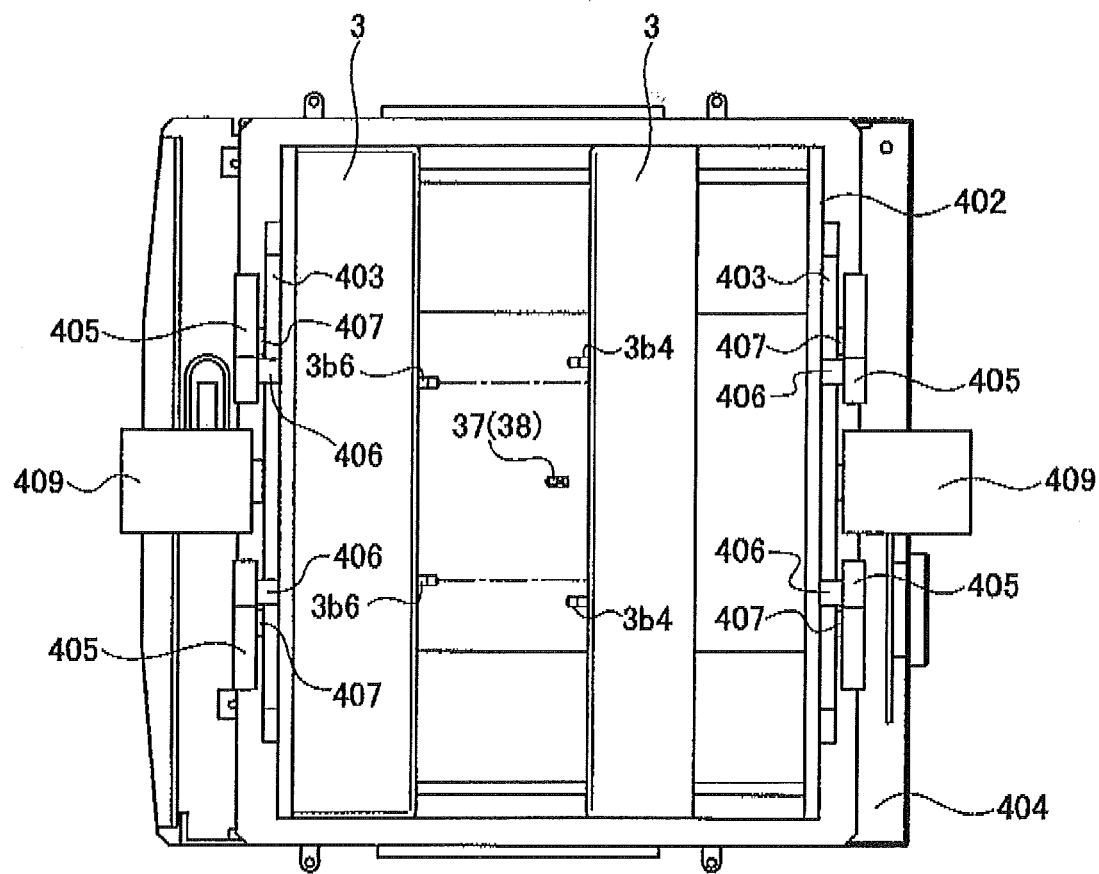
FIG. 1E is a top view of the spectacle lens frame shape measuring apparatus of FIG. 1B.

The upper holding bars 3*b*4 and 3*b*4 are placed at the outside of the lower holding bars 3*b*6 and 3*b*6 in the right and left direction of the spectacle lens frame and at a same height as the lower holding bars 3*b*6 and 3*b*6 (see FIGS. 1C and 1E).

<Measurement Mechanism>

FIG. 1B is a perspective view of the spectacle lens frame shape measuring apparatus according to the present invention; and FIG. 1C is a perspective view of the spectacle lens frame shape measuring apparatus of FIG. 1B seen from another viewpoint. FIG. 1D is a side view of the spectacle lens frame shape measuring apparatus of FIG. 1B in a direction of an arrow C. FIG. 1E is a top view of the spectacle lens frame shape measuring apparatus of FIG. 1B.

As shown in FIGS. 1A and 1B to 1D, the slide frame 3 includes a bottom surface 400 formed in a rectangle protruding downward. At the center of the bottom surface 400, an opening 400A is formed. The opening 400A is configured to allow a lens frame probe 37 and an attachment hole probe 38 to be inserted therethrough upward from the bottom side. The lens frame probe 37 and attachment hole probe 38 are described later.

The bottom surface 400 may be a cylindrical surface protruding downward. Moreover, to an outer surface 401 of the slide frame 3, a guiderail 403 having a belt-like shape curved in an arc around a virtual axis 402 is attached.

Meanwhile, the measuring apparatus body 1 includes brackets 405 and 405 standing up on each upper end of a lower case 404. Each of the brackets 405 and 405 is provided with a rotatable supporting skid 406 in upper part and a rotatable supporting skid 407 below the supporting skid 406. The supporting skids 406 and 407 of each bracket 405 are arranged so as to sandwich the guiderail 403 of the slide frame 3 at upper and lower positions.

The both slide frames 3 are supported on the lower case 404 of the measuring apparatus body 1 through the guiderails 403 sandwiched by the supporting skids 406 and 407 at the upper and lower portions. The both slide frames 3 can therefore swing in a direction of an arrow D around the virtual axis 402.

Figure 1F:
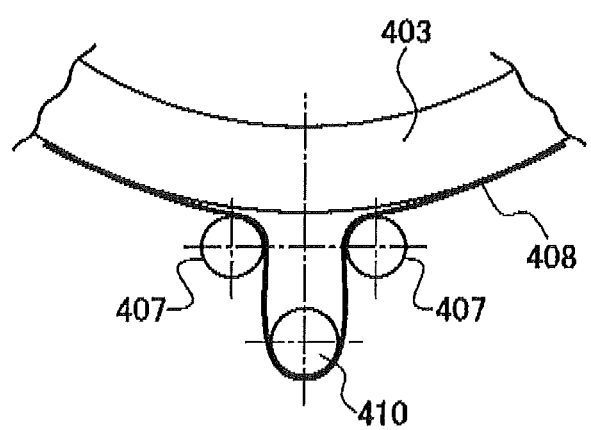
FIG. 1F is a view showing a mechanism swinging a frame holding section.

As shown in FIG. 1F, on a lower edge of each guiderail 403, a belt 408 is provided. Both ends of the belt 408 are fixed to the lower edge of the guiderail 403, and the other part thereof is not fixed to the lower edge of the guiderail 403. In other words, the part of the belt 408 other than the both ends can be separated from the lower edge of the guiderail 403.

On the lower case 404 of the measuring apparatus body 1, motors 409 (see FIGS. 1B to 1E) as a driving section are provided. On an output shaft of each motor 409, a driving skid 410 is attached. The driving skid 410 is placed substantially in the middle between the supporting skids 407 and 407 respectively attached to the brackets 405 and 405 on both sides thereof and below the supporting skids 407 and 407.

The belt 408 provided on the lower edge of the guiderail 403 is wound around one of the supporting skids 407 and 407, wound around the driving skid 410, and then wound around the other supporting skid 407. The upper surface of the belt 408 (the surface brought into contact with the lower edge of the guiderail 403) is jagged, and the outer circumferential surface of the driving skid 410 is also jagged.

This results in providing a large coefficient of friction between the upper surface of the belt 408 and the outer circumferential surface of the driving skid 410. Accordingly, when the driving skid 410 rotates, the belt 408 moves to the right or left in FIG. 1F without slipping. The slide frame 3 can be therefore swung in the direction of the arrow D around the virtual axis 402 (see FIGS. 1B and 1D).

The guiderails 403, supporting skids 406 and 407, belts 408, motors 409, and driving skids 410 constitute a holding unit swinging mechanism.

On the base 2, a measurement mechanism 1*d* as shown in FIGS. 2 to 5A is provided. The measurement mechanism 1*d* includes a base supporting member 4 wed on the base 2. To the base supporting member 4, a large-diameter driven gear 5 is attached so as to horizontally rotate around a vertical axis.

Figure 5A:
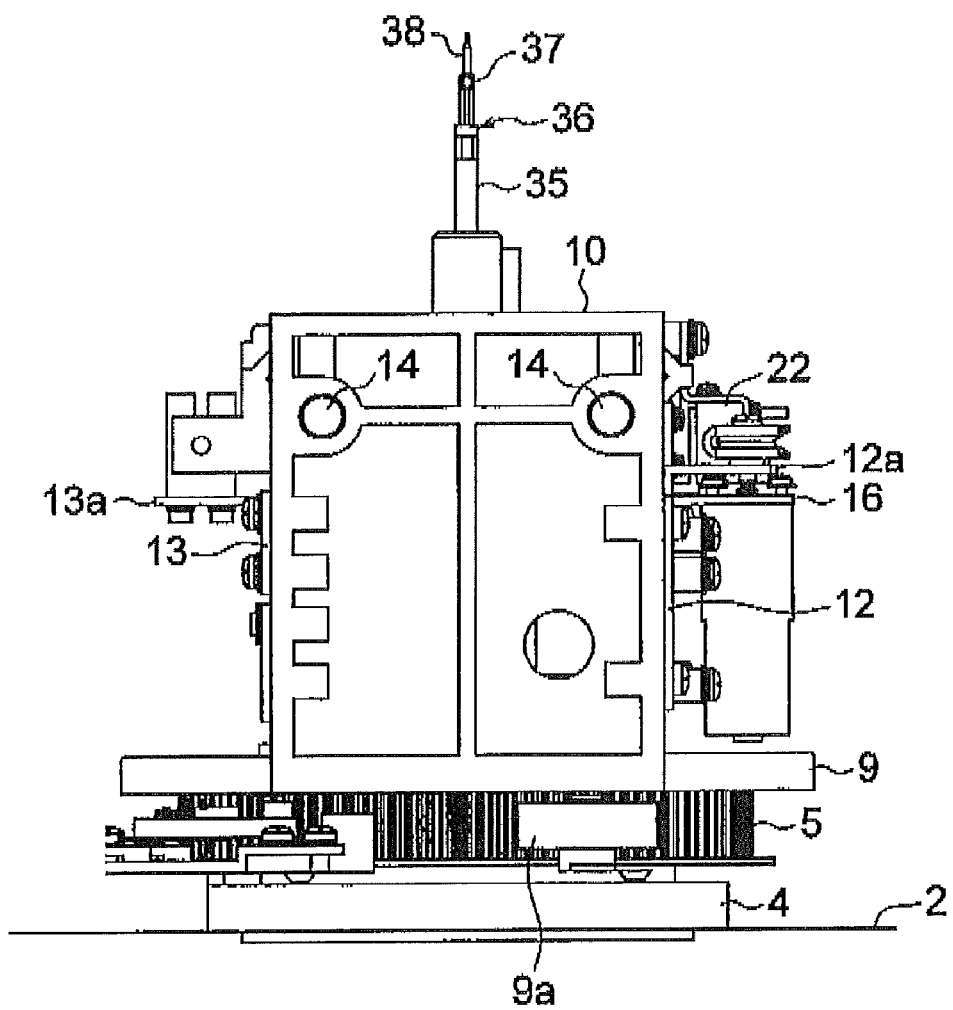
FIG. 5A is a right side view of the measuring mechanism of FIG. 4.
Figure 5B:
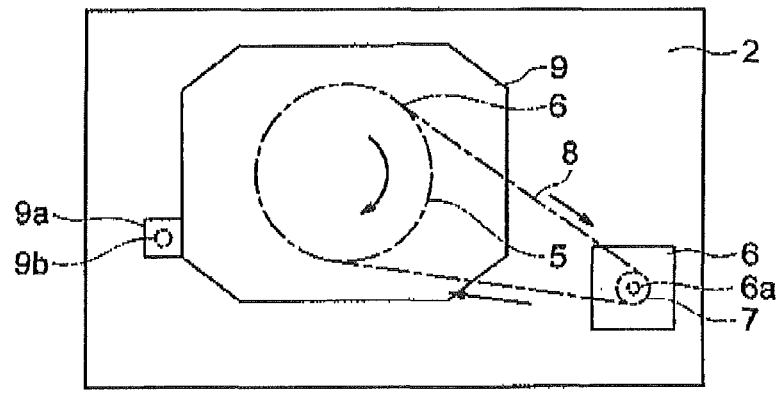
FIG. 5B is a schematic view showing a driving unit for a rotation base of the measuring mechanism of FIG. 2.

To the base 2, a driving motor 6 schematically shown in FIG. 5B is attached adjacent to the driven gear (timing gear) 5. On an output shaft 6*a* of the driving motor 6, a pinion (timing gear) 7 is fixed. A timing belt 8 is wound around the pinion 7 and driven gear 5.

When the driving motor 6 is activated, rotation of the output shaft 6*a* of the driving motor 6 is transmitted through the pinion 7 and timing belt 8 to the driven gear 6, and thereby rotates the driven gear 5. Here, the driving motor 6 is a two-phase stepping motor.

As shown in FIGS. 2 to 5A, a rotation base 9 is integrally fixed on the driven gear 5. To the rotation base 9, a photosensor 9*a* as an origin detecting device (origin detector) is attached.

In this case, for example, a light emitter 9b for indicating an origin is provided on the base 2, and a linear or spot light beam is emitted from the light emitter 9b upward as an origin mark. The position of origin of horizontal rotation of the rotation base 9 can be set to the position where the photosensor 9a detects the light beam as the origin mark.

The origin detecting device can employ a known technique such as a transmissive photosensor, a reflective photosensor, or a proximity sensor.

Figure 3:
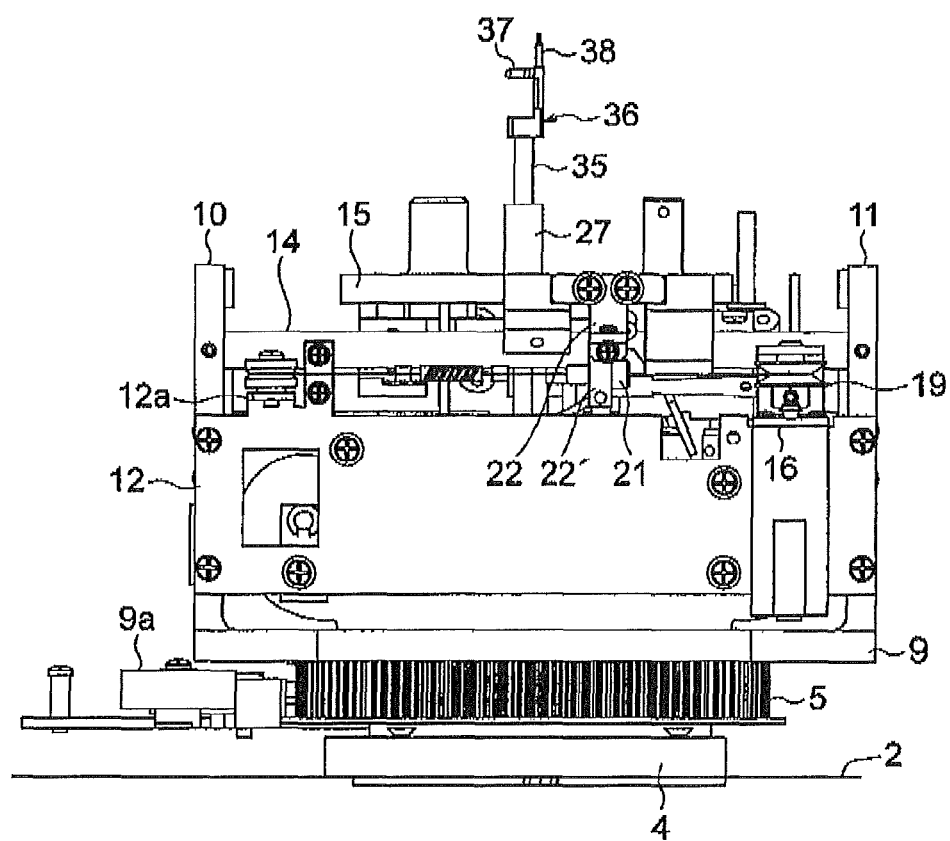
FIG. 3 is a front view of the measuring mechanism of FIG. 2.
Figure 4:
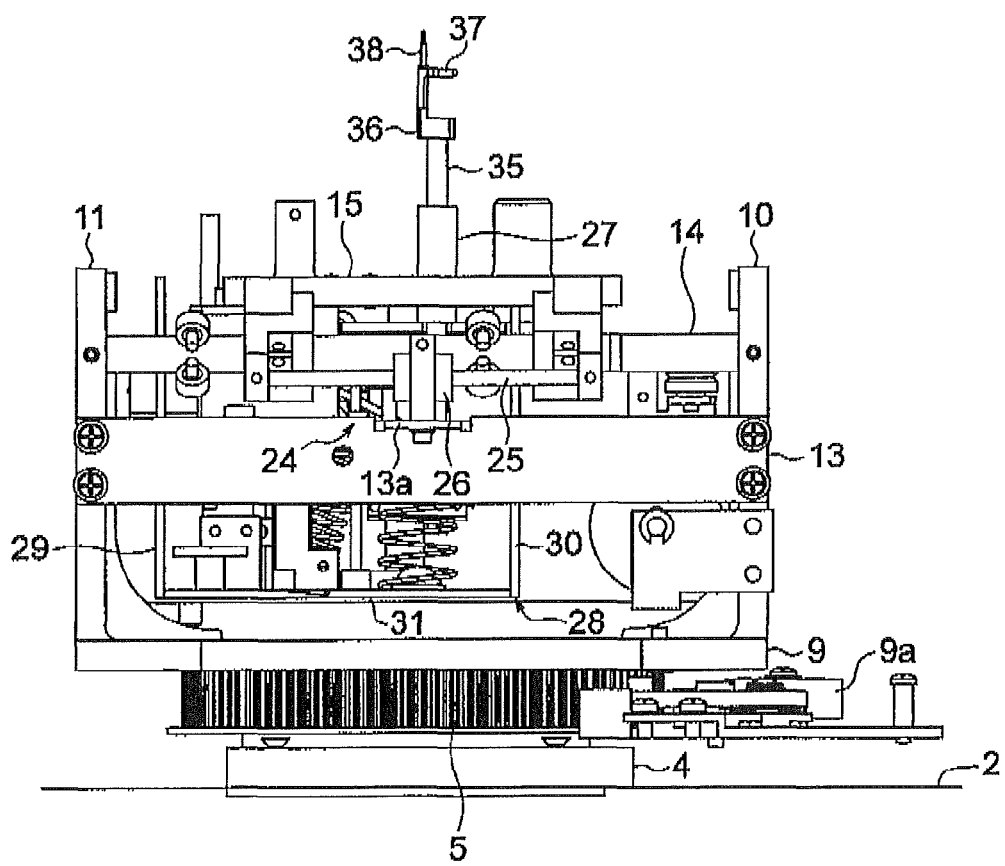
FIG. 4 is a back view of the measuring mechanism of FIG. 2.

Furthermore, to both ends of the rotation base 9 in the longitudinal direction, as shown in FIGS. 2 to 4, rail attachment plates 10 and 11, which vertically extend and face each other in parallel, are integrally fixed. As shown in FIG. 3, to an end of the rail attachment plate 10 and an end of the rail attachment plate1 11, longitudinal ends of a side plate 12 are respectively fixed. As shown in FIG. 4, to the other end of the rail attachment plate 10 and the other end of the rail attachment plate1 11, longitudinal ends of a side plate 18 are respectively fixed.

As shown in FIGS. 2 to 4, a pair of shaft-shaped guide rails 14 and 14 parallel to each other is horizontally provided between upper halves of the rail attachment plates 10 and 11 facing each other. The both ends of each guiderail 14 are fixed to the rail attachment plates 10 and 11, and a slider 15 is held on the guiderails 14 and 14 so as to advance and retract in the longitudinal direction.

As shown in FIGS. 2 and 3, a pulley supporting plate section 12a horizontally protruding laterally is formed by bending integrally with the side plate 12 in the vicinity of the rail attachment plate 10. Moreover, a bracket 16 for motor attachment is fixed to the side plate 12 in the vicinity of the rail supporting plate 11.

To the pulley supporting plate section 12a, a driven pulley 17 is attached so as to horizontally rotate around an axis vertically extending, and the upper end of a driving motor 18 for moving a slider is fixed to the bracket 16. Here, the driving motor 18 is a DC motor.

Figure 5C:
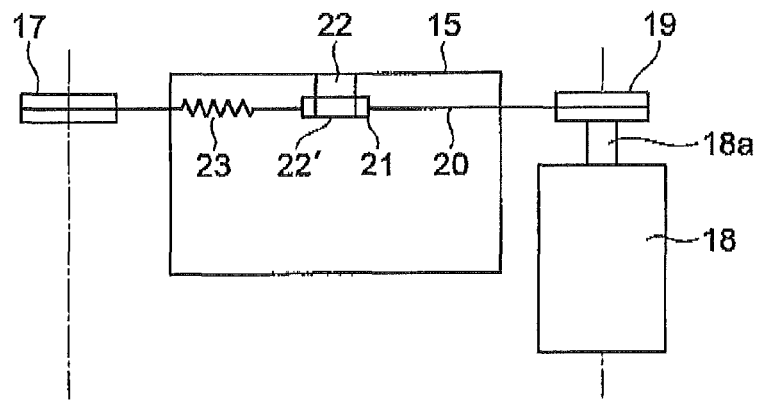
FIG. 5C is a schematic view for explaining a slider driving mechanism of FIG. 2.
Figure 5D:
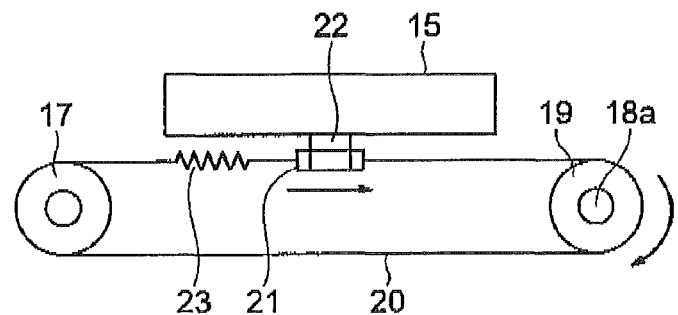
FIG. 5D is a plan view of FIG. 5C.

An output shaft 18a of the driving motor 18 includes an axis line vertically extending and is attached to a driving pulley 19 as shown in FIGS. 5C and 5D.

A ring-shaped wire 20 is wound around the pulleys 17 and 19, and a portion of the wire 20 in the vicinity of an end thereof is held by a shaft-shaped wire holding member 21. This wire holding member 21 is fixed to the slider 15 through brackets 22 and 22'.

The both ends of the wire 20 are connected through a coil spring 23. When the driving motor 18 is operated forward or backward, the output shaft 18a and driving pulley 19 are rotated forward or backward, and the slider 15 is thus moved to the right or left in FIG. 3.

Figure 5E:
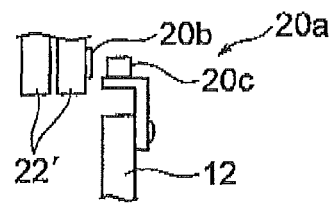
FIG. 5E is a schematic explanatory view of a slider origin detector of FIG. 2.

As shown in FIG. 5E, an origin sensor (an origin detector) 20a detecting the origin of movement position of the slider 15 (an amount of movement) is provided between, the bracket 22' and side plate 12. Here, the origin sensor 20a is a reflection-type sensor. This sensor includes a reflector 20b provided with a slit-shaped reflecting surface vertically extending (not shown) and a reflective photosensor 20c including light emitting and receiving elements.

The reflector 20b is provided for the bracket 22', and the photosensor 20c is provided for the side plate 12.

The origin sensor 20a can employ a known technique including a transmissive photosensor, a proximity sensor, or the like.

At the longitudinal center of the side plate 13 of FIG. 4, a supporting plate section 13a horizontally protruding laterally is formed by bending integrally with the side plate 13 as shown in FIG. 4. Between the side plate 13 and slider 15, as shown in FIG. 4, a linear scale (a position measuring unit) 24 detecting the horizontal movement position of the slider 15 in the direction that the guiderails 14 and 14 extend is provided as a radius detection sensor (a radius detector).

The linear scale 24 is provided with: a shaft-shaped main scale 25 held by the slider 15 in parallel to the guiderails 14 and 14; and a detection head 26 fixed to the supporting plate section 13a and reads position information of the main scale 25.

The detection head 26 is configured to detect the horizontal movement position of the slider 15 from position detection information (movement amount detection information) provided by the main scale 25. Here, the linear scale 24 can be, for example, of a known magnetic or optical type.

For example, in the case of a magnetic type, magnetic patterns of magnetic polarities S and N are alternately provided on the main scale 25 at minute intervals in the axial direction as the position detection information (movement amount detection information). These magnetic patterns are detected by the detection head (magnetic change detection head) 26 to detect the amount of movement (movement position) of the slider 15.

In the case of an optical type, the main scale 25 is formed into a plate, and slits are provided in the main scale 25 at minute intervals in the longitudinal direction thereof. Moreover, light emitting and receiving elements are provided so as to sandwich the main scale 25. Light from the light emitting element is detected by the light receiving element through the slits of the main scale 26 to obtain the number of slits, thus detecting the amount of movement (movement position) of the slider 15.

Substantially at the center of the slider 15, a through-hole 15a is formed as shown in FIG. 2. Through the through-hole 15a, a guide cylinder 27 vertically extending is inserted. Under the slider 15, a supporting frame 28 is provided as shown in FIG. 4.

The supporting frame 28 includes: vertical frames 29 and 30 whose upper ends are held by the slider 15; and a horizontal plate (a bottom plate) 31 fixed to the lower ends of the vertical frames 29 and 30.

Figure 8:
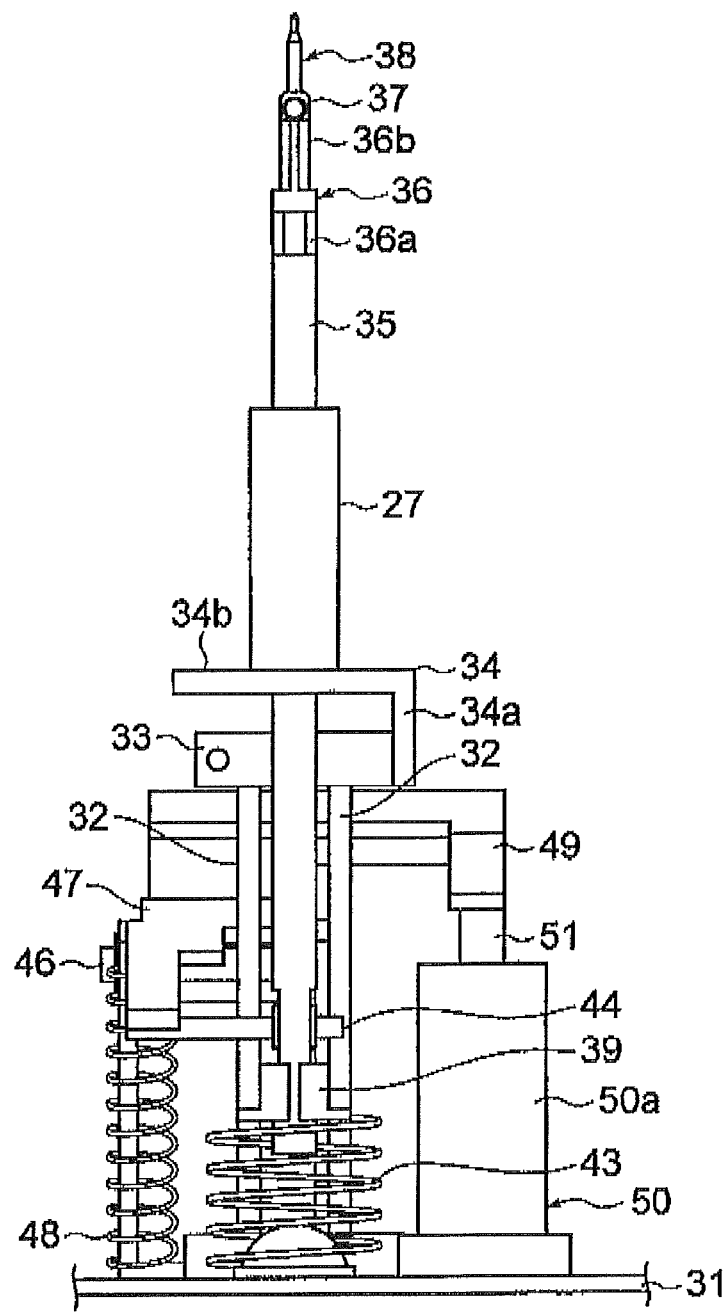
FIG. 8 is a left side view of FIG. 7.

To the horizontal plate (bottom plate) 31, lower ends of a pair of shaft-shaped supporting members 32 and 32, which vertically extend in parallel to each other, are fixed (see FIG. 8). To upper ends of the supporting members 32 and 32, a holding member (a coupling member) 33 is fixed. To the holding member 33, a vertical wall 34a of a guide supporting member 34 is fixed, the guide supporting member 34 having an L-shaped side surface. On a horizontal wall (an upper wall) 34b of the guide supporting member 34, a lower end of the guide cylinder 27 is fixed.

A probe shaft 35 vertically extending is fitted to and held by the guide cylinder 27 so as to vertically move. At an upper end of the probe shaft 35, a lens shape probe (a lens rim shape probe) 36 is integrally provided. The lens shape probe 36 includes: an attachment section 36a vertically attached to the upper end of the probe shaft 35; and a vertical section 36b extending upward from the attachment section 36a. The attachment section 36a and vertical section 36b form an L shape.

A back surface 36c of the vertical section 36 is processed at a constant R for lens rim shape measurement. At the upper end of the vertical section 36b, the lens frame probe 37 (a probe) is integrally formed in parallel to the attachment section 36a.

Figure 10A:
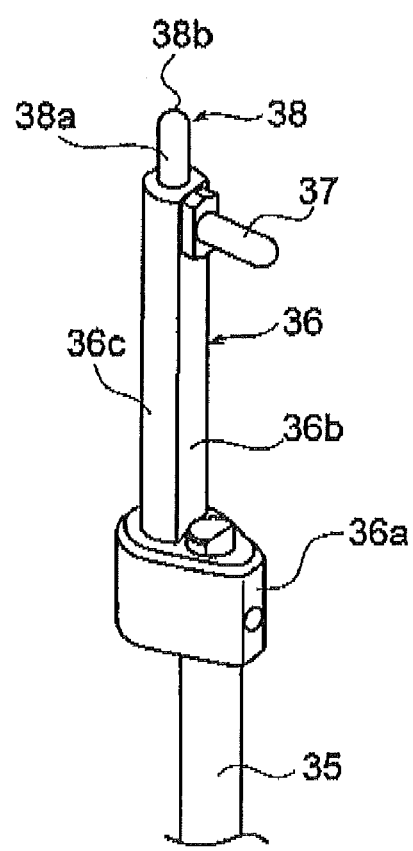
FIG. 10A is a side view of FIG. 9.

Moreover, at the upper end of the lens shape probe 36, as shown in FIG. 10A, the attachment hole probe 38 protruding upward is integrally provided. The attachment hole probe 38 includes: a shaft 38a which is integrally attached to the upper end of the vertical section 36b of the lens shape probe 36 in parallel to the axis line of the probe shaft 35; and a hemisphere 38b provided at the upper end of the shaft 38a. For coping with attachment holes with a wide variety of sizes, it is desirable that the hemisphere 38b have a hemispherical shape larger in diameter than a general attachment hole (2.2φ).

Figure 9:
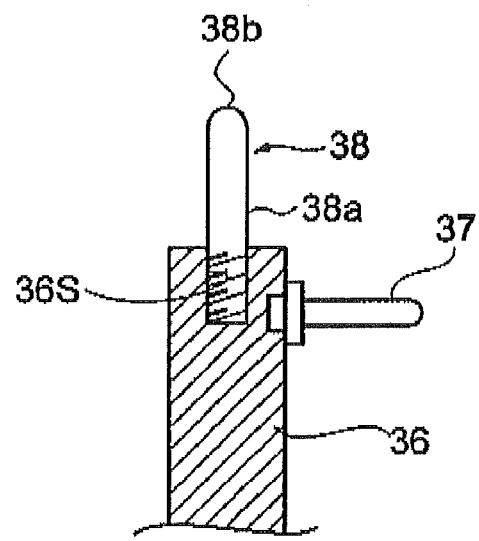
FIG. 9 is a partial enlarged perspective view of the lens shape probe shown in FIG. 1.

The attachment hole probe 38 is not necessarily integrated with the lens-shape probe 36 unlike described above. For example, as shown in FIG. 9, the lens-shape probe 36 may be detachably attached to the upper end of the vertical section 36b of the lens shape probe 36 by providing a thread 36s for the lens shape probe 36 as shown in FIG. 9 and screwing the thread 36s to the upper end of the vertical section 36b.

Figure 6:
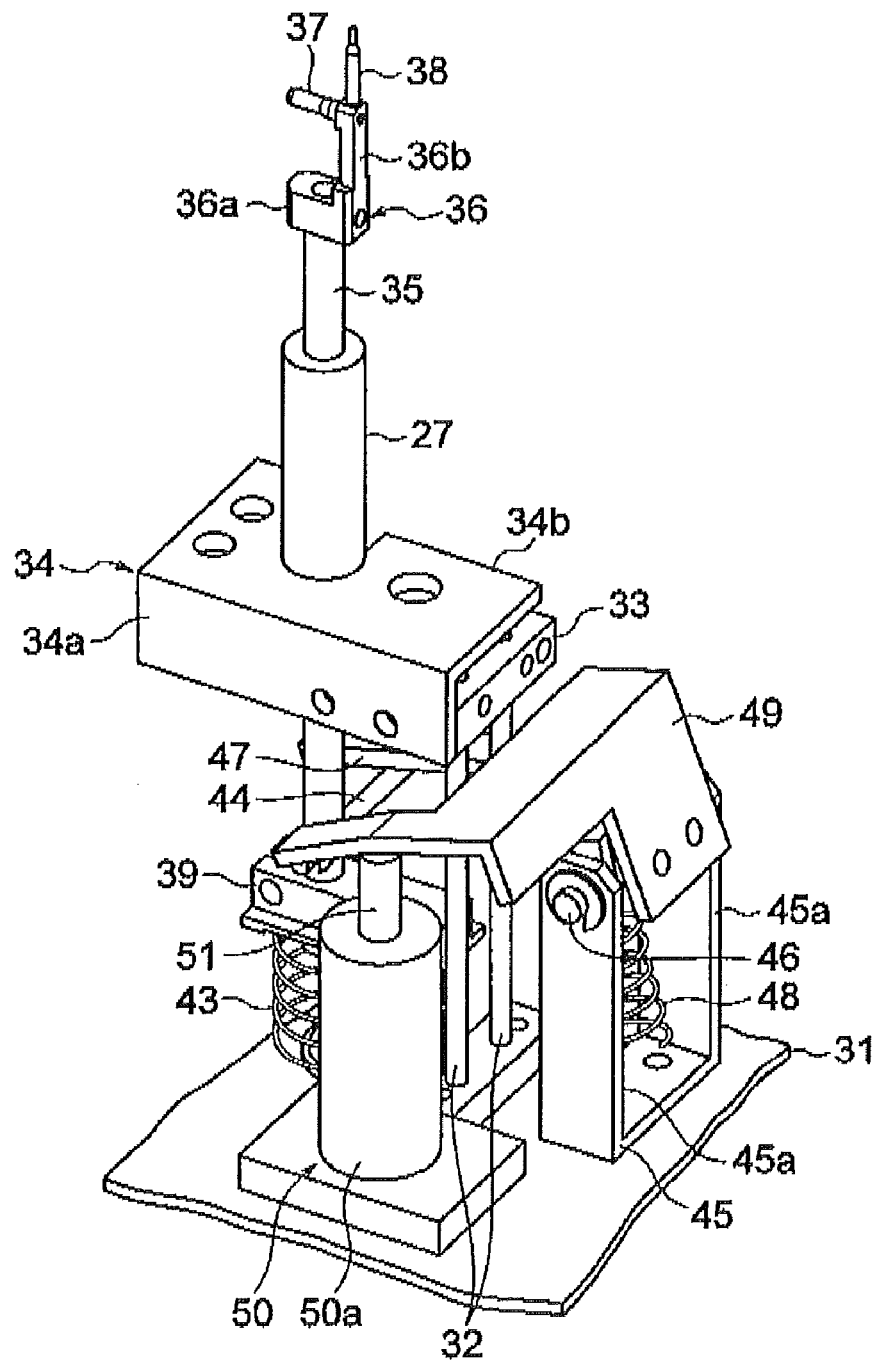
FIG. 6 is a perspective view showing a probe elevating mechanism of FIG. 2.
Figure 7:
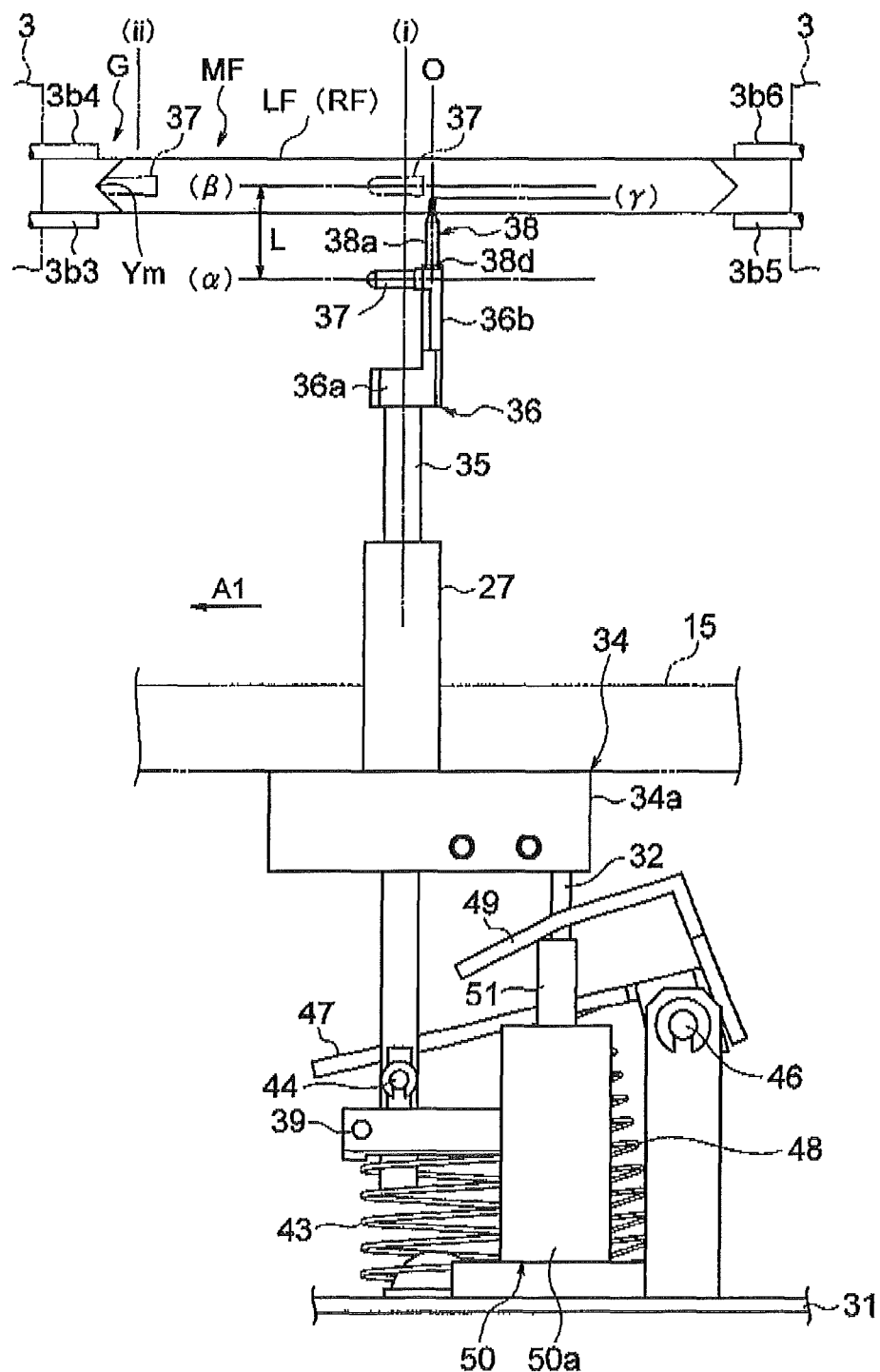
FIG. 7 is an explanatory view for measurement of a lens frame by the probe elevating mechanism of FIG. 6.
Figure 13:
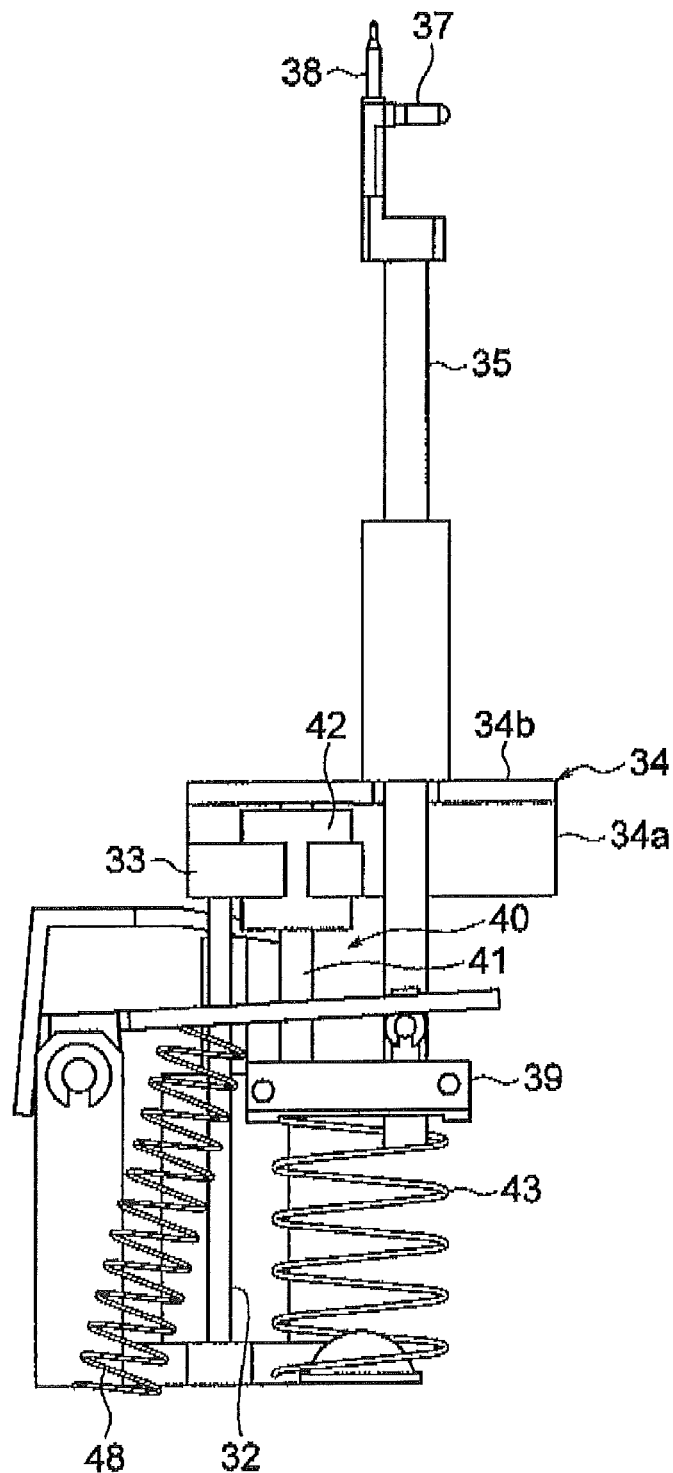
FIG. 13 is an explanatory view of a linear scale of the elevating mechanism of FIG. 11.
Figure 14:
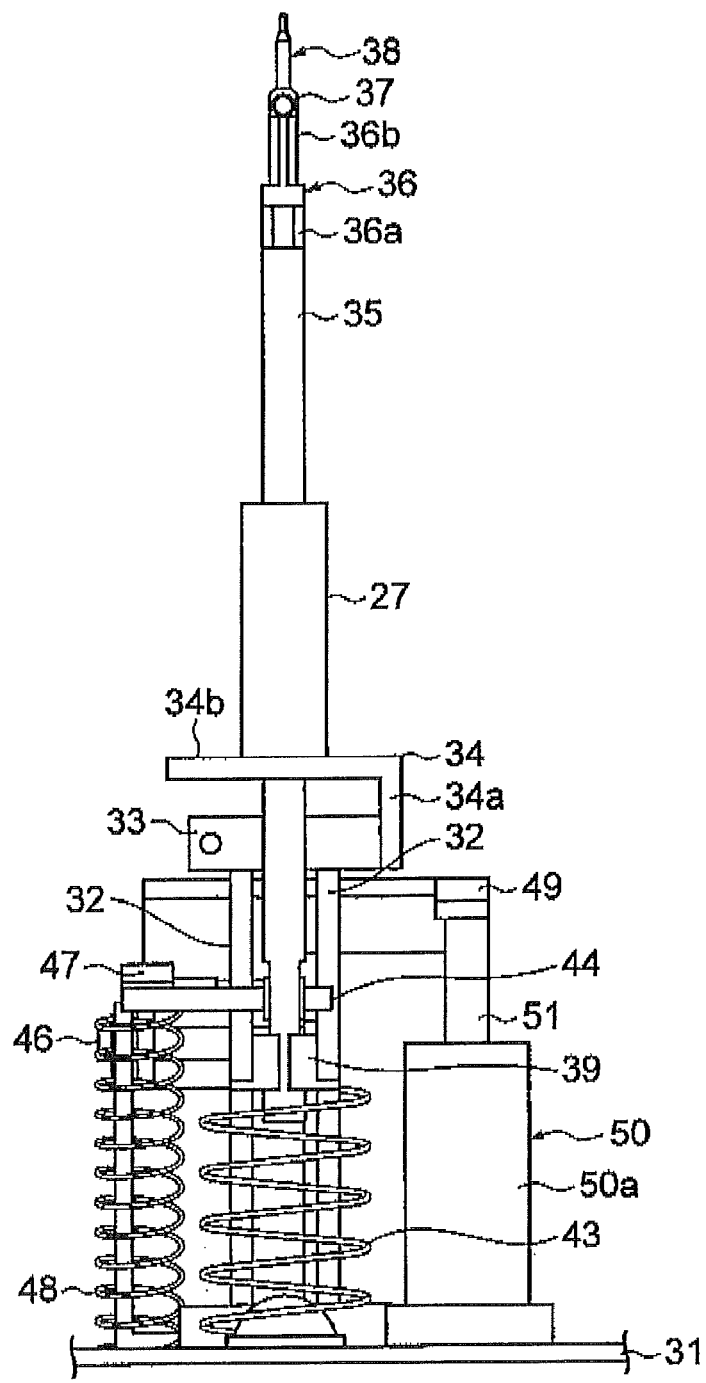
FIG. 14 is a right side view of FIG. 13.

As shown in FIGS. 6 to 8, a bracket 39 is fixed to the lower end of the probe shaft 35. Moreover, as shown in FIG. 13, a linear scale (a position measuring unit) 40 detecting a vertical movement position is provided between the bracket 39 and guide supporting member 34 as a height detection sensor (a height detector).

The linear scale 40 includes a shaft-shaped main scale 41 and a detection head 42. The main scale 41 is provided in parallel to the probe shaft 35 to extend vertically. The detection head 42 detects the vertical movement positions of the probes 37 and 38 based on the amount of vertical movement of the main scale 41. The upper end of the main scale 41 is find to the holding member 33, and the lower end thereof is fixed (or held) to the bracket 39.

The detection head 42 is held by the holding member 33. The linear scale 40 is also of a magnetic or optical type similar to the aforementioned linear scale 24.

As shown in FIGS. 6 to 8, a coil spring 43 biasing the probe shaft 35 upward is provided between the bracket 39 and horizontal plate (bottom plate) 31. Furthermore, an engagement shaft 44 is attached to the lower end of the probe shaft 36. The engagement shaft 44 is placed above the bracket 39 and is perpendicular to the probe shaft 35.

On the horizontal plate (bottom plate) 31, as shown in FIG. 6, a U-shaped bracket 45 is fixed. Both ends of a supporting shaft 46 are held by opposite walls 45a and 45a of the bracket 45 so as to rotate around the axis line. A holding lever 47 is fixed to the supporting shaft 46 and is caused to abut on upper part of the engagement shaft 44.

A tension coil spring 48 for pulling down the holding lever 47 is provided between the holding lever 47 and horizontal plate 31. Tension spring force of the tension coil spring 48 is set larger than spring force of the coil spring 43.

A vertical position control lever 49 is fixed on the supporting shaft 46. The vertical position control lever 49 is used to control the position to which the engagement shaft 44 is raised by the holding lever 47 and used to set positions to which the probe shaft 35, lens frame probe 37, and lens shape probe 36 are raised. The vertical position control lever 49 extends in a same direction as the holding lever 47 extends.

Below the vertical position control lever 49, an actuator motor 50 is provided. The actuator motor 50 includes a motor body 50a fixed on the horizontal plate 31; and a shaft 51 which protrudes upward from the motor body 50a and includes an axis line in parallel to the probe shaft 35. The vertical position control lever 49 is caused to abut on the upper end of the shaft 51 by the tension spring force of the tension coil spring 48.

Here, the actuator motor 50 is also a pulse motor. The actuator motor 50 is configured to operate forward to advance the shaft 51 upward and operate backward to move the shaft 51 downward.

The coil spring 43, supporting shaft 46, holding lever 47, tension coil spring 48, vertical position control lever 49, actuator motor 50, and the like constitute a mechanism of raising the probes 37 and 38.

<Control Circuit>

Figure 10B:
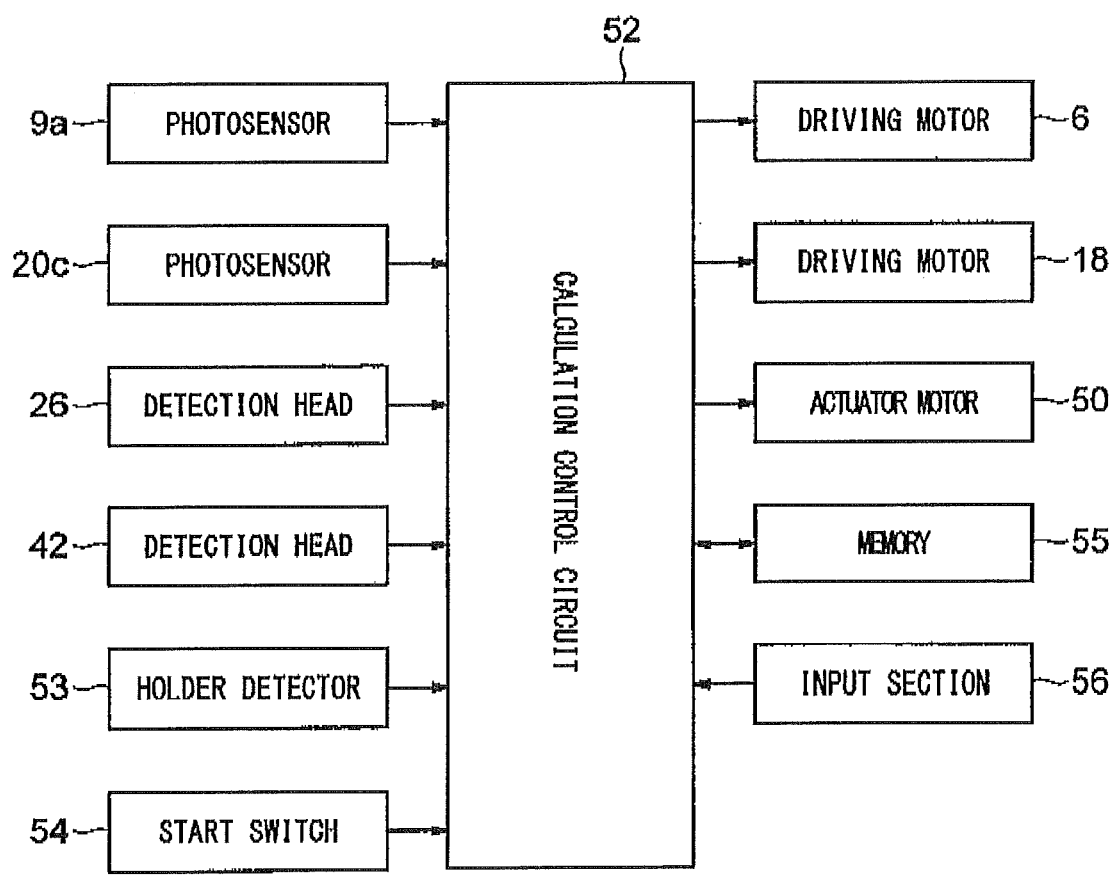
FIG. 10B is a control circuit diagram of the spectacle lens frame shape measuring apparatus shown in FIG. 1.
Figure 11:
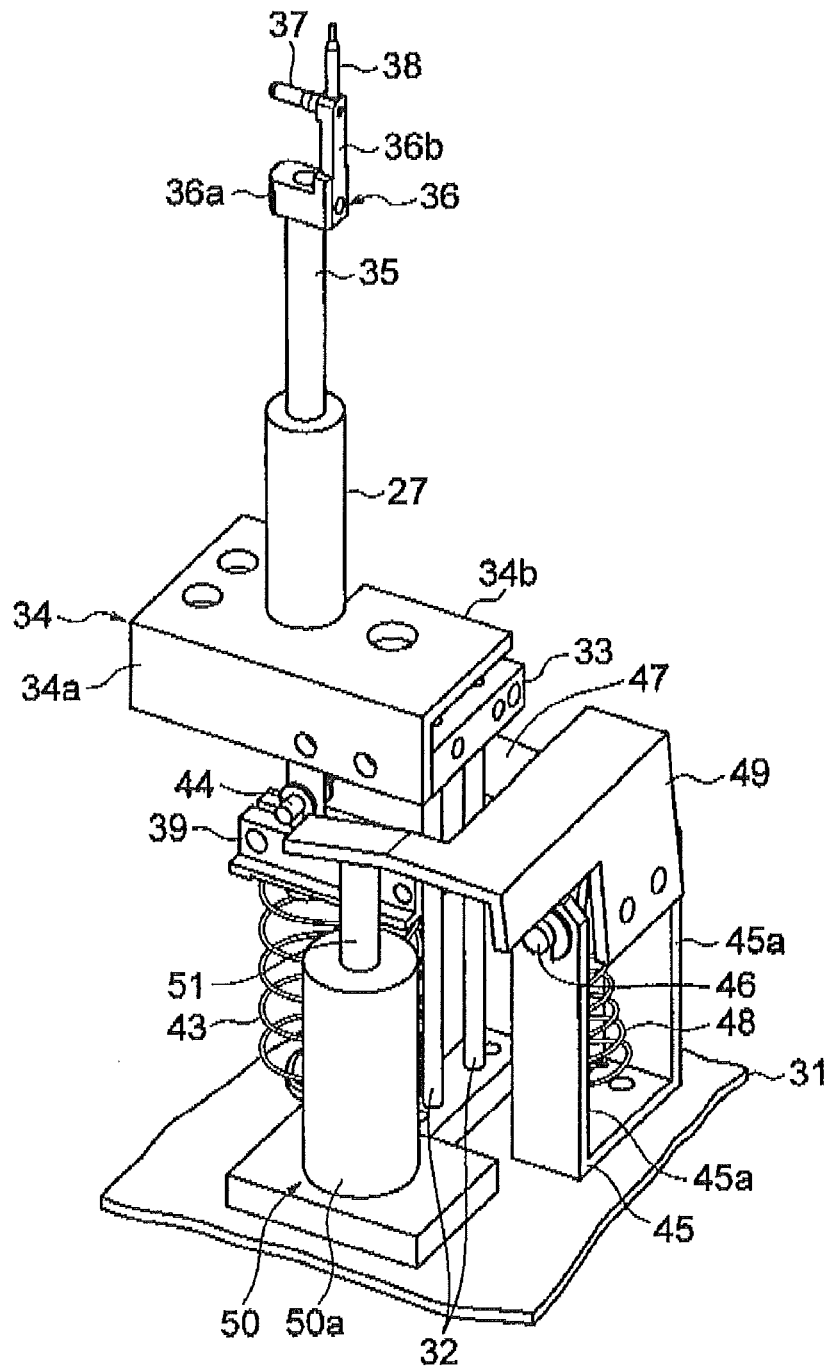
FIG. 11 is a perspective view for explaining an operation of the probe elevating mechanism of FIG. 6.

As shown in FIG. 10B, an origin detection signal from the aforementioned photosensor (origin detector) 9a, an origin detection signal from the photosensor (origin detector) 20c, a movement amount detection signal (position detection signal) from the detection head 26 of the linear scale 24, a movement amount detection signal (position detection signal) from the detection head 42 of the linear scale 40, and the like are inputted to a calculation control circuit (a calculation controller, a control circuit) 52. The calculation control circuit 52 is configured to operate and control the drive motors 6 and 18 and actuator motor 50.

Moreover, as described later, the calculation control circuit 52 corrects the results of shape measurement of spectacle lens frames with a large curved angle according to the axial shift amount or angle, and outputs the corrected shape measurement result.

A holder detector 53 is provided on a side wall of one of the slide frames 3 and 3 as shown in FIG. 1A. The holder detector 53 is composed of a micro switch or the like. A detection signal from the holder detector 53 is inputted to the calculation control circuit 52 as shown in FIG. 10B.

In FIG. 10B, a reference numeral 54 denotes a start switch for starting measurement; 55, a memory connected to the calculation control circuit 52; and 56, an input section connected to the calculation control circuit 52.

The input section 56 is an interface through which an operator inputs various values including a curved angle θ1 of spectacle lens frames, an inclination angle θ2 of a lower or upper rim, an inclination amount h of the upper or lower rim, a length B of the spectacle lens frames in a spectacle height direction and selection operations.

(Measurement of Spectacle Lens Frame with Large Curved Angle)

In the spectacle lens frame shape measuring apparatus having the aforementioned configuration, when the curved angle θ1 of the spectacle lens frame is comparatively small (less than about 15 degrees), the curved angle θ1 does not significantly affect the result of shape measurement. However, if the curved angle θ1 is larger than 15 degrees, for example, the difference between a distance L1 between the right and left upper holding bars 3b4 and 3b4 and a distance L2 between the right and left lower holding bars 3b6 and 3b6 has a great influence on and thus significantly affects the result of shape measurement.

Figure 35:
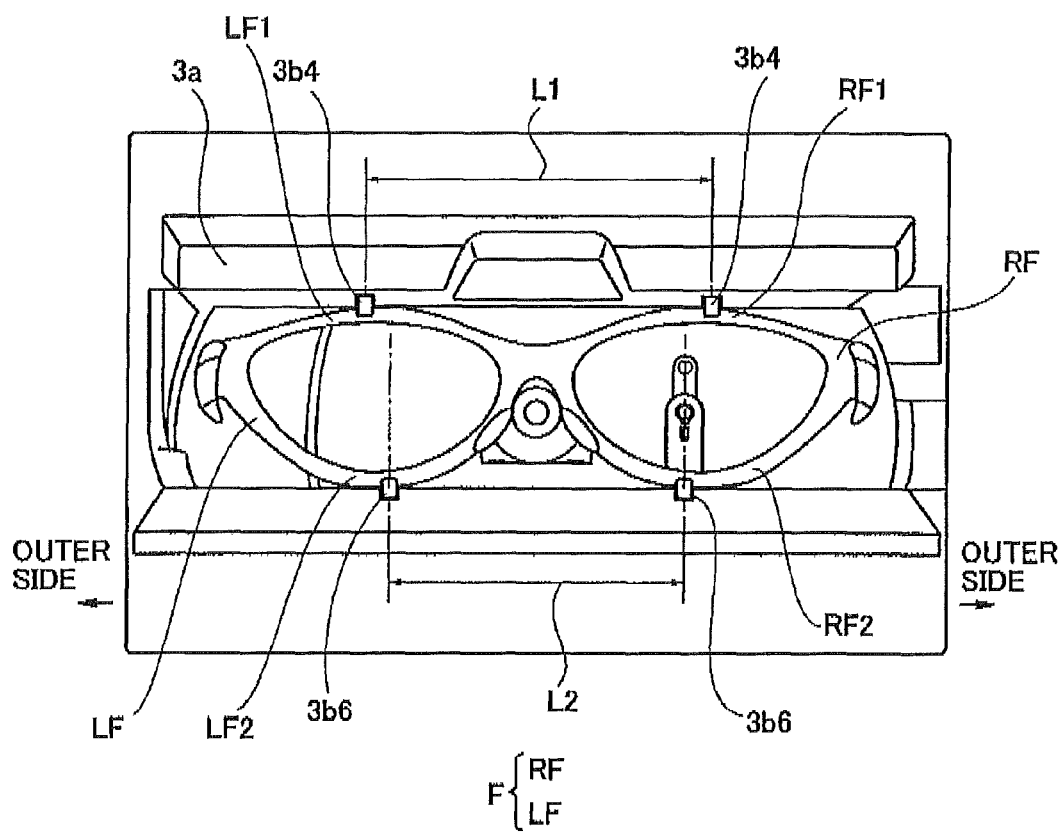
FIG. 35 is a plan view showing a difference between positions where upper and lower holding bars hold the spectacle lens frame in the spectacle lens frame shape measuring apparatus of this embodiment.

Specifically, in the spectacle lens frame shape measuring apparatus of this embodiment, as shown in FIG. 35, if L1=85 mm and L2=70 mm, for example, the upper holding bars 3b4 and 3b4 hold a spectacle frame F at places on the outside of the places at which the lower holding bars 3b6 and 3b6 hold the spectacle frame F in the spectacle width direction.

Figure 36:
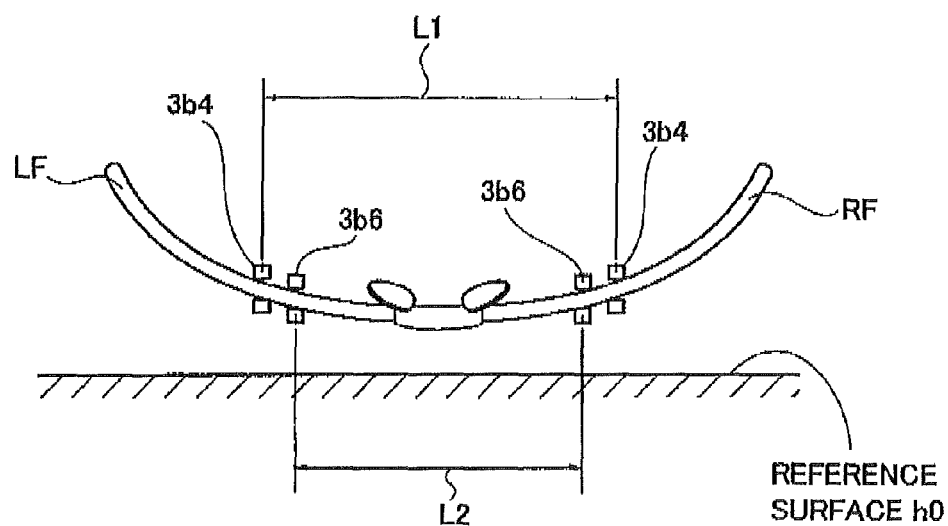
FIG. 36 is a front view illustrating that height of the spectacle lens frame from a referential surface increases toward outer edges in the right-left direction corresponding to the slope of the curved angle.
Figure 37A:
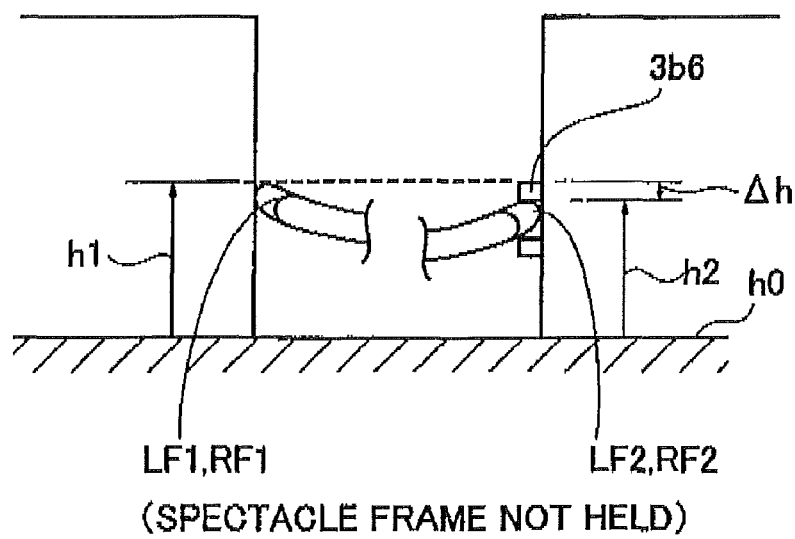
FIGS. 37A and 37B are side views showing heights of a portion of an upper rim of the spectacle lens frames held by an upper holding bar and a portion of a lower rim held by a lower holding bar.

When the curved angle θ1 of spectacle lens frames RF and LF is not less than 15 degrees, for example, as shown in FIG. 36, a height h from a reference surface h0 increases toward the outside in the spectacle width direction of the spectacle lens frames RF and LF corresponding to the gradient of the curved angle θ1. Accordingly, as shown in FIG. 36 and FIG. 37A showing a spectacle frame not yet held, upper rims RF1 and LF1 are positioned higher than the height h2 of the lower rims RF2 and LF2 held by the lower holding bars 3b6 and 3b6 (h1>h2).

Note that, the aforementioned height difference between the upper holding bars 3b4 and 3b4 and the lower holding bars 3b6 and 3b6 is assumed for the sake of explanatory convenience. In practice, the upper holding bars 3b4 and 3b4 and lower holding bars 3b6 and 3b6 are fixed at a same height (for example, the position at a height h2) and cannot move in a vertical direction. In other words, FIG. 37A assumes a conventional spectacle lens frame shape measuring apparatus in which the upper holding ban 3b4 and 3b4 are arranged on the respective extensions of the lower holding bars 3b6 and 3b6.

Figure 37B:
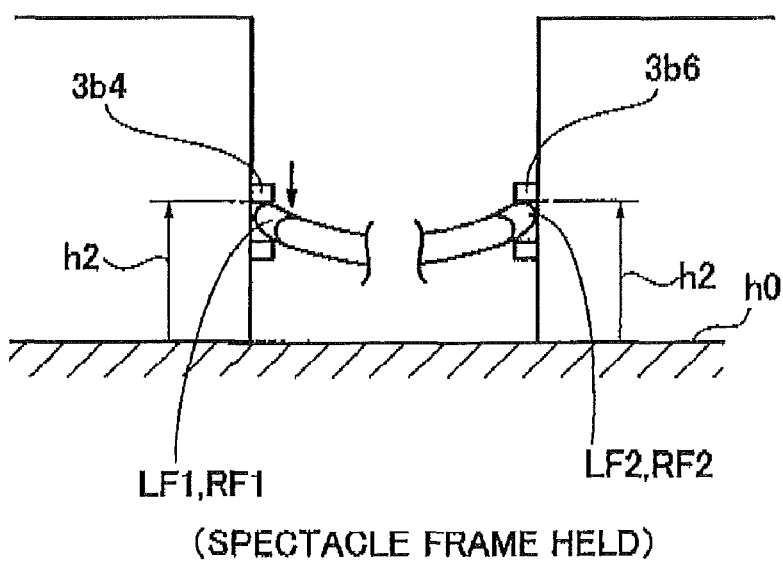

However, in a state where the spectacle lens frames RF and LF are held, the upper holding bars 3b4 and 3b4 and lower holding bars 3b6 and 3b6 are set at the same height h2 as shown in FIG. 37B. Actually, therefore, the spectacle lens frames RF and LF are held with the upper rims RF1 and LF1 pressed down (inclined) by a difference Δh (=h1−h2) in holding height according to the curved angle and the difference between the distance between the upper holding bars and the distance between the lower holding bars (ΔL=L1−L2).

Figure 39A:
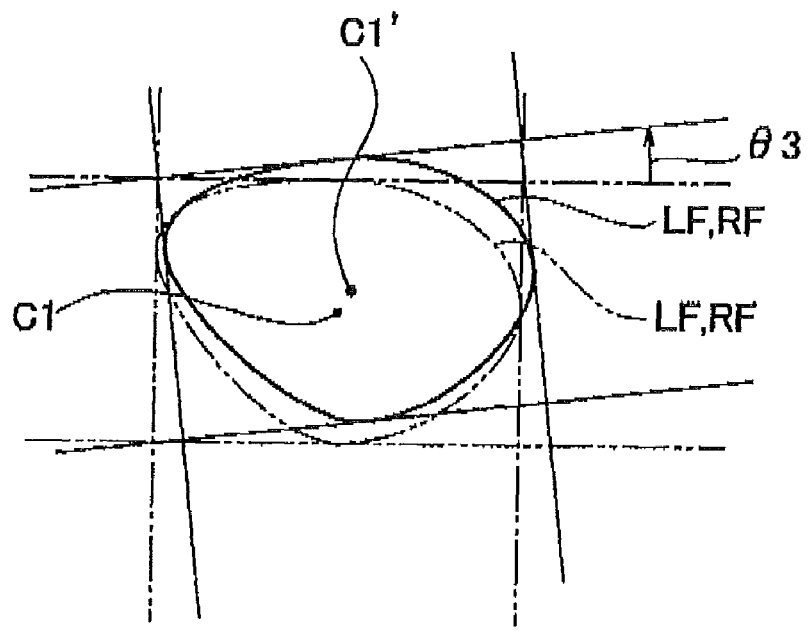
FIGS. 39A and 39B are views showing an axial shift due to the inclination of the spectacle lens frame, FIG. 39A showing a state where a geometrical central position of the spectacle lens frame indicated by dashed double dotted lines is shifted from an original geometrical central position of a not-inclined, spectacle lens frame (solid lines), and FIG. 39B showing a state where the shape of the spectacle lens frame indicated by dashed double dotted lines is tilted at the deviation angle with the geometrical central position thereof being in coincident with the original geometrical central position of the not-inclined spectacle lens frame (solid lines).
Figure 39B:
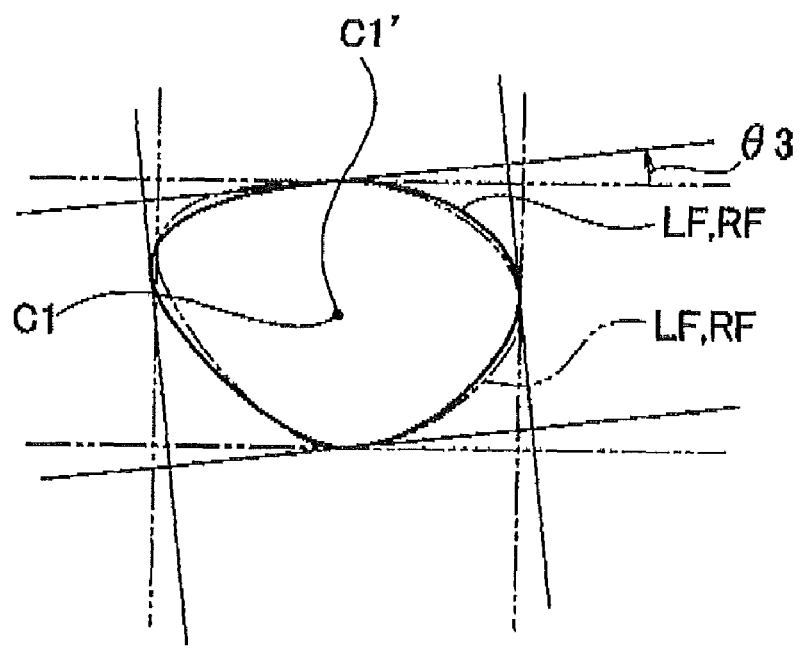

When the spectacle lens frames RF and LF are swung by the holding device swinging mechanism for shape measurement of the spectacle lens frame with the upper rims RF1 and LF1 inclined and held at a position indicated by solid lines in FIG. 38, instead of the position indicated by dashed double dot lines in the same drawing, because of the influence of the inclination of the upper rims RF1 and LF1, the result of the measurement with the upper rims RF1 and LF1 inclined as indicated by solid lines of FIGS. 39A and 39B produces an axial shift amount or angle θ3 with respect to the measurement result obtained with the upper rims RF1 and LF1 not inclined as indicated by the dashed double dot lines of the same drawings.

Accordingly, the shape of the spectacle lens frames RF and LF may not be obtained with high accuracy.

The inventors of this application attempted to quantitatively calculate the axial shift angle θ3 by the following experiments.

(Verification Experiments)

First, in the spectacle lens frame shape measuring apparatus of the aforementioned embodiment, the distance L2 between the lower holding bars 3b6 and 3b6 on a reference side is 70 mm, and the distance L1 between the upper holding bars 3b4 and 3b4 on a brow side is 85 mm. In such a spectacle lens frame shape measuring apparatus, a to-be-corrected tool with the curved angle θ1 was chucked.

The to-be-corrected tool was therefore inclined and chucked. Examination was made for the influence of the inclination on the distance FPD between geometric centers of the right and left lens frames RF and LF.

The to-be-corrected tool was a template (pattern) used instead of the spectacle lens frames. The to-be-corrected tool was not a template (pattern) corresponding to a single lens frame but a template corresponding to lens frames for right and left eyes. The tool was composed of a single plate with a predetermined size equivalent to a left eye lens frame, a bridge connecting the right and left eye lens frames (a part including nose pads), and a right eye lens frame. The tool was bent so that a part of the plate corresponding to the right eye lens frame and a part of the plate corresponding to the left eye lens frame may have an inclination angle of 5, 10, 15, or 20 degrees, for example, while a part of the plate with a width corresponding to the bridge was set horizontal.

According to the above examination, the height difference h between the chucking positions in the upper and lower rims (Δh in FIG. 37) is calculated based on FIGS. 36 and 37A and FIGS. 41A and 41B:

$$h = \{(L1 - L2)/2\} \times \tan\theta1 \qquad (3)$$
$$= 7.5 \times \tan\theta1$$

(θ1: curved angle (tilt angle) [°]).

Next, as shown in FIG. 37B, the upper and lower rims are held, so that the height difference h (Δh) may be 0. At this time, the upper rim LF1 (RF1) is inclined with respect to the lower rim LF2 (RF2) to produce the inclination angle θ2, which is defined by a value B of the height size (B size) of the spectacle lens frame LF (RF).

The inclination angle θ2 due to the difference in chucking position is calculated as follows:

$$\theta2 = \tan^{-1}\{(h1-h2)/B\} \qquad (1)$$

(θ2: inclination angle [°], B: B size [mm]).

Next, examination was made for the relationship between the inclination angle θ2 and axial shift angle θ3.

First, a 20-degree tool with the curved angle θ1=20° (spectacle width (A size): A, spectacle height (B size): B) was chucked, and the shape thereof was projected onto a horizontal plane with the right eye part swung to 20°. When the 20-degree tool was chucked, the inclination angle θ2 was found to be 2.232° from the examination result. In other words, the 20-degree tool was swung by 20° with the inclination angle θ2 set to 2.232°.

Figure 42:
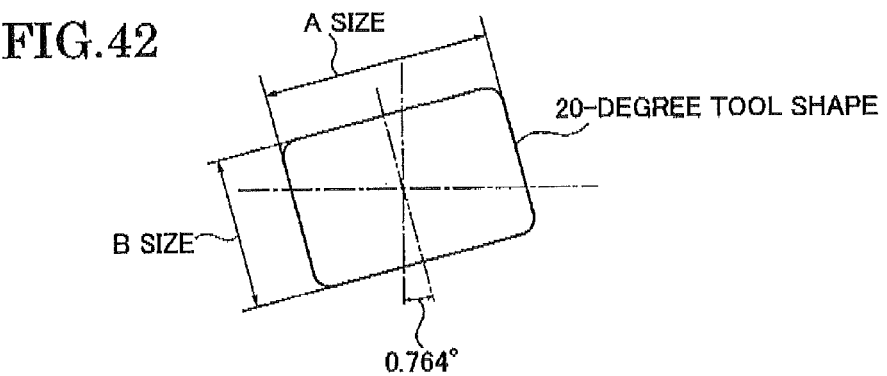
FIG. 42 is a view explaining the axial shift.

The projected shape of the 20-degree tool was shown in FIG. 42, in which only an axial shift occurred without a change in profile of the tool itself.

Next, the 20-degree tool was swung by 20° with the in inclination angle θ2 varying from 1 to 10° by 1°, and the axial shift angle θ3 of the shape thereof projected on the horizontal plane was examined.

Figure 43:
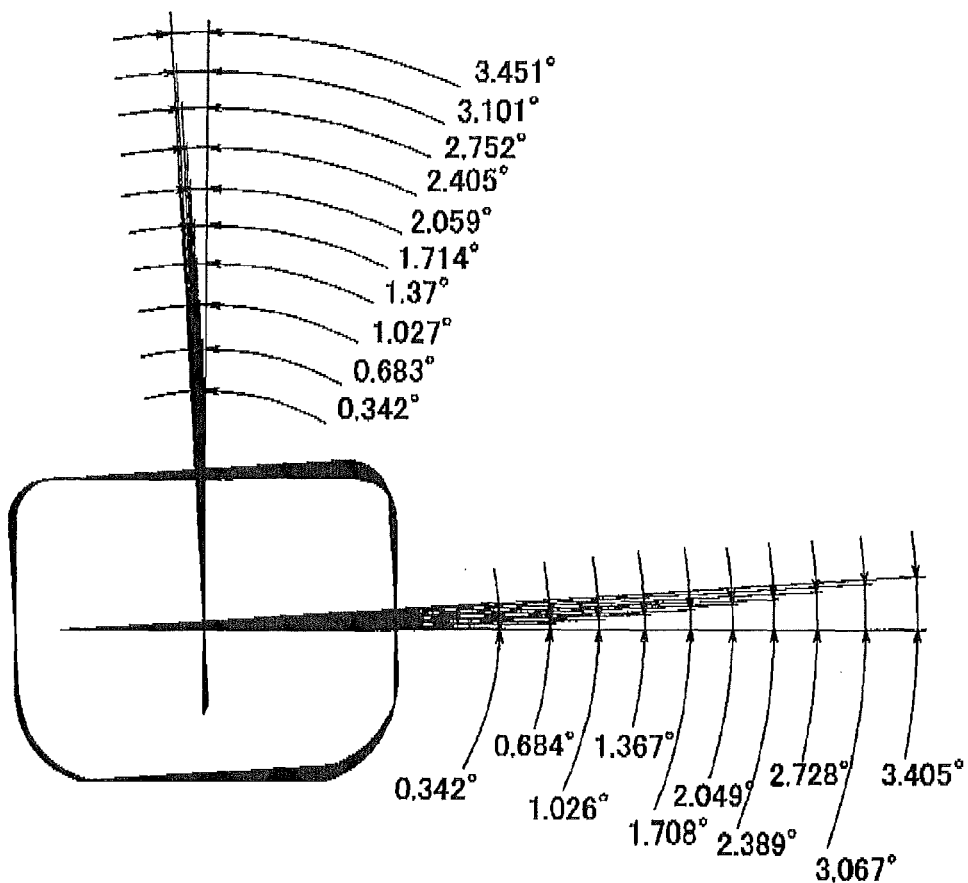
FIG. 43 is a schematic view showing the axial shift angle of a shape projected on a horizontal plane with the inclination angle being varied.

The results thereof are shown in Table 1 and FIG. 43.

TABLE 1

|  | Inclination angle | | | | | | | | | | |
| --- | --- | --- | --- | --- | --- | --- | --- | --- | --- | --- | --- |
|  | 0° | 1° | 2° | 3° | 4° | 5° | 6° | 7° | 8° | 9° | 10° |
| Axial shift amount | 0° | 0.342° | 0.683° | 1.027° | 1.37° | 1.714° | 2.059° | 2.405° | 2.752° | 3.101° | 3.451° |

These results revealed that the inclination angle θ2 and axial shift angle θ3 had a linear relationship.

Next, instead of the 20-degree tool, each of a 5-degree tool, a 10-degree tool, and a 15-degree tool was swung by an angle corresponding to the curved angle θ1 thereof with the inclination angle θ2 fixed to 1°, and the shapes of the tools projected on the horizontal plane were examined in terms of the axial shift angle θ3.

Specifically, values of the axial shift angle θ3 were obtained when the 5-degree tool was swung by 5° with the inclination angle θ2 set to 1°, when the 10-degree tool was swung by 10° with the inclination angle θ2 set to 1°, and when the 15-degree tool was swung by 15° with the inclination angle θ2 set to 1°.

The results thereof are shown in Table 2.

TABLE 2

| Curved angle | 15° | 10° | 5° |
| --- | --- | --- | --- |
| Inclination angle | 1° | 1° | 1° |
| Axial shift amount | 0.259° | 0.174° | 0.087° |

These results revealed that the curved angle θ1 of each tool and the axial shift angle θ3 also had a linear relationship.

From the aforementioned examination results, the following formula is established. Here, a constant 0.0174 in the formula is calculated from the results of Table 2.

$$\theta 3 = 0.0174 \times \theta 1 \times \theta 2$$
$$= 0.0174 \times \theta 1 \times \tan^{-1} \cdot \{(7.5 \times \tan\theta 1)/B\}$$

Figure 44:
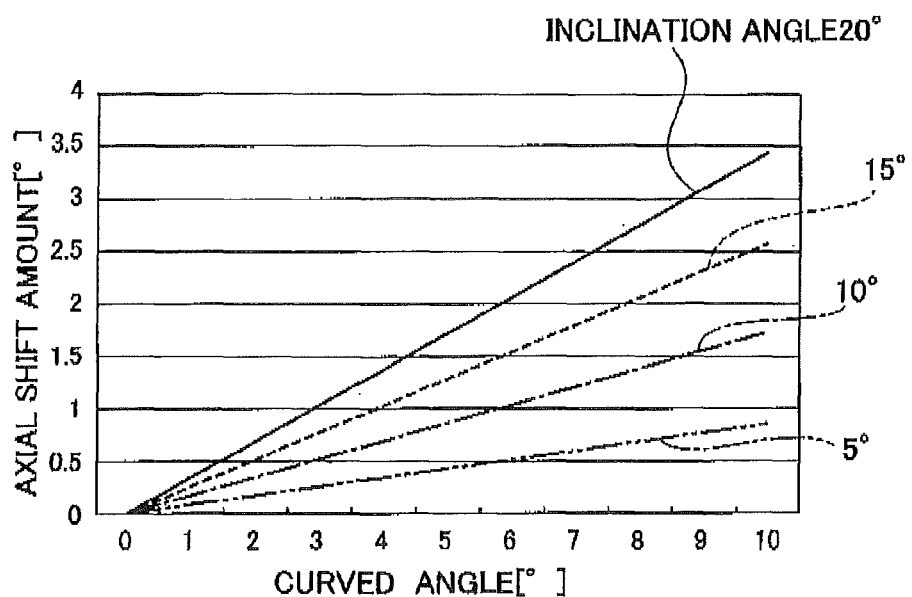
FIG. 44 is a graph showing a correspondence relationship between the inclination angle and axial shift angle with respect to the curved angle.

This result is expressed in a graph shown in FIG. 44.

Moreover, the above formula can be generalized into a general formula shown as the following formula (4).

$$\theta 3 = \alpha \times \theta 1 \times \tan^{-1}\{(\beta \times \tan \theta 1)/B\} \quad (4)$$

($\alpha$ and $\beta$ are constants.)

The above-described examination results revealed that the axial shift amount or angle $\theta 3$ of the spectacle lens frames RF and LF can be calculated based on the curved angle $\theta 1$ of the spectacle lens frames RF and LF and the inclination angle $\theta 2$ of the upper rims RF1 and LF1 or lower rims RF2 and LF2.

When the inclination angle $\theta 2$ cannot be directly obtained, the inclination angle $\theta 2$ can be calculated based on the inclination amount h of the upper rims RF1 and LF1 or lower rims RF2 and LF2 and the vertical length B of the spectacle lens frames RF and LF (B size). The axial shift amount or angle $\theta 3$ can be calculated based on the thus obtained inclination angle $\theta 2$ and the curved angle $\theta 1$.

Furthermore, when the inclination amount h cannot be directly obtained, the inclination amount h can be calculated based on the curved angle $\theta 1$ and a constant $\beta(=(L1-L2)/2)$ according to the difference (L1-L2) between the distance between the horizontal holding positions of the upper holding bars 3*b*4 and 3*b*4 and the distance between the horizontal holding positions of the lower holding bars 3*b*6 and 3*b*6. The axial shift amount or angle $\theta 3$ can be calculated based on the thus-obtained inclination amount h or inclination angle $\theta 2$ and the curved angle $\theta 1$.

The calculation control circuit 52 in the spectacle lens frame shape measuring apparatus of this embodiment calculates the aforementioned axial shift amount or angle $\theta 3$ according to the values of the curved angle $\theta 1$, inclination angle $\theta 2$, inclination amount h, vertical length B of the spectacle lens frames RF and LF, constant $\beta$ depending on the difference between the distance between the holding positions of the upper holding bars 3*b*4 and 3*b*4 and the distance between the holding positions of the lower holding bars 3*b*6 and 3*b*6, and constant $\alpha$. The shape of the spectacle lens frames RF and LF calculated by the calculation control circuit 52 based on the results detected by the lens frame probe 37 can be corrected according to the axial shift amount or angle $\theta 3$ obtained as described above. Thereby, the shape of the spectacle lens frames RF and LF can be obtained with high accuracy.

The values of the curved angle $\theta 1$, inclination angle $\theta 2$, inclination amount h, vertical length B of the spectacle lens frames RF and LF, and constants $\alpha$ and $\beta$ should be inputted into the input section 56 connected to the calculation control circuit 52 (see FIG. 10B) by a user. The values thus inputted into the input section 56 are read by the calculation control unit 52, which then calculates the aforementioned axial shift amount or angle $\theta 3$ and corrects the measured shape data.

Here, one of the measured and obtained spectacle lens frame shape data which is to be corrected is the distance FPD between the geometrical centers of the spectacle lens frames RF and LF. In addition, various types of data necessary for processing of the spectacle lenses can be also corrected.

For example, such various types of data to be corrected are a pupillary distance (PD), which is the distance between the centers of the spectacle wearer's pupils, an inset amount which is a distance between the geometric center of the spectacle lens frame RF or LF and the center of the spectacle wearer's right or left pupil, UP and DOWN values each of which is a distance between a line connecting the geometric centers of the spectacle lens frames RF and LF and the right or left pupil center (UP value: the line is above the wearer's pupils, DOWN value; the line is below the wearer's pupils), distances between the right and left pupil center and the respective lower rims RF2 and LF2, and the like.

The spectacle lens frame shape data may be corrected by previously measuring the curved angle and then adjusting the swing angle for measurement.

[Operation]

Next, a description is given of an operation of the thus-configured spectacle lens frame shape measuring apparatus of this embodiment.

(I) Measurement of Lens Frame Shape

Before measurement of the shape of lens frames of spectacles or measurement of the shape of a lens such as a demo lens is performed by the spectacle lens frame shape measuring apparatus, the upper end of the shaft 51 of the actuator motor 50 is positioned at the bottom end (a bottom dead point) as shown in FIGS. 6 to 8. At this position, the holding lever 47 is biased by the tension coil spring 48 having stronger spring force than that of the coil spring 43 so as to rotate downward around the supporting shaft 46. The holding lever 47 therefore presses down the probe shaft 35 through the engagement shaft 44. The lens frame probe 37 and lens shape probe 36 are thus positioned at the lowest end.

In the case of performing the measurement of the shape of the lens frames of spectacles with the spectacle lens frame shape measuring apparatus in the aforementioned state, as disclosed in Japanese Patent Application Publication No. H10-828992, for example, a spectacle frame MF including right and left lens frames LF and RF in FIG. 7 is placed between the slide frames 3 and 3 of FIG. 1A (the spectacle frame MF is not shown in FIG. 1A), and the lens frames LF and RF are sandwiched by the holding bars 3*b*1 and 3*b*2 as shown in FIG. 7. This is the same as that of Japanese Patent Application Publication No. H10-328992.

The lens frame LF (RF) held between the holding bars 3*b*1 and 3*b*2 is set above the lens frame probe 37 before the measurement starts as shown in FIG. 7. Specifically, the lens frame probe 37 is positioned at an initial position ($\alpha$) below the lens frame LF (RF). Moreover, as shown in FIG. 7, the lens frame probe 37 and attachment hole probe 38 are positioned so as to correspond to an initial position (i) located substantially in the center of the lens frame LF (RF) held between the holding bars 3*b*1 and 3*b*2.

At this position, the photosensor 9*a* detects the origin of horizontal rotation of the rotation base 9 based on the light beam from the light emitter 9*b*, and the origin sensor 20*a* detects the origin of movement of the slider 15.

Even if the lens frame three-dimensionally curves, the part of the lens frame held by the holding bars 3*b*1 and 3*b*2 is set lower than the other part. At the held part, a lens fitting groove Ym of the lens frame Lf (RF) has a set height, which is a lens frame shape measurement start position G.

When the start switch 54 of FIG. 10B is turned on at this state, the calculation control circuit 52 causes the actuator motor 50 to run forward and advance (raise) the shaft 51 upward from the position shown in FIGS. 6 to 8 to the position shown in FIGS. 11 to 14 by a predetermined amount. At this time, the shaft 51 raises the free end of the vertical position control lever 49 upward by a predetermined amount against spring force of the tension coil spring 48 so as to integrally rotate the vertical position control lever 49 and supporting shaft 46.

The holding lever 47 is then rotated integrally with the supporting shaft 46, and the free end of the holding lever 47 is raised upward by a predetermined amount. Upon the free end of the holding lever 47 being raised, the engagement shaft 44 is raised by spring force of the coil spring 43 following the free end of the holding lever 47, and the probe shaft 35 is thereby raised by a predetermined amount.

The amount of rise of the prove shaft 35, or the amount by which the shaft 51 is advanced (raised) by the actuator motor 50 is an amount L by which the top of the lens frame probe 37 rises from the initial position (α) of FIG. 7 to a height (β) corresponding to the height of the lens fitting groove Ym at the aforementioned shape measurement start position G.

Figure 12:
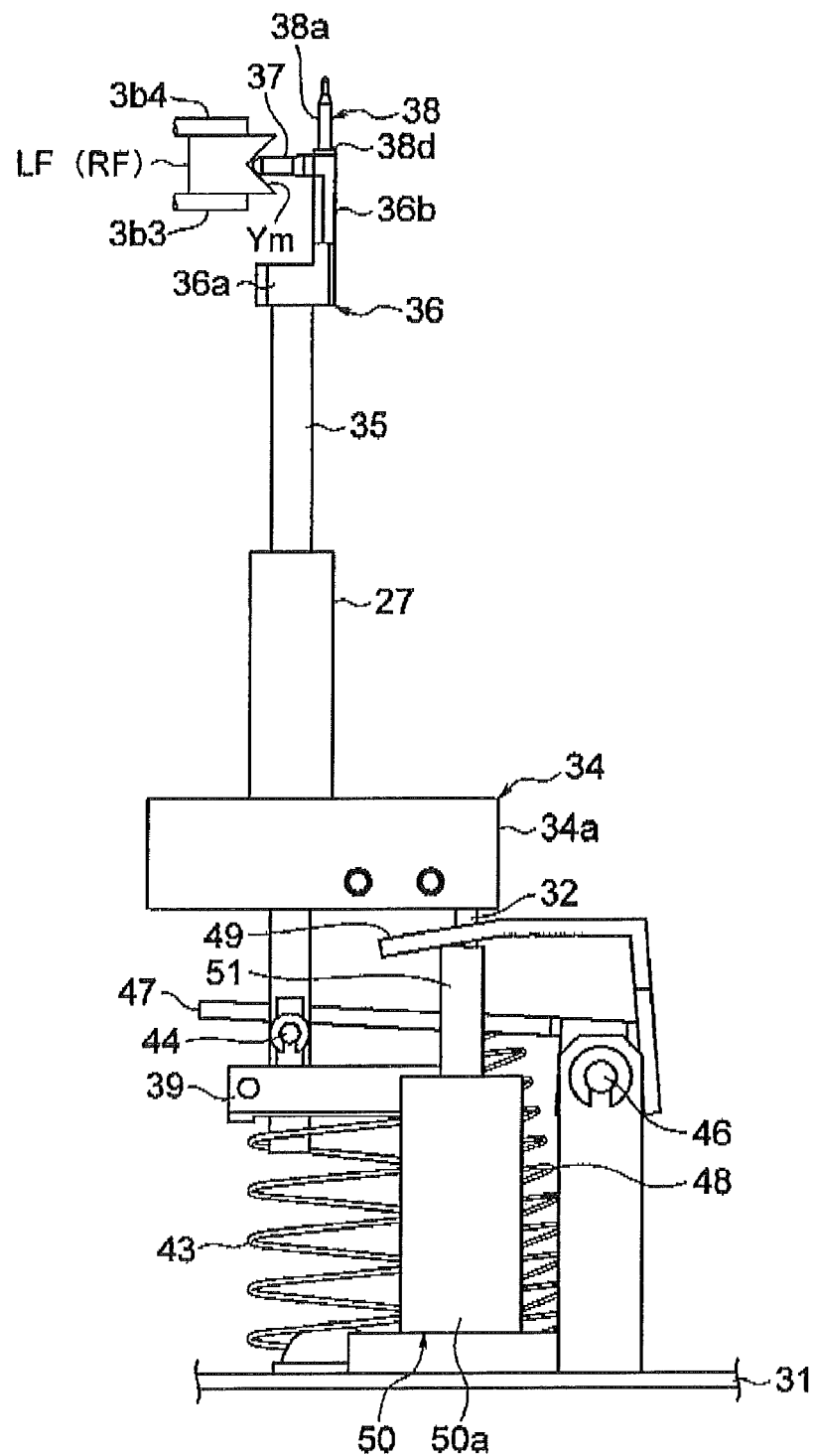
FIG. 12 is an explanatory view for measurement of the lens frames by the elevating mechanism of FIG. 11.

The calculation control circuit 52 then drives and controls the driving motor 18 to rotate the driving pulley 19 and move the slider 15 along the guiderail 14 with the wire 20 of FIGS. 2 and 50. At this time, the slider 15 is moved in a direction of an arrow A1 in FIG. 7. The movement is performed until the tip of the lens frame probe 37 is abutted on the lens fitting groove Ym at the shape measurement starting position G as shown in FIG. 12. Moreover, in the state where the tip of the lens frame probe 37 is in contact with the lens fitting groove Ym, the lens frame probe 37 is brought into an elastic contact with the lens fitting groove Ym by the spring force of the coil spring 23. In this state, the driving motor 18 is stopped.

When the tip of the lens frame probe 37 comes into contact with the lens fitting groove Ym, the load on the driving motor 18 increases, and the current flowing the driving motor 18 increases. By detecting this change in current, the calculation control circuit 52 can detect that the tip of the lens frame probe 37 comes into contact with the lens fitting groove Ym and stop the driving motor 18.

Figure 15:
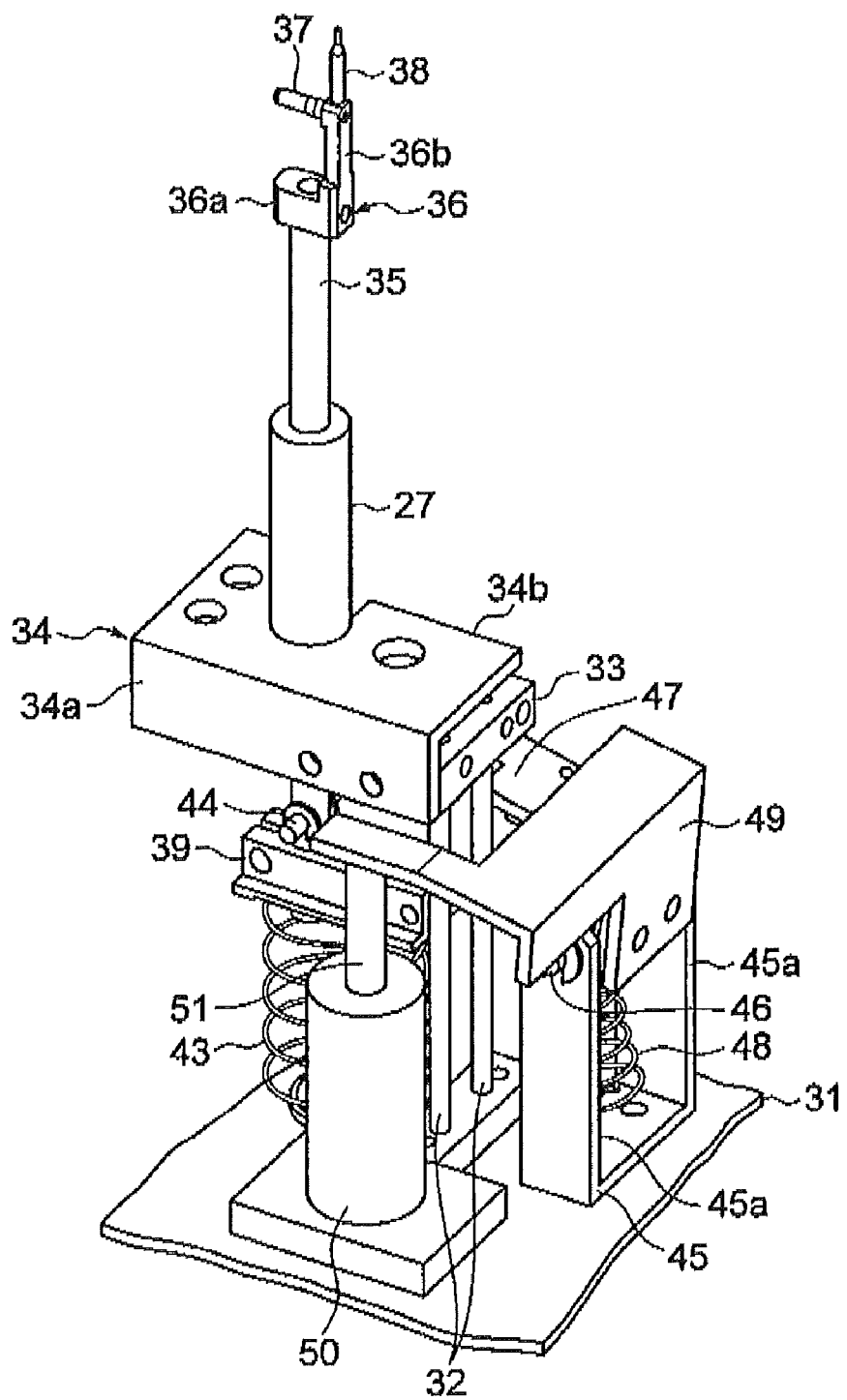
FIG. 15 is a perspective view for explaining an operation of the probe elevating mechanism of FIG. 6.
Figure 16:
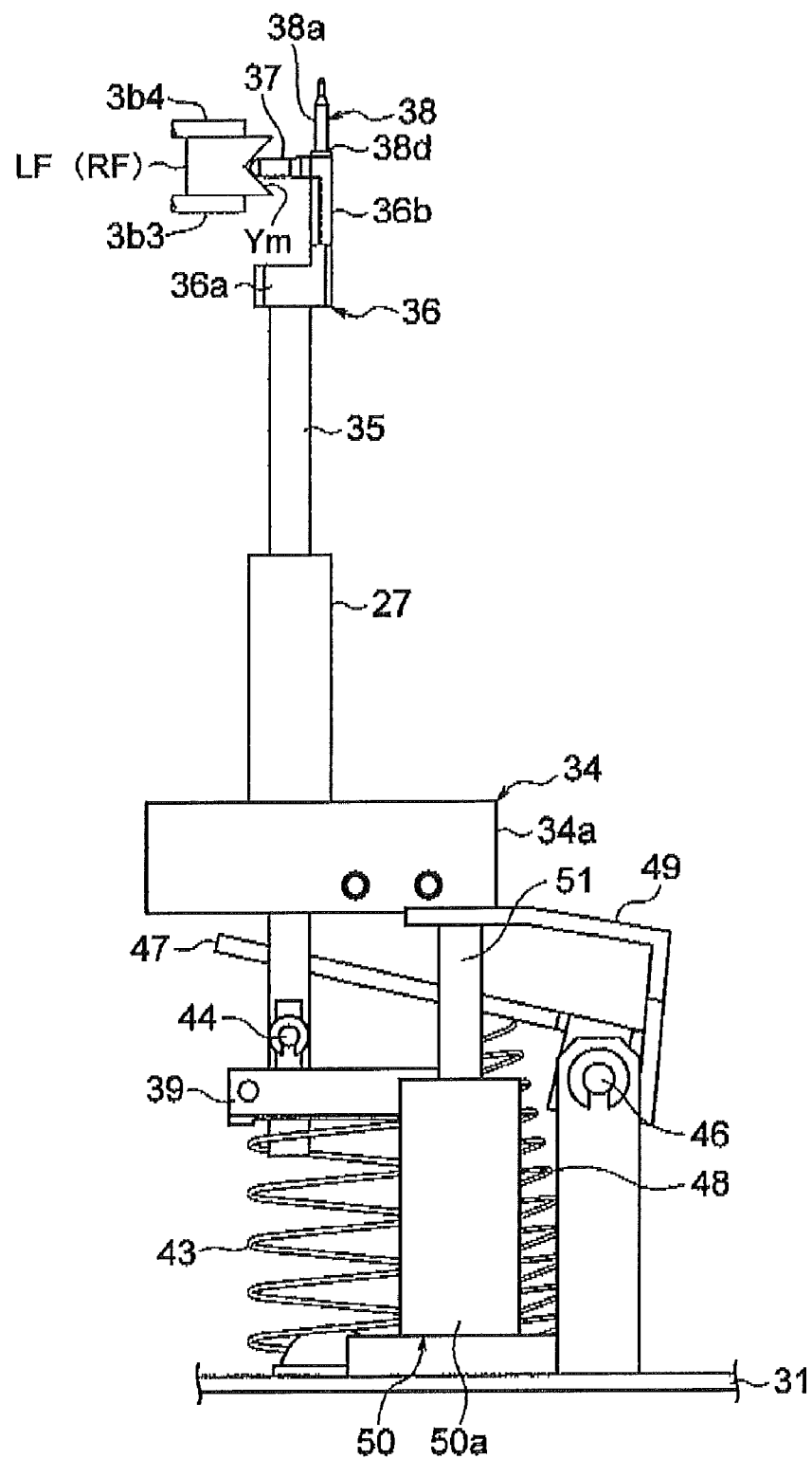
FIG. 16 is an explanatory view for measurement of the lens frames by the elevating mechanism of FIG. 15.
Figure 17:
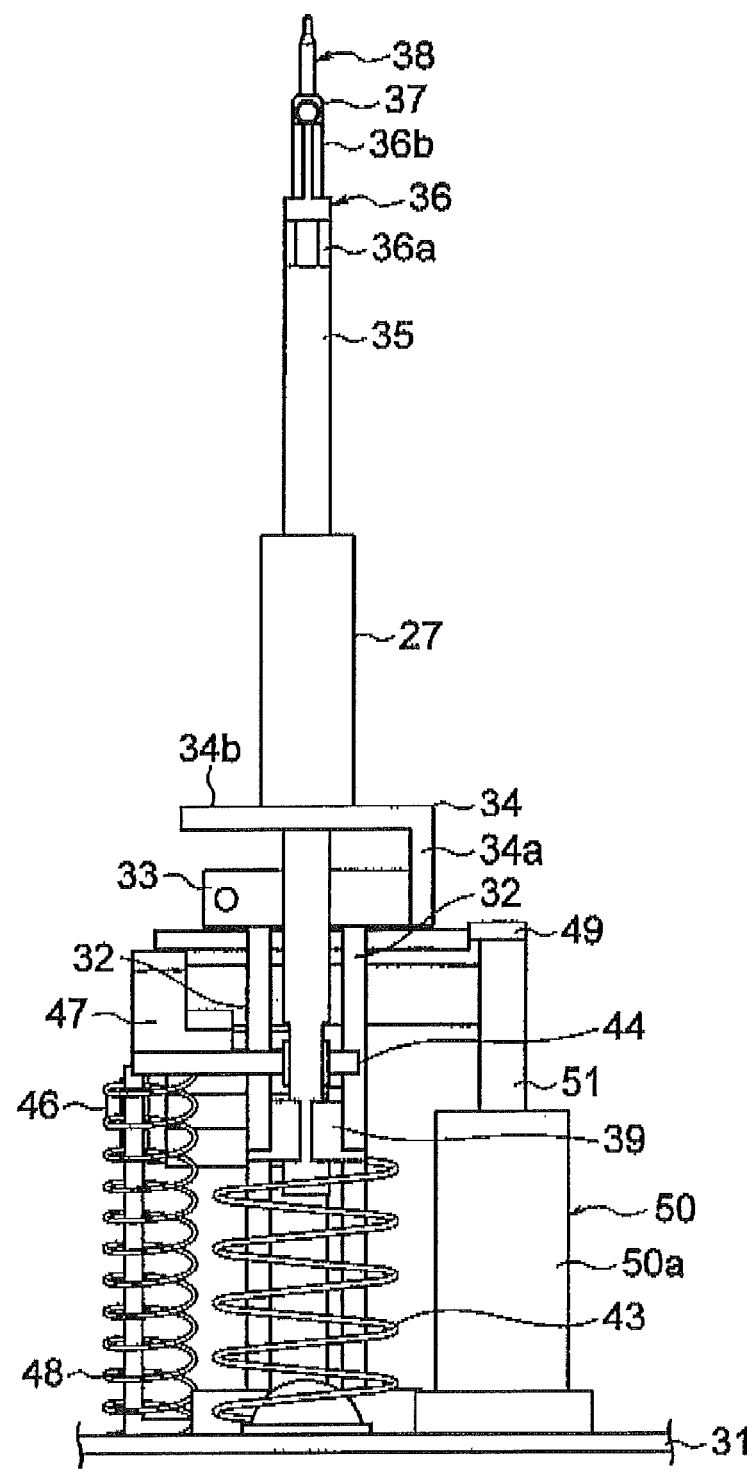
FIG. 17 is a left side view of FIG. 16.

Thereafter, the calculation control circuit 52 causes the actuator motor 50 to run forward and advances (raises) the shaft 51 upward from the position in FIGS. 11 to 14 to the position in FIGS. 15 to 17 by a predetermined amount. At this time, the shaft 51 raises the free end of the vertical position control lever 49 upward against the spring force of the tension coil spring 48 by a predetermined amount to rotate the vertical position control lever 49 integrally with the supporting shaft 46.

The holding lever 47 is then rotated integrally with the supporting shaft 46, and the free end thereof is raised upward by a predetermined amount and is separated from the engagement shaft 44 by a predetermined amount. The probe shaft 35 can therefore move vertically.

Next, the calculation control circuit 52 drives and controls the driving motor 6 to cause the driving motor 6 to run forward. The rotation of the driving motor 6 is transmitted through the pinion 7 and timing belt 8 to the driven gear 5, which is then horizontally rotated integrally with the rotation base 9 (see FIG. 5B).

Along the rotation of the rotation base 9, the slider 15 and a number of parts provided for the slider 15 are horizontally rotated integrally with the rotation base 9, and the tip of the lens frame probe 37 slides and moves along the lens fitting groove Ym. At this time, the slider 15 moves along the guiderail 14 integrally with the lens frame probe 37. Accordingly, the amount of movement of the slider 15 from the origin position of the slider 15 is equal to the amount of movement of the tip of the lens frame probe 37. This amount of movement is calculated from the detection signal of the detection head 26 of the linear scale 24 by the calculation control circuit 52.

Moreover, the dimension (length) between the center of the probe shaft 35 and the tip of the lens frame probe 37 is known. Accordingly, by previously setting the distance between the rotational center of the rotation base 9 and the tip of the lens frame probe 37 when the slider 15 is located at its origin, a change in distance between the rotational center of the rotation base 9 and the tip of the lens frame probe 37 as the slider 15 moves along the guiderail 14 can be a radius $\rho i$.

Accordingly, the rotation angle $\theta i$ of the rotation base 9 due to the rotation of the driving motor 6 is calculated from the number of driving pulses of the driving motor 6, and the radius $\rho i$ corresponding to the calculated rotation angle $\theta i$ is obtained, thus obtaining the circumferential shape of the lens fitting groove Ym of the lens frame LF (RF) (lens frame shape) as lens frame shape information $(\theta i, \rho i)$ in the polar coordinate system.

Moreover, while the tip of the lens frame probe 37 slides and moves along the lens fitting groove Ym of the lens frame LF (RF) which is curved in the vertical direction, the curve in the vertical direction is obtained as an amount of vertical displacement based on the detection signal of the detection head 42 of the linear scale 40 by the calculation control circuit 52. This amount of vertical displacement is indicated by a vertical position Zi.

Accordingly, the lens frame shape of the lens frame LF (RF) can be calculated by the calculation control circuit 52 as three-dimensional lens frame shape information $(\theta i, \rho i, Zi)$. The thus-obtained three-dimensional lens frame shape information $(\theta i, \rho i, Zi)$ is stored in a memory 55 by the calculation control circuit 52.

In this embodiment, at the lens frame shape measurement, the motor 409 is caused to run forward or backward and moves the belt 408 wound around the driving skid 410 in the right or left direction as shown in FIG. 1F, thus swinging the entire slide frame 3 around the virtual axis 402 in the direction of the arrow D.

Moreover, for example, a highly curved frame for a +8 or more (up to +12) base curve lens, for example, is automatically inclined to prevent the feeler from being disengaged from the lens fitting groove of the frame and allow measurement of the bottom of the lens fitting groove. It is therefore possible to accurately measure also the frame PD.

Moreover, by swinging the entire slide frame 3 around the virtual axis approximated to the center of curvature of the curve of the frame, the frame for a +8 base curve lens can be horizontally held. Accordingly, the feeler can be accurately engaged with the lens groove, and the frame (lens frame) shape can be measured accurately.

In the spectacle lens frame shape measuring apparatus of this embodiment, when the curved angle $\theta 1$ of the spectacle lens frame LF (RF) is as large as more than 15 degrees, for example, as described above, the calculation control circuit 52 conducts the correction processing for the obtained results of the shape measurement of the spectacle lens frame according to the calculated axial shift amount or angle $\theta 3$. It is therefore possible to obtain an accurate result of the shape measurement.

(II) Measurement of Lens Shape of Demo Lens (II-a) Setting of Lens of Demo Len.

Figure 23A:
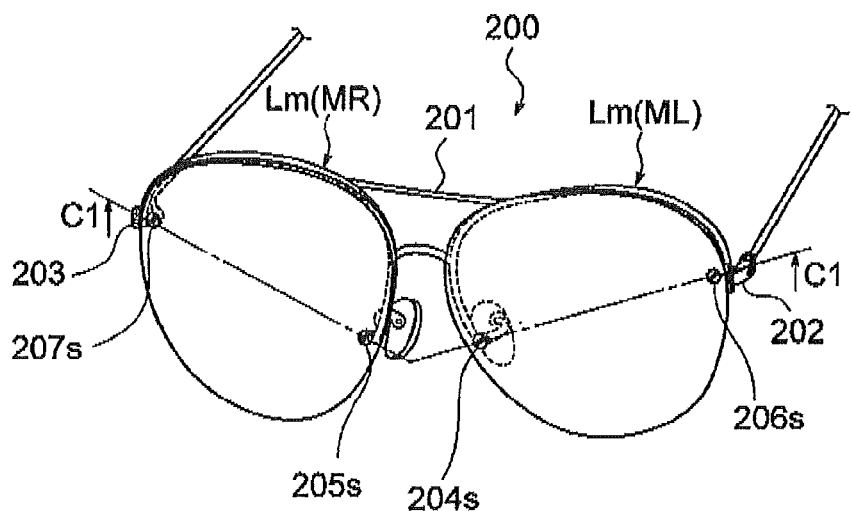
FIG. 23A is a perspective view showing an example of spectacles with a two-point frame.
Figure 23B:
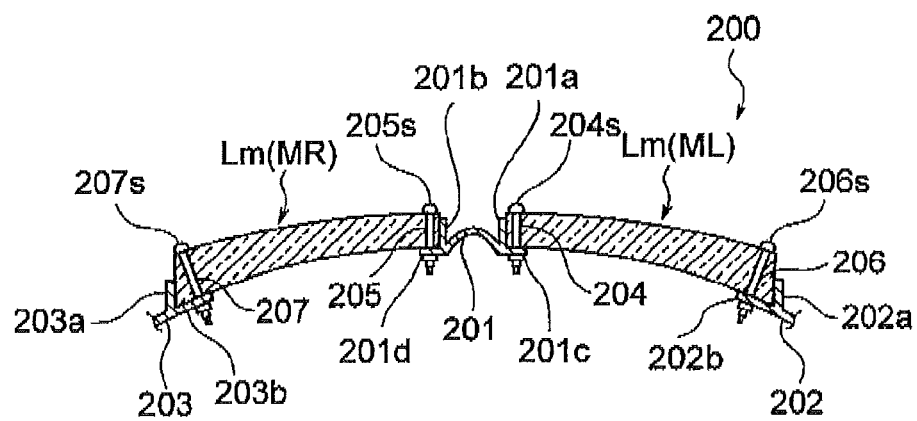

In the case of performing shape measurement of right and left lenses Lm (MR) and Lm (ML) (demo lenses as dummies of spectacle lenses) of spectacles M with a two-point frame as shown in FIGS. 23A and 23B by the spectacle lens frame shape measuring apparatus, known lens holders disclosed in Japanese Patent Application Publications No. H10-328992 and No. H8-294855 and the like can be used. To cause a lens holder of Japanese Patent Application Publication No. H10-328992 to hold a lens such as the demo lens, it is possible to employ a sucker and a sucker holding structure as disclosed in Japanese Patent Application Publication No. H8-294855. The structure of the lens holder is not essential for this invention, and thus the detailed description thereof is omitted.

The aforementioned lens holder holding lenses such as demo lenses is provided between the slide frames 3 and 3, and a side wall of the lens holder of Japanese Patent Application Publication No. H10-328992 or a flange in side part of the lens holder of Japanese Patent Application Publication No. H8-294855 is sandwiched between the fixed holding bars 3$b$1 and movable holding bars 3$b$2. At this time, the lenses held by the lens holder face downward.

In spectacles 200 with a two-point frame as shown in FIG. 23A, a bridge 201 is provided between the right and left lenses MR and ML (on the nose side), and temple clasps 202 and 203 are provided on opposite sides (on ear sides) of the right and left lenses Lm (MR) and Lm (ML).

As shown in FIG. 23B, the bridge 201 includes: side plates 201$a$ and 201$b$ abutting on circumferential surfaces (cutting surfaces) of the lenses Lm (ML) and Lm (MR) on the nose side (edges of the circumferential surfaces facing each other), respectively; and fixed plates 201$c$ and 201$d$ abutting on rear refractive surfaces of the lenses Lm (ML) and Lm (MR), respectively.

As shown in FIG. 23B, the temple clasp 202 includes: a side plate 202$a$ abutting on the circumferential surface (cutting surface) of the lens Lm (ML) on the ear side; and a fixing plate 202$b$ abutting on the rear refractive surface of the lens Lm (ML). The temple clasp 203 includes: a side plate 203$a$ abutting on the circumferential surface (cutting surface) of the lens Lm (MR) on the ear side; and a fixing plate 203$b$ abutting on the rear refractive surface of the lens Lm (MR).

As shown in FIG. 23B, at edges of the lenses Lm (MR) and Lm (ML) on the nose side (edges facing each other), attachment holes 204 and 205 are formed. At edges of the lenses Lm (MR) and Lm (ML) on the ear side, attachment holes 206 and 207 are formed.

The left side plate 201$a$ of the bridge 201 is fixed to the lens Lm (ML) with a screw 204$s$ inserted through the attachment hole 204, and the right side plate 201$b$ of the bridge 201 is fixed to the lens Lm (MR) with a screw 205$s$ inserted through the attachment hole 205. Furthermore, the fixing plate 202$b$ of the temple clasp 202 is fixed to the lens Lm (ML) with a screw 206$s$ inserted through the attachment hole 206, and the fixing plate 203$b$ of the temple clasp 203 is fixed to the lens Lm (MR) with a screw 207$s$ inserted through the attachment hole 207. In the following description, the lenses Lm (ML) and Lm (MR) are just referred to as the lens Lm.

(II-b) Operation 1: Bringing Lens Shape Probe 36 into Contact with Standard Lens When the lens holder (not shown) is detected by the holder detector 53, the detection signal is inputted to the calculation control circuit 52. The calculation control circuit 52 then causes the slider 15 to move forward from its origin position along the guiderail 14 and locate the lens shape probe 36 on the outside of the circumference of the lens held by the lens holder (not shown).

Next, the calculation control circuit 52 causes the actuator motor 50 to run forward as described above and raises the lens frame probe 37 from the initial position (α) to the height (β) described in FIG. 7. Along with this, the lens shape probe 36 is raised integrally with the lens frame probe 37 up to the height corresponding to the circumference of the lens held by the lens holder (not shown).

Figure 18:
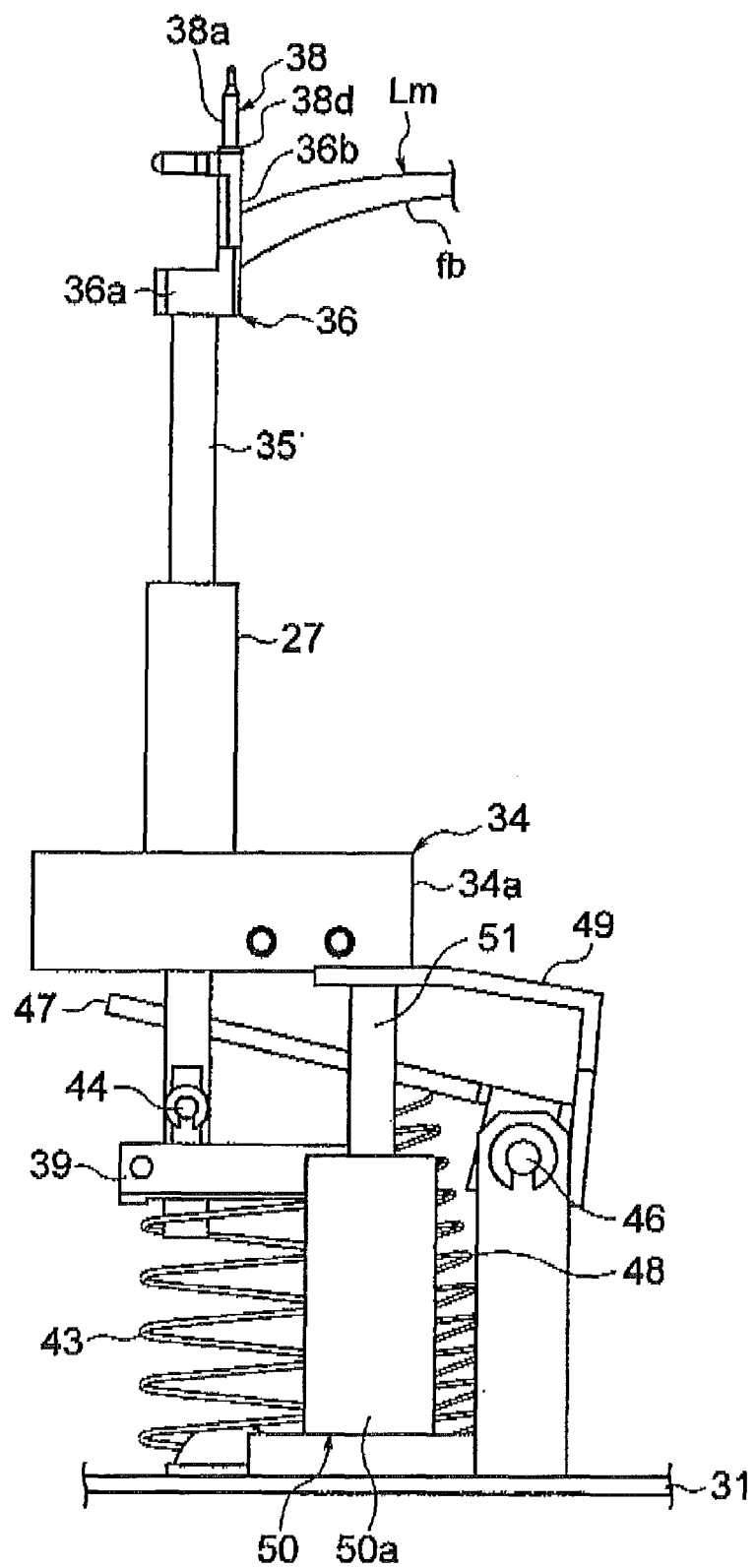
FIG. 18 is an explanatory view of lens shape measurement by the elevating mechanism of FIG. 2.

Subsequently, the calculation control circuit 52 drives and controls the driving motor 18 to transmit the rotation of the driving motor 18 to the slider 15 through the wire 20 and control and move the slider 15 along the guiderail 14 until the lens shape probe 36 touches the circumferential surface of the lens Lm held by the lens holder (not shown) as shown in FIG. 18. Thereby, as shown in FIG. 18, the lens shape probe 36 is brought into contact with the circumferential surface of the lens Lm.

The aforementioned control can be conducted based on data of a standard lens previously obtained by experiments and the like.

(II-c) Operation 2: Bringing Lens Shape Probe 36 into Contact with Lens

The procedure to bring the lens shape probe 36 into contact with the circumferential surface of the lens Lm may be another one. Specifically, first, the actuator motor 50 is caused to run forward to raise the free end of the vertical position control lever 49 upward from the position in FIG. 7 to the position in FIGS. 15 to 17 against the spring force of the tension coil spring 48, thus rotating the supporting shaft 46. At this time, the supporting shaft 46 rotates the holding lever 47 to raise the free end of the holding lever 47 in the direction that the free end of the vertical position control lever 49 is raised. Along with such an operation, the engagement shaft 44 is raised by the spring force of the coil spring 43 integrally with the probe shaft 35, and the lens shape probe 36 is raised and brought into contact with the rear refractive surface of the lens Lm. Thereafter, the driving motor 18 is driven and controlled to move the slider 15 along the guiderail 14 at a predetermined speed and move the lens shape probe 36 along the rear refractive surface toward the rim of the lens Lm. The lens shape probe 36 is thus moved to the position greatly deviated from the rim of the rear refractive surface of the lens Lm. At this time, even if the lens shape probe 36 is separated from the rim of the rear refractive surface of the lens Lm and is raised by the spring force of the coil spring 43 integrally with the lens frame probe 37, it is possible to prevent the lens frame probe 37 from colliding with the lens Lm by setting the moving speed of the lens shape probe 36 to be fast to some extent because the spring force of the coil spring 43 is weak.

The separation position at which the lens shape probe 36 is separated from the rear refractive surface of the lens Lm can be judged by detecting with the linear scale 40 the position where the lens shape probe 36 is raised. The horizontal position of the lens shape probe 36 located at the separation position is obtained from the detection signal of the linear scale 24. Accordingly, by the detection signals from the linear scales 24 and 40 when the lens shape probe 36 is located at the separation position, the position where the lens shape probe 36 is separated from the rear refractive surface of the lens Lm can be calculated as three-dimensional coordinate data. Based on the three-dimensional coordinate data, the actuator motor 50 is driven and controlled to adjust the free end of the vertical position control lever 49 and therefore adjust the free end of the holding lever 47, thus adjusting the lens shape probe 36 to a height corresponding to the circumference of the lens Lm held by the lens holder (not shown). Thereafter, the calculation control circuit 52 drives and controls the driving motor 18 to transmit the rotation of the driving motor 18 through the wire 20 to the slider 15. The slider 15 is then controlled and moved along the guiderail 14 so that the lens shape probe 36 may move until touching the circumferential surface of the lens Lm held by the lens holder (not shown).

Thereby, as shown in FIG. 18, the lens shape probe 36 is brought into contact with the circumferential surface of the lens Lm, (II-d) Shape Measurement of Rim by Lens Shape Probe 36

Next, the calculation control circuit 52 drives and controls the driving motor 6 to cause the driving motor 6 to run forward. Rotation of the driving motor 6 is transmitted through the pinion 7 and timing belt 8 to the driven gear 5, which is then horizontally rotated integrally with the rotation base 9.

Along the rotation of the rotation base 9, the slider 15 and a number of parts provided for the slider 15 are horizontally rotated integrally with the rotation base 9, and the lens shape probe 36 slides and moves along the circumferential surface (cutting surface) of the lens Lm. At this time, the slider 15 moves along the guiderail 14 integrally with the lens frame probe 37. Accordingly, the amount of movement of the slider 15 from the origin position of the slider 15 is equal to the amount of movement of the tip of the lens frame probe 37. This amount of movement is calculated from the detection signal of the detection head 26 of the linear scale 24 by the calculation control circuit 52.

Moreover, the dimension (length) between the center of the probe shaft 35 and the tip of the lens frame probe 37 is known. Accordingly, by previously setting the distance between the rotational center of the rotation base 9 and the tip of the lens frame probe 37 when the slider 15 is located at its origin, a change in distance between the rotational center of the rotation base 9 and the lens shape probe 36 as the slider 15 moves along the guiderail 14 can be the radius $\rho i$.

Accordingly, by calculating the rotation angle $\theta i$ of the rotation base 9 due to the rotation of the driving motor 6 from the number of driving pulses of the driving motor 6 and obtaining the radius $\rho i$ corresponding to the calculated rotation angle $\theta i$, the circumferential shape of the lens Lm (lens shape) can be obtained as the lens shape information $(\theta, \rho i)$ in the polar coordinate system.

[Detection of Recess in Rim of Lens]

Figure 30A:
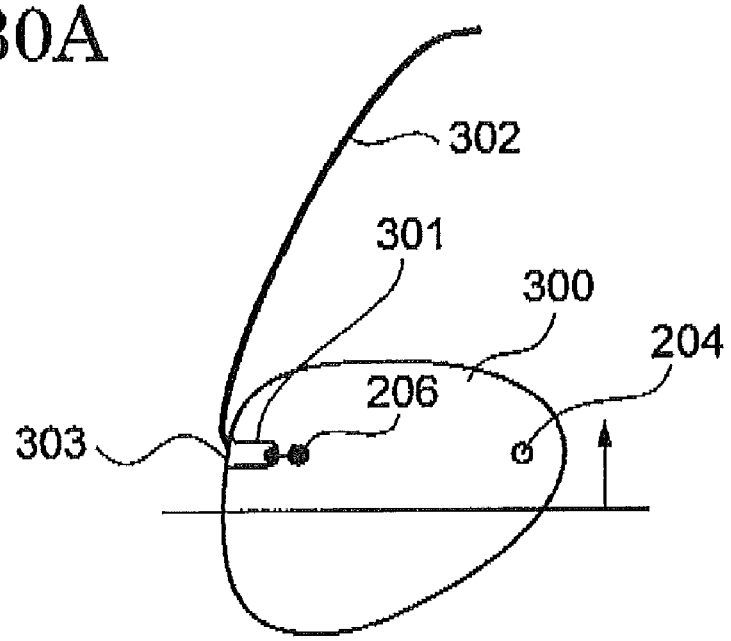
FIGS. 30A and 30B are explanatory views showing modifications.

As shown in FIG. 30A, in a kind of two-point frames, a clasp 303 through which a temple 302 is attached is attached using a recess 301 (see FIG. 30B) provided for the rim of a lens 300. Referential numerals 206 and 204 denote attachment holes for attachment of clasps.

When such a lens is measured, the lens data includes a recess. Generally, the recess is formed in an upper half of the lens. Based on this condition, roughness due to measurement errors and the recess for attachment are distinguished to detect the position of the recess. Next, the attachment hole probe 38 is moved in a lateral direction to measure a length Y of the recess in a direction toward the lens center. Alternatively, the value of the length Y can be inputted through an external input unit.

(III) Measurement of Curvature of Rear Refractive Surface of Lens Lm

Figure 19:
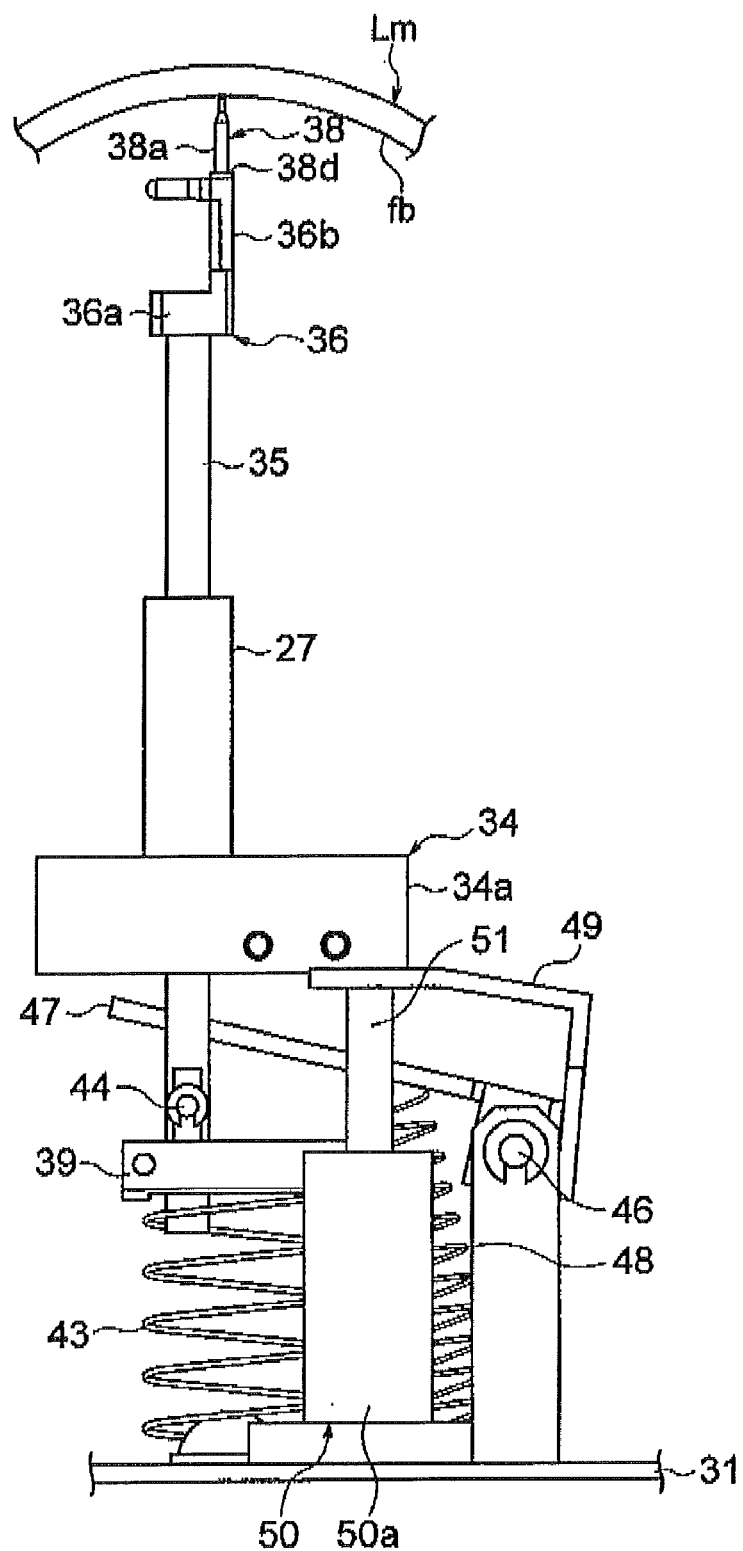
FIG. 19 is an explanatory view of the lens shape measurement by the elevating mechanism of FIG. 2.
Figure 30B:
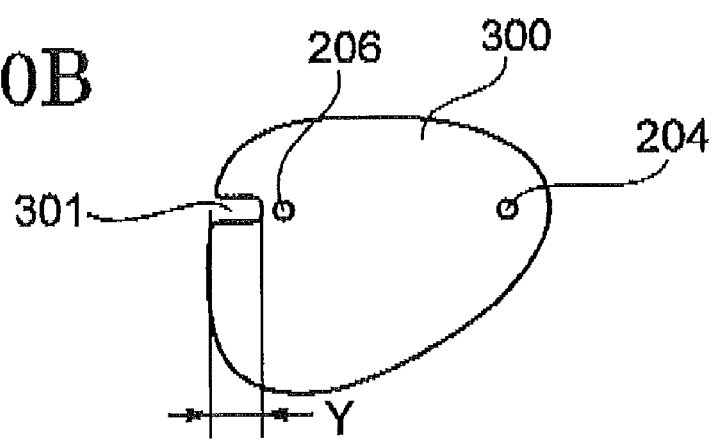

When the rim shape measurement (outer shape measurement) of the lens Lm of the aforementioned in FIG. 30B only provides two-dimensional lens shape information $(\theta i, \rho i)$, three-dimensional lens shape information $(\theta i, \rho i, Z i)$ can be obtained by calculating by measurement the curvature of a rear refractive surface fb of the lens Lm shown in FIG. 19, and calculating the vertical position Zi of the cutting surface of the lens Lm at the two-dimensional lens shape information $(\theta i, \rho i)$ based on the calculated curvature and the lens shape information $(\theta i, \rho i)$. From the three-dimensional lens shape information $(\theta i, \rho i, Z i)$, the circumferential length of the lens Lm as a dummy lens in three-dimension can be calculated.

Hereinafter, a description is given of a procedure of calculating the curvature of the rear refractive surface of the lens Lm.

[Step S1]

Figure 20:
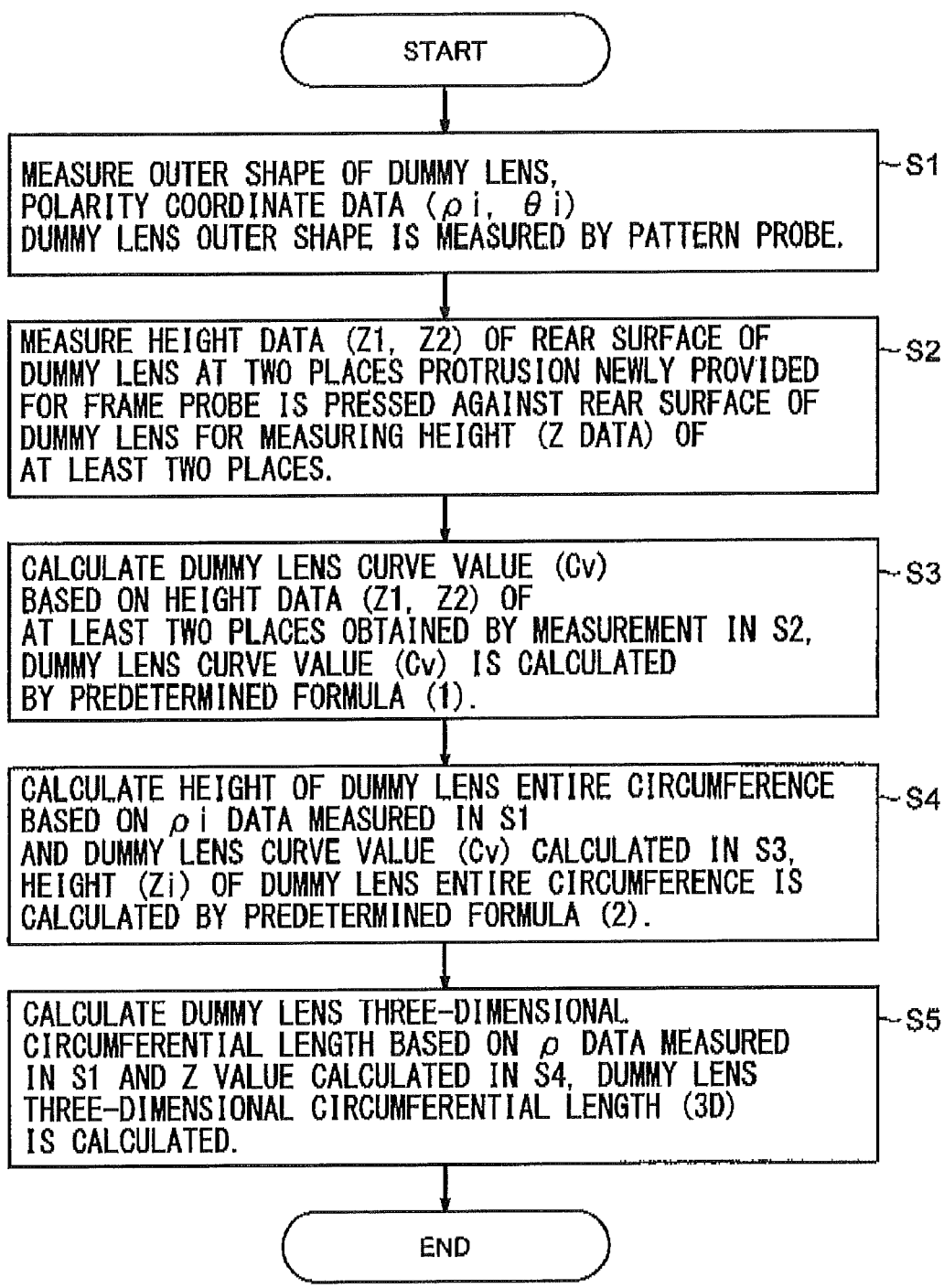
FIG. 20 is a flowchart for calculating a curvature of a refractive surface of a lens by the spectacle lens frame shape measuring apparatus of FIGS. 1 to 5.

As show in FIG. 20, in step S1, the two-dimensional lens shape information $(\theta i, \rho i)$ is calculated in the rim shape measurement (outer shape measurement) of the lens Lm, and then the procedure proceeds to step S2.

[Step S2]

At step S2, the calculation control circuit 52 measures the curvature of the rear refractive surface fb of the lens Lm shown in FIG. 19. First, as described above, the calculation control circuit 52 operates and controls the actuator motor 50 in a similar way to the measurement of the lens frame in FIG. 30A to bring the upper end of the lens shape probe 36 into contact with the rear refractive surface fb of the lens Lm held by the not-shown lens holder with the spring force of the coil spring 43.

Here, the lens Lm is held by a sucker, and the sucker is detachably attached to a not-shown lens folder, so that the lens Lm is held by the lens holder. Moreover, with the lens holder being held between the lens frames 3 and 3, the axis line of the sucker of the lens holder vertically extending (not shown) is set so as to coincide with the axis line (an axis line O in FIG. 7) of the lens shape probe 36 vertically extending when the slider 15 is located at its origin position. The position (point) at which these axis lines coincide with each other is set to an origin P0 in the X direction (in a radial direction of the lens Lm) of the measurement.

Figure 21A:
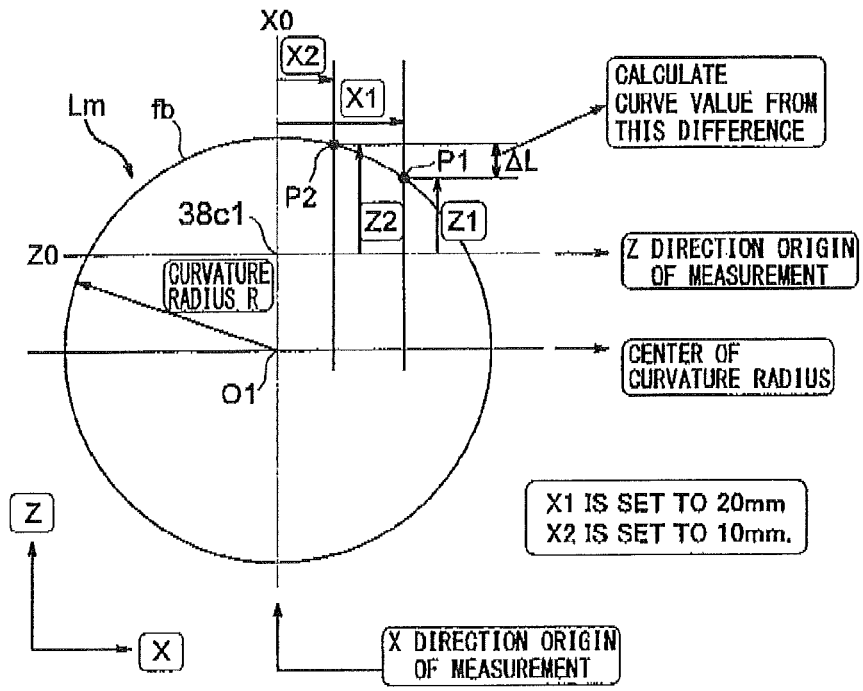
FIG. 21A is an explanatory view for calculating the curvature of the lens by measurement by the spectacle lens frame shape measuring apparatus of FIGS. 1 to 5.
Figure 21B:
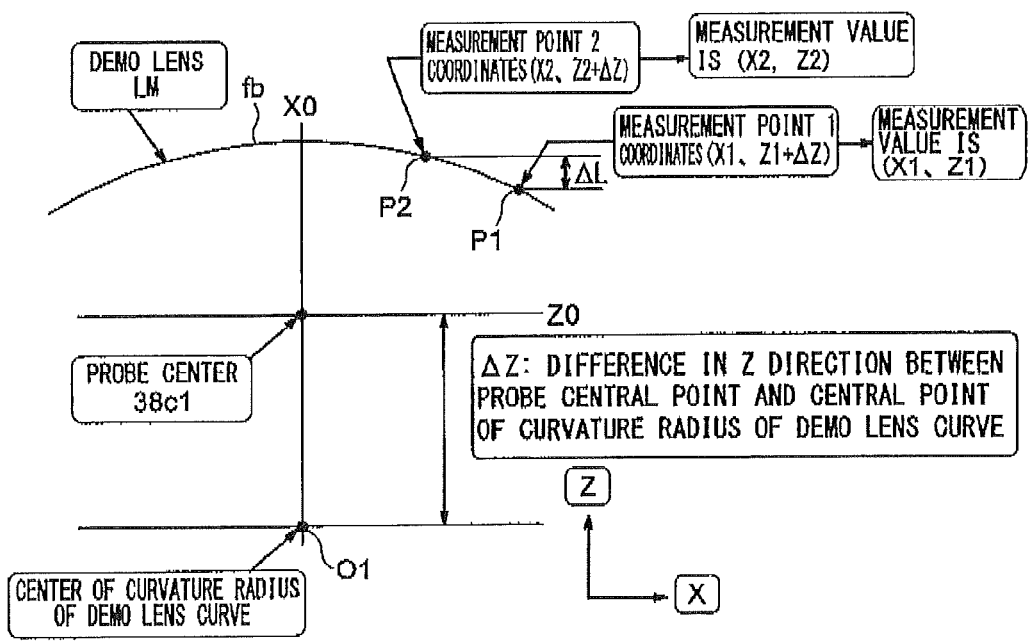
FIG. 21B is a partial enlarged view of FIG. 21A.

As shown in FIG. 7, when the probe shaft 35 is lowered to the lowest position and the lens frame probe 37 is located at the initial position ($\alpha$), the lens shape probe 36 is also located at the lowest initial position. The position of the upper end (top end) of the lens shape probe 36 at this time is an initial position ($\gamma$), which is set to an origin Z0 of measurement in the Z direction (in the vertical direction) in FIGS. 21A and 21B.

In such conditions, the calculation control circuit 52 operates and controls the driving motor 18 to cause the slider 15 to move along the guiderail 14 through the wire 20 moving in cooperation with the driving motor 18, thus sequentially moving the upper end (tip end) of the lens shape probe 86 to measurement points P2 and P1 in the radial direction (X direction) of the lens Lm. The measuring point P2 is located at a position to which the lens shape probe 36 is moved from the origin X0 in the radial direction (the X direction) of the lens Lm in the X direction by a distance X2, and the measuring point P1 is located at a position to which the lens shape probe 36 is moved from the origin X0 in the X direction by a distance X1 (X1>X2).

At this time, the calculation control circuit 52 respectively calculates heights Z2 and Z1 in the Z direction (in the vertical direction) at the distances X2 and X1 in the rear refractive surface fb of the lens Lm based on the movement amount detection signal from the linear scale 40 and proceeds to step S3. The heights Z2 and Z1 in the Z direction are distances from the origin Z0 in the Z direction.

(Step S3)

At step S3, the calculation control circuit 52 calculates a curve value from the curvature of the rear refractive surface fb of the lens Lm. Here, when the distance from the center O1 of curvature of the rear refractive surface fb of the lens Lm to the origin Z0 in the Z direction is $\Delta Z$, the height from the center O1 of curvature to the measurement point P2 is $Z2+\Delta Z$, and the height from the center O1 of curvature to the measurement point P1 is $Z1+\Delta Z$. Accordingly, the coordinates of the measurement points P2 and P1 are (X2, $Z2+\Delta Z$) and (X1, $Z1+\Delta Z$), respectively.

To calculate the curvature from such coordinates (X2, Z2+ΔZ) and (X1, Z1+ΔZ) of the measurement points P2 and P1, the calculation control circuit 52 uses the circle equation, which is:

$$X^2 + Z^2 = R^2$$

where R is a radius of curvature of the lens Lm.

From the above equation, the equation into which the measurement point P1 is substituted is:

$$(X1)^2 + (Z1 + \Delta Z)^2 = R^2 \quad (1),$$

The equation into which the measurement point P1 is substituted is:

$$(X2)^2 + (Z2 + \Delta Z)^2 = R^2 \quad (2).$$

Subtracting the equation (2) from the equation (1) yields:

$$(X1)^2 - (X2)^2 + (Z1 + \Delta Z)^2 - (Z2 + \Delta Z)^2 = 0.$$

The above equation is expanded to $$(X1)^2 - (X2)^2 + (Z1)^2 + 2(Z1)\cdot\Delta Z + \Delta Z^2 - (Z2)^2 - 2(Z2)\cdot\Delta Z - \Delta Z^2 = 0.$$

And then, $$(X1)^2 - (X2)^2 + (Z1)^2 + 2(Z1)\cdot\Delta Z - (Z2)^2 - 2(Z2)\cdot\Delta Z = 0.$$

The above equation is summarized for ΔZ as:

$$[2(Z1) - 2(Z2)]\Delta Z = (X2)^2 - (X1)^2 + (Z2)^2 - (Z1)^2.$$

From this equation, ΔZ can be obtained using the following equation:

$$\Delta Z = \frac{(X2)^2 - (X1)^2 + (Z2)^2 - (Z1)^2}{2[(Z1) - (Z2)]} \quad \text{[Equation 1]}$$

Figure 22A:
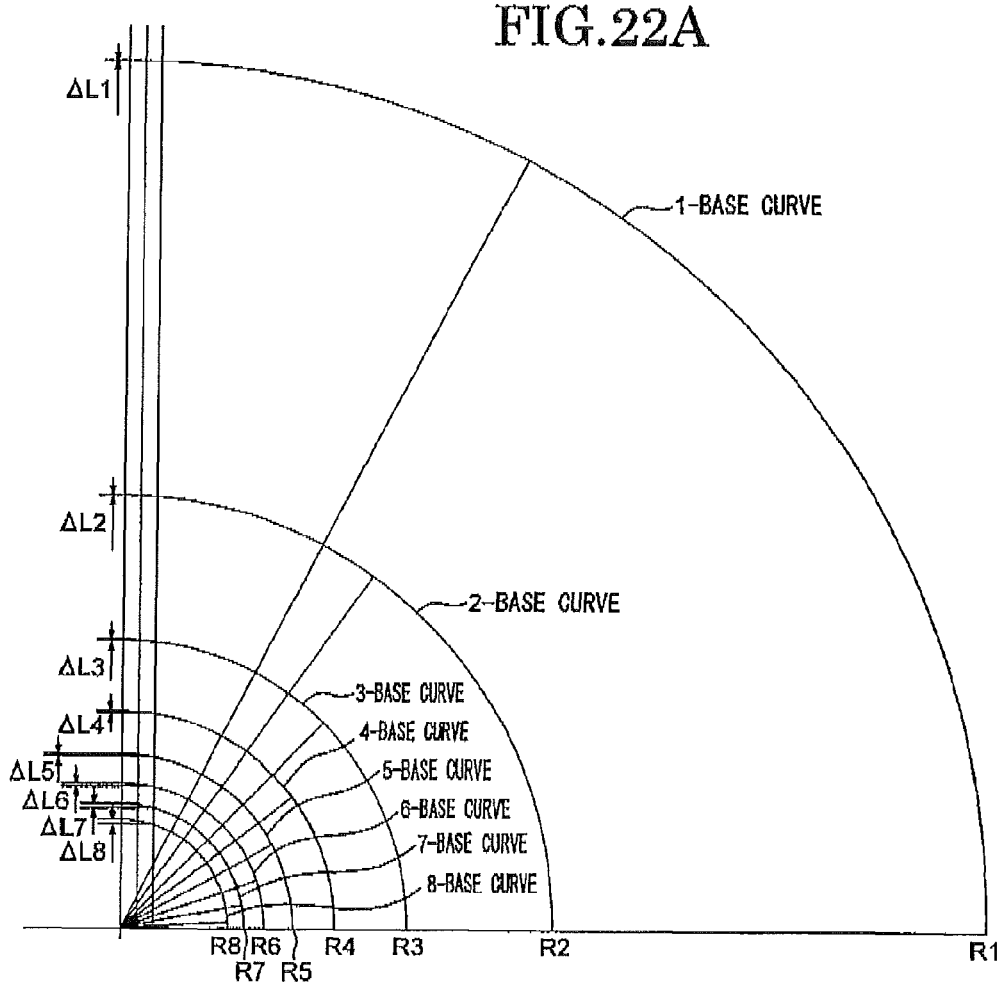
FIG. 22A is an explanatory view of a curve value of a spectacle lens.

The curve values of spectacle lenses are set in a range of 1 to 8 curves as shown in FIG. 22. Radii of curvature R1 to R8 for the respective curve values of 1 to 8 curves are shown in Table 3.

TABLE 3

| Curve value | Radius of curvature Ri (mm) | Difference in Z direction | Curve value obtained from approximated curve | Error from theoretical value |
|---|---|---|---|---|
| 1 | R1: 523 | Δ L1: 0.287 | 1.0479465 | 0.0479465 |
| 2 | R2: 261.5 | Δ L2: 0.575 | 2.0183625 | 0.0183625 |
| 3 | R3: 174.3333 | Δ L3: 0.854 | 2.958453 | −0.041547 |
| 4 | R4: 130.75 | Δ L4: 1.156 | 3.976042 | −0.023958 |
| 5 | R5: 104.6 | Δ L5: 1.451 | 4.9700445 | −0.0299555 |
| 6 | R6: 87.16667 | Δ L6: 1.75 | 5.977525 | −0.022475 |
| 7 | R7: 74.71429 | Δ L7: 2.054 | 7.001853 | 0.001853 |
| 8 | R8: 5.375 | Δ L8: 2.365 | 8.0497675 | 0.0497675 |

By setting X1 and X2 described above to 10 mm and 5 mm, respectively, the differences ΔL (ΔL1 to ΔL8) between the measurement points P1 and P2 in the Z direction which respectively correspond to 1 to 8 curves can be obtained as shown in Table 3. In other words, when the difference ΔL between the measurement points P1 and P2 in the Z direction (ΔL in FIG. 21) is about 0.287, which is equal to ΔL1, for example, the radius of curvature of the lens Lm as a demo lens can be determined to be 523 mm, which is R1 corresponding to 1-base curve (a curve value of 1).

The relationship between the difference between the measurement points P1 and P2 in the Z direction (ΔL in FIG. 21) and a curve value Cv is expressed by linear approximation. The equation thereof is:

Curve value=3.3695×(Difference ΔL in Z direction)+ 0.0809.

Figure 22B:
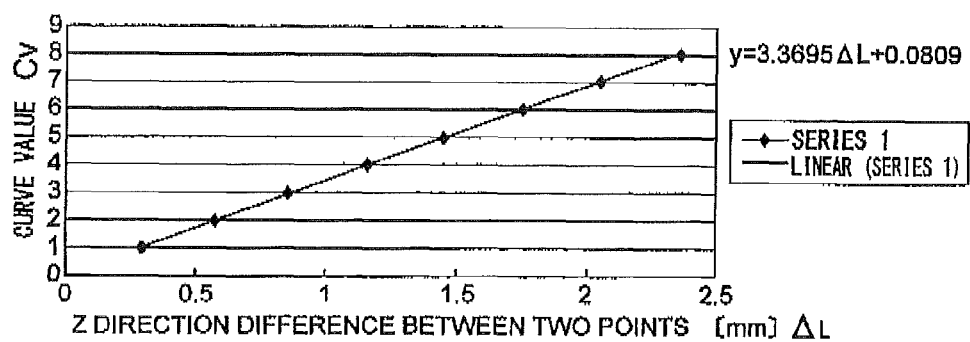
FIG. 22B is a characteristic diagram showing a relationship between the curve value of FIG. 21A and a difference between two measurement points on the refractive surface of the lens.

The curve value Cv and difference ΔL (ΔL1 to ΔL8) in the Z direction are linearly proportional to each other as shown in FIG. 22B.

The calculation control circuit 52 calculates the curve value of the rear refractive surface fb of the lens Lm in such a manner and then proceeds to step S4.

[Step S4]

In step S4, from the curve value Cv calculated based on the difference ΔL (ΔL1 to ΔL8) in the Z direction and the lens shape information (θi, ρi), the calculation control circuit 52 calculates Z-direction position information Zbi of the rim of the rear refractive surface fb of the lens Lm and then proceeds to step S5.

[Step S5]

In step S5, from the two dimensional lens shape information (θi, ρi) and the Z-direction position information Zbi of the rim of the rear refractive surface fb of the lens Lm calculated in step S4, the calculation control circuit 52 calculates the three-dimensional lens shape information (θi, ρi, Zi) and then terminates the procedure. The calculated three-dimensional lens shape information (θi, ρi, Zi) is stored in the memory 55 by the calculation control circuit 52.

(IV) Position Measurement of Attachment Hole of Lens Lm

As shown in FIG. 23B, the lens Lm (ML) includes the attachment holes 204 and 206, and the lens Lm (MR) includes the attachment holes 205 and 207.

Figure 24A:
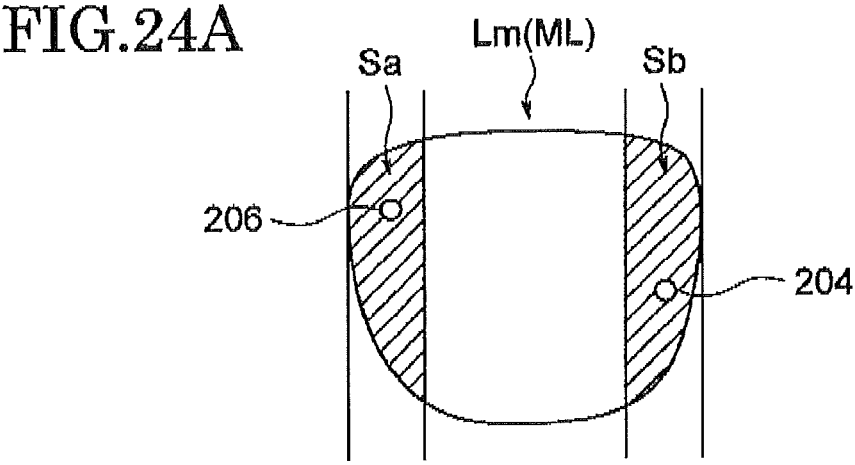
FIG. 24A is an explanatory view showing an example of a range for position detection of attachment holes of a lens.

When the lens Lm of the three-dimensional lens shape information (θ1, ρi, Zi) obtained by the above measurement of (II) and (III) is the lens Lm (ML) of FIG. 23B, for example, the calculation control circuit 52 sets attachment hole detection ranges (sensing ranges) Sa and Sb based on the three-dimensional lens shape information (θi, σi, Zi) as shown in FIG. 24A.

The attachment hole detection ranges Sa and Sb are set a predetermined range apart from the outer circumferential surface of the lens Lm based on the three-dimensional lens shape information (θi, ρi, Zi). The predetermined range is set to a predetermined amount (for example, 1 mm) inside of the outer circumferential surface of the lens Lm. This is for preventing the attachment hole probe 38 from being separated from the lens Lm. If the attachment hole probe 38 is separated from the lens Lm while the attachment hole probe 38 is moved in the attachment hole detection ranges Sa and Sb for detection of the attachment holes 204 and 206, it takes a long time to return the probe 38 to the original position. The value of 1 mm is just an example, and the present invention is limited to this. The point is that the attachment hole probe 38 is not disengaged from the lens Lm and the attachment holes can be detected.

Figure 24B:
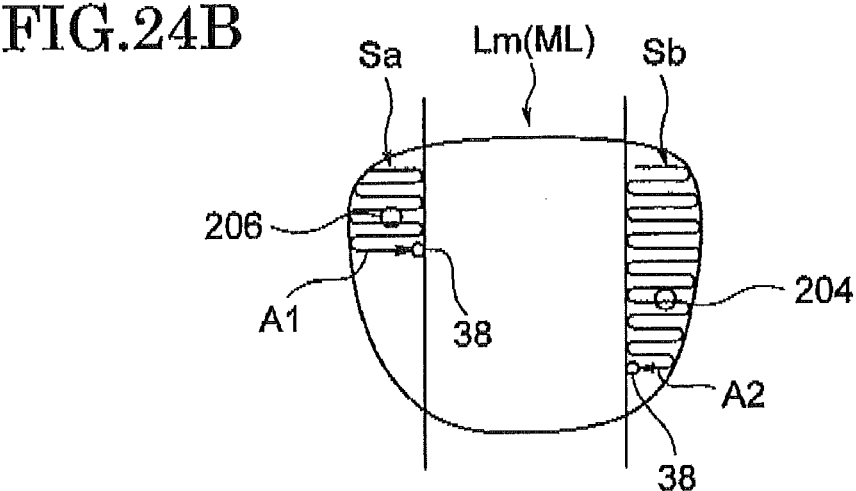
FIGS. 24B and 24C are explanatory views of an operation of position detection of attachment holes of the lens.
Figure 24C:
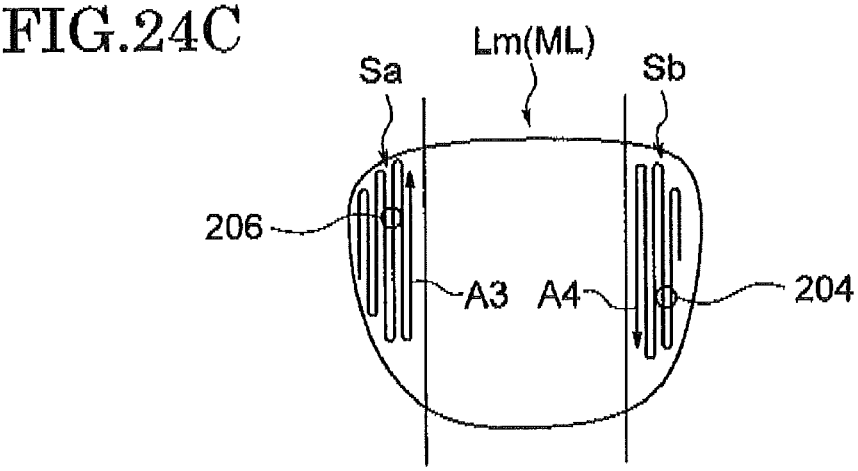

Thereafter, on the basis of the three-dimensional lens shape information (θi, ρi, Zi), the calculation control circuit 52 causes the attachment hole probe 38 in contact with the rear refractive surface of the lens Lm as shown in FIG. 24B to scan (move) in the attachment hole detection ranges Sa and Sb in a zigzag manner as indicated by arrows A1 and A2 for sensing of the attachment holes 204 and 206. In FIG. 24B, the attachment hole probe 38 is moved from the upper edge of the lens Lm downward in a zigzag manner. Note that, the attachment hole probe 38 may be moved in a zigzag manner in the right and left direction of the lens Lm as indicated by arrows A3 and A4 in FIG. 24C.

Such horizontal movement of the attachment hole probe 38 can be carried out by the calculation control circuit 52 driving and controlling the driving motor 6 and a pulse motor (not-shown) moving the not-shown entire base of FIG. 2 right and left. The horizontal movement position of the attachment hole probe 38 is obtained as position information (θi, ρi') composed of the rotational angle θi of the rotation base 9 rotated by the driving motor 6 and the amount of right and left movement of the aforementioned pulse motor.

Moreover, the vertical movement position of the attachment hole probe 38 is obtained as Zi' corresponding to the position information (θi, ρi') based on the detection signal from the linear scale 40. By moving the attachment hole probe 38 in a zigzag manner as described above, the three dimensional position information of the attachment hole probe 38 is obtained as (θi, ρi', Zi').

Figure 25A:
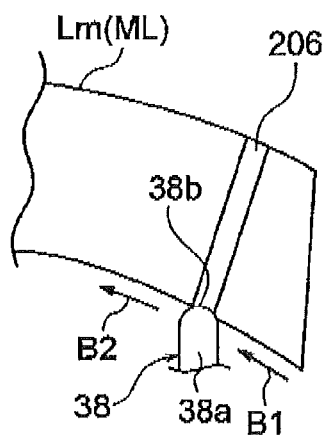
FIGS. 25A to 25C are partial cross-sectional views for explaining detection of an attachment hole provided for a lens.
Figure 25B:
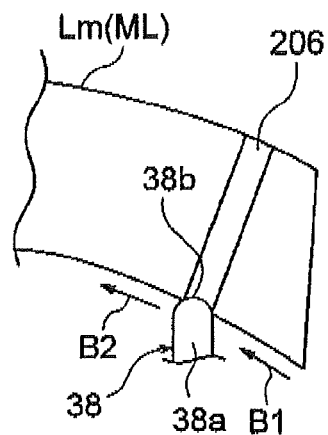
Figure 25C:
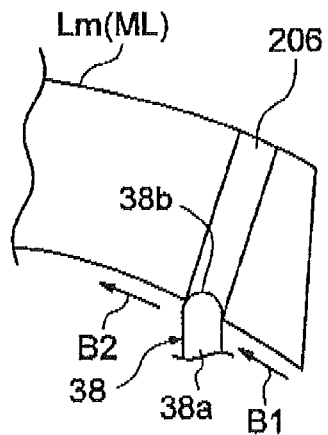

In the case where the attachment hole probe 38 is moved in a zigzag manner as described above, when the attachment hole probe 38 is moved in directions of arrows B1 and B2 as shown in FIG. 25A to 25C, for example, the attachment hole probe 38 is smoothly displaced upward along the rear refractive surface of the lens Lm before and after passing the attachment hole 206.

Figure 25D:
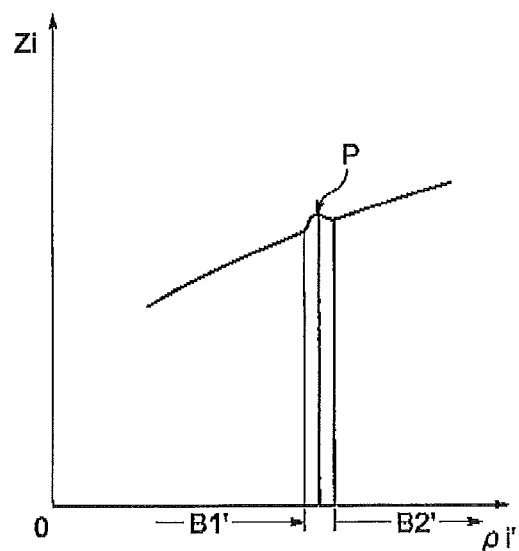
FIG. 25D is an explanatory view for explaining the detection of the attachment hole of FIGS. 25A to 25C.

The upward movement position Zi of the attachment hole probe 38 is obtained from the detection signal of the linear scale 40 as a vertical position change curve shown in FIG. 25D. At this time, in the vertical position change curve, in a range indicated by the arrow B1 of FIG. 25A to 25C where the attachment hole probe 38 moves toward the attachment hole 206, the movement position Zi' smoothly changes upward as indicated by B1'. In a range indicated by the arrow B2 of FIG. 25A to 25C where the attachment hole probe 38 moves from the attachment hole 206, the movement position Zi' smoothly changes upward as indicated by B2'.

When a part of the attachment hole probe 38 enters the attachment hole 26, as shown in the vertical position change curve of FIG. 25D, the upward displacement of the attachment hole probe 38 greatly changes at the position indicated by P.

Accordingly, the calculation control circuit 52 stores a central position of the position P in the memory 55 as the three-dimensional position information (θi, ρi', Zi') of the attachment hole 206 to produce attachment hole processing data (drilling data).

The attachment holes 204, 205, and 207 axe measured in a similar manner.

(Modification 1)

In the aforementioned embodiment, as shown in FIG. 23B, the bridge 201 includes the fixing plates 201c and 201d which abut on the rear refractive surfaces of the lenses Lm (ML) and Lm (MR), respectively; and the temple clasps 202 and 208 include the fixing plates 202b and 203b which respectively abut on the rear refractive surfaces of the lenses Lm (ML) and Lm (MR) as shown in FIG. 28B. However, the present invention is not necessarily limited to this.

Figure 26A:
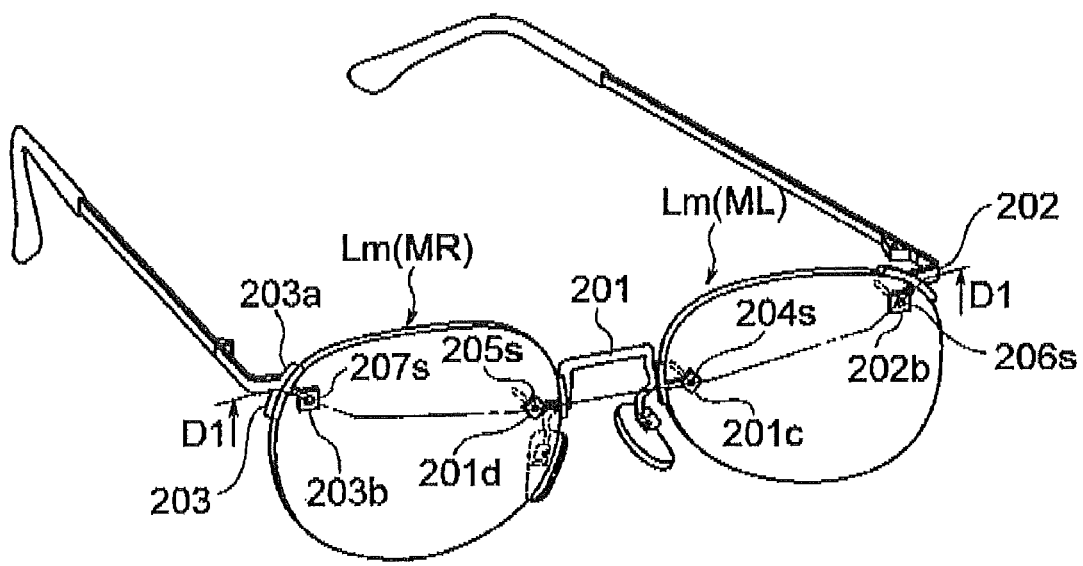
FIG. 26A is a perspective view showing another example of the two-point frame spectacles.
Figure 26B:
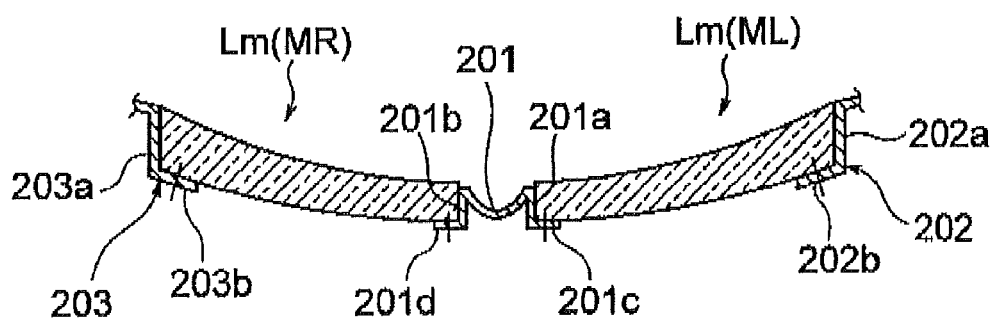
FIG. 26B is a cross-sectional view taken along a line D1-D1 of FIG. 26A.

For example, as shown in FIGS. 26A and 26B, the spectacle frame may have a configuration in which the fixing plates 201c and 201d respectively abut on front refractive surfaces of the lenses Lm (ML) and Lm (MR) and the temple clasps 202 and 203 include the fixing plates 202b ad 203b abutting on the front refractive surfaces of the lenses Lm (ML) and Lm (MR), respectively as shown in FIG. 26B.

In this case, the curvature of the front refractive surfaces of the lenses Lm (ML) and Lm (MR) and the circumferential length of the cutting surfaces of the lenses Lm (ML) and Lm (MR) are measured in a similar manner to the rear refractive surfaces of the aforementioned lenses Lm, and the positions of the attachment holes 204 to 207 are measured.

Note that, in FIGS. 26A and 26B, the same or similar components to those of FIGS. 23A and 23B are given the same reference numbers used in FIGS. 23A and 23B, and the description thereof is omitted.

(Modification 2)

Figure 27:
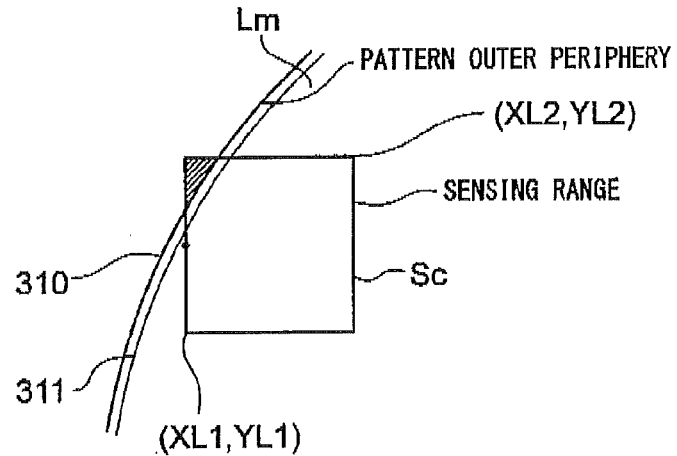
FIG. 27 is an explanatory view showing another example of the range for position detection of an attachment hole of a lens.

In the aforementioned embodiment, the attachment hole detection ranges (sensing ranges) Sa and Sb extending in the vertical direction of the lens Lm are set in the right and left parts of the lens Lm, but the present invention is not necessarily limited to this. For example, as shown in FIG. 27, a margin line 311 for measurement is set a predetermined amount (for example, 1 mm) inside of an outer circumferential surface 310 of the lens Lm based on the lens shape information (θi, ρi, Zbi), and an attachment hole detection range (a sensing range) Sc of a predetermined range (for example, 10 mm×10 mm) is set.

Figure 28:
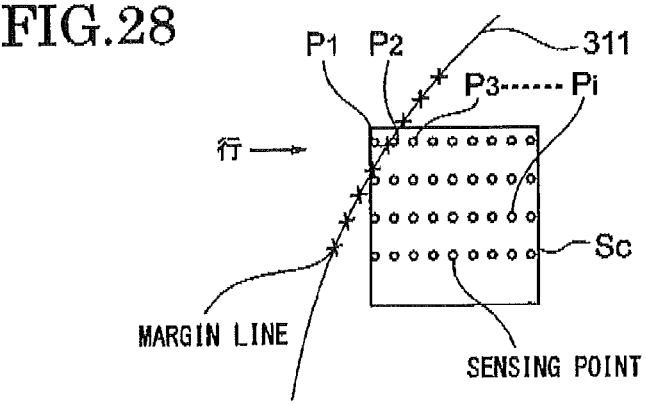
FIG. 28 is an explanatory view showing examples of positions where the position detection is carried out in the range for position detection of attachment holes of lenses.

Then, as shown in FIG. 28, a number of measurement points Pi (for example, 200 points in a matrix) are provided in the attachment hole detection range (sensing range) Sc, and three dimensional, position information of the refractive surface of the lens Lm is measured at the 200 measurement points Pi in a matrix by the attachment hole probe 38. At this measurement, the position where the attachment hole probe 38 is largely displaced upward in the attachment hole detection range (sensing range) Sc is detected from the detection signal from the linear sensor 40 as the position of an attachment hole. The detected position is stored in the memory 55 as the three-dimensional position information (θi, ρi', Zi') to produce the attachment hole processing data (drilling data).

Typically, the positions in the lens Lm where the attachment holes 204 to 207 and the like are provided are in upper right or left side of the lens Lm or at a central portion of the right or left side of the lens Lm in the vertical direction. Accordingly, a switch for selecting a detection position such as upper part or central part in the height direction of the right and left sides of the lens Lm is provided, and based on the detection position selected by the switch and the lens shape information (θi, ρi, Zbi), the attachment hole detection range (sensing range) Sc is set.

(Modification 3)

Figure 29:
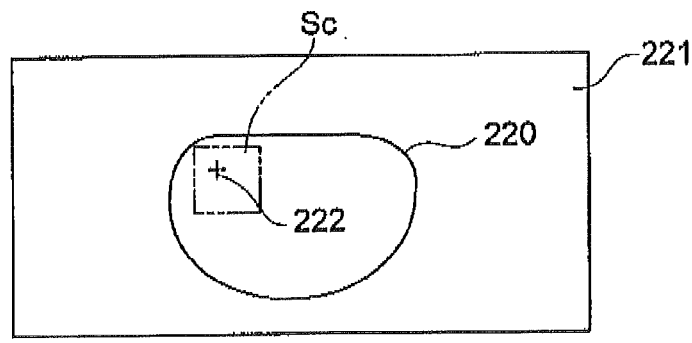
FIG. 29 is an explanatory view of a liquid crystal display used for setting the range for position detection of attachment holes of lenses.

Moreover, as shown in FIG. 29, a shape 220 of the lens Lm is displayed based on the lens shape information (θi, ρi, Zbi) on a touch screen liquid crystal display 221, and a position indicated by a cross mark 222 is indicated through a touch screen of the liquid crystal display 221, for example, as a rough position of the attachment holes 204 to 206 or the like. The aforementioned attachment hole detection range (sensing range) Sc can be set based on the indicated position.

As described above, the spectacle lens frame shape measuring apparatus of this embodiment of the present invention includes: a lens holding unit (not shown) provided within the measuring apparatus body 1; a lens shape probe 36 measuring the rim shape of the lens Lm held by the lens holding unit (not shown); a probe moving unit (driving motor 6) moving the lens shape probe 36 along the outer circumferential surface of the lens Lm; a first position detector (linear scale 24) detecting the position of the lens shape probe 36 along the outer circumferential surface; a second position detector (linear scale 40) detecting the position of the lens shape probe 36 in a direction perpendicular to the first detector (linear scale 24); and a calculation control circuit 52 calculating the circumferential surface shape data of the lens Lm as the three dimensional information on the basis of the detection signals from the first and second position detectors (linear scales 24 and 40). Moreover, using (controlling) the probe moving unit (driving motor 6), the tip end of the lens-shape probe 36 is moved while abutting on the refractive surface of the lens Lm held by the lens holding unit (not shown). Thereby, a change due to engagement of the lens-shape probe 36 with the attachment holes (204 to 207) of the lens Lm is detected from the detection signal of the second position detector (linear scale 40). Based on the change, the relationship between the lens rim shape and the hole position is detected.

According to such a configuration, it is possible to easily and accurately measure the positions of attachment holes through which clasps of a two-point frame are attached to lenses.

Moreover, the spectacle lens frame shape measuring apparatus of this embodiment of the present invention is configured to detect a position of a recess of a lens including a clasp attachment hole and including a recess in the rim from the circumferential shape of the lens.

According to this configuration, it is possible to provide a recess in the periphery of the lens and attach the clasp of the two-point frame using the recess.

Furthermore, the probe of the spectacle lens frame shape measuring apparatus of this embodiment of the present invention which detects a clasp attachment hole of the lens may be composed of a different member from the probe measuring the circumferential shape.

According to this configuration, the probe detecting a clasp attachment hole of a lens (attachment hole probe 38) and the lens shape probe 36 can be easily processed.

(Modification 4)

Figure 31A:
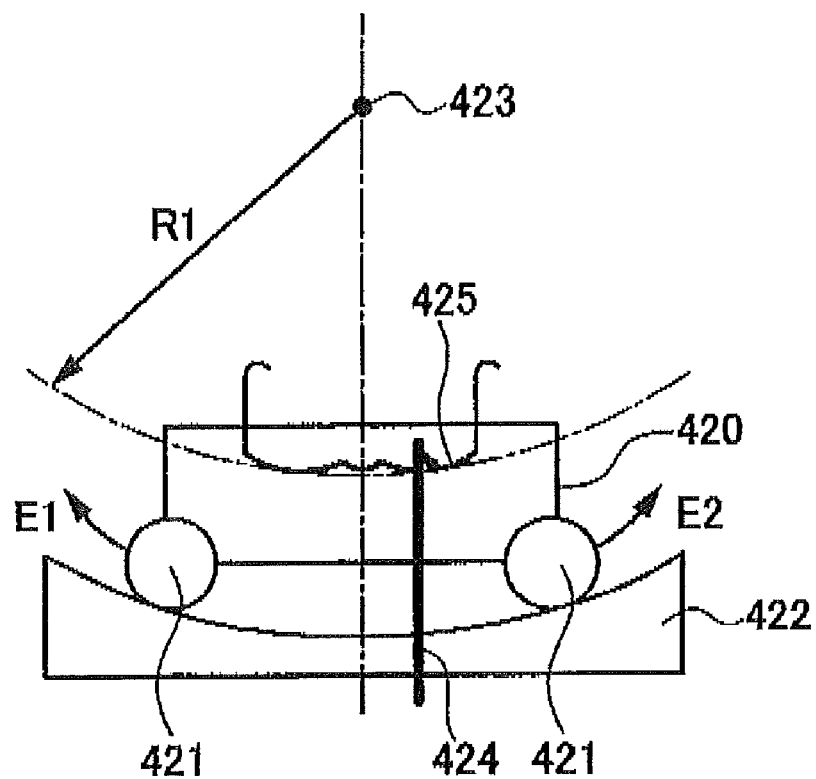
FIGS. 31A and 31B show states where a flame holding section including multiple skids is swung by the skids rolling on a guide rail, FIG. 31A showing a case where the guiderail has a concaved upper surface.
Figure 31B:
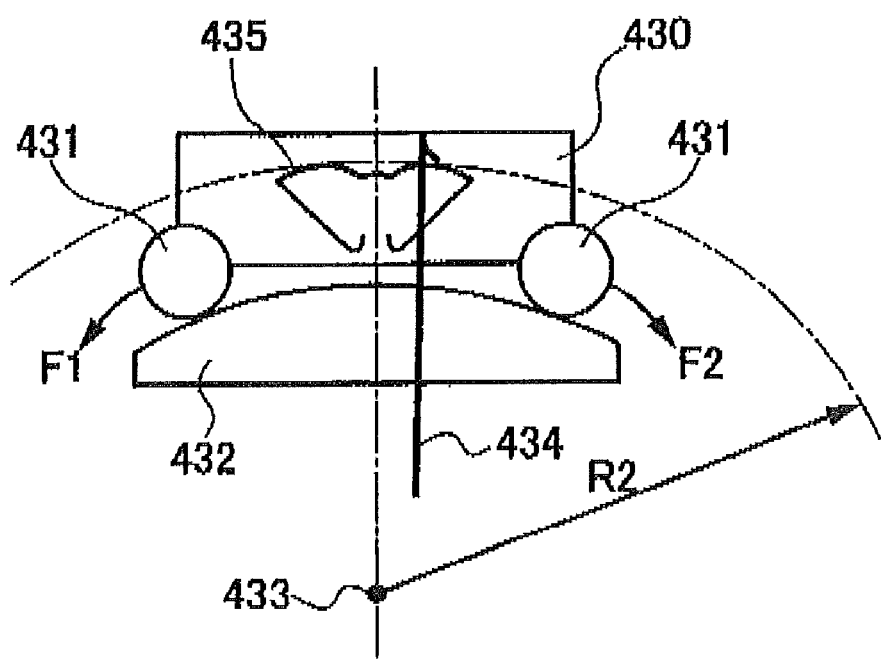
Figure 32:
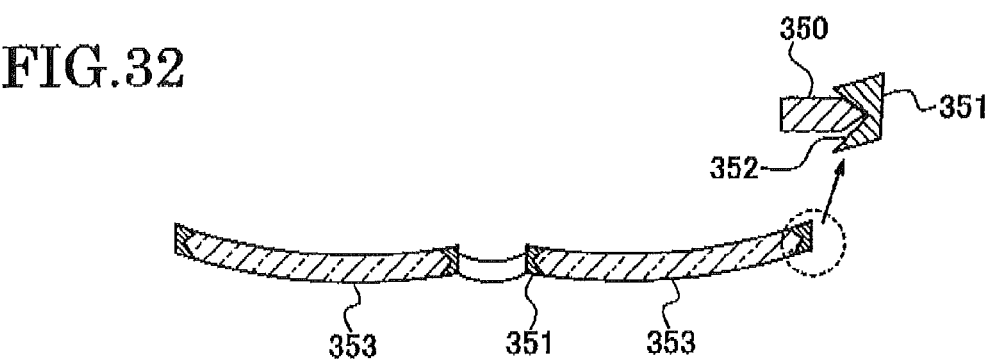
FIG. 32 is a view showing the probe which is fully inserted into a lens setting groove of a frame other than a highly curved frame.
Figure 33:
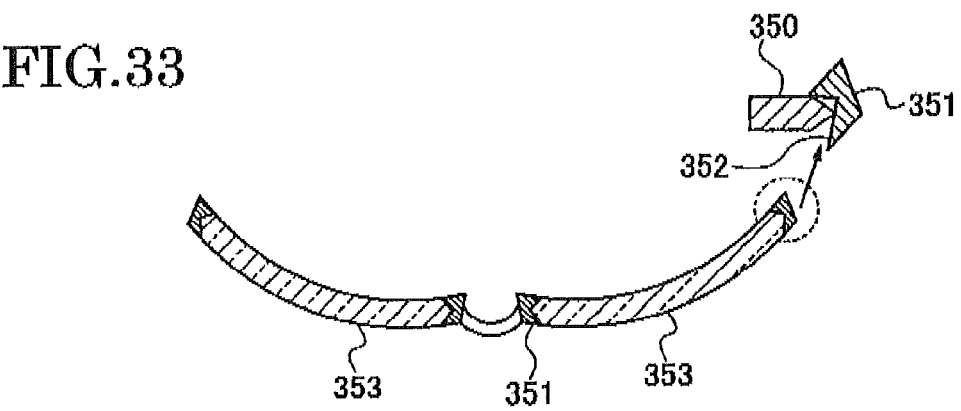
FIG. 33 is a view showing the probe which cannot be fully inserted into the lens setting groove of a highly curved frame.
Figure 34:
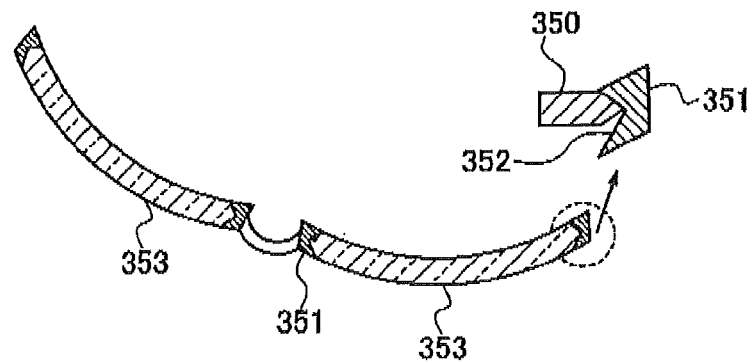
FIG. 34 is a view showing the probe which cannot be fully inserted into the lens setting groove of another highly curved frame.

In FIGS. 31A and 31B, a flame holding section includes multiple skids, and the skids are rolled on a guiderail to swing the frame holding section.

In FIG. 31A, multiple skids 421 are provided for a frame holding section 420 and are configured to roll right and left on a guiderail 422 having a concaved upper surface. The upper surface of the guiderail 422 is formed in an inverted cylindrical shape, thus allowing the frame holding section 420 to swing in directions of arrows E1 and E2 around a virtual axis 423 which is located away from the measuring apparatus body (above the measuring apparatus body).

Here, reference numeral 424 denotes a probe measuring the shape of a spectacle frame 425. The spectacle frame 425 is set within the frame holding section 420 and held at a distance R1 from the virtual axis 423.

In FIG. 31B, multiple skids 431 are provided for a frame holding section 430 and are configured to roll right and left on a guiderail 432 having a convex upper surface. The upper surface of the guiderail 432 is formed in a cylindrical shape, thus allowing the frame holding section 430 to swing in directions of arrows F1 and F2 around a virtual axis 433 which is located away from the measuring apparatus body (below the measuring apparatus body).

Here, reference numeral 434 denotes a probe measuring the shape of a spectacle frame 435. The spectacle frame 435 is set within the frame holding section 430 and held at a distance R2 from the virtual axis 433.

As mentioned above, the holding device swinging mechanism in the spectacle lens frame shape measuring apparatus of the present invention is configured to be provided with a virtual axis serving as a swinging center not within the spectacle lens frame shape measuring apparatus but outside the apparatus.

By the above configuration in which the virtual, axis as the swinging center is provided outside of the spectacle lens frame shape measuring apparatus, a larger swinging radius can be secured than the configuration in which the virtual axis is provided within the spectacle lens frame shape measuring apparatus.

According to the spectacle lens frame shape measuring apparatus of the present invention, the upper holding pins hold the upper rims of the spectacle lens frames at different positions from the positions at which the lower holding pins hold the lower rims of the spectacle lens frames in the right-left direction. Accordingly, if a spectacle frame with a large curved angle (for example, not less than 15 degrees) is held while not inclined, because of the influence of the large curved angle, the difference in height position between the portion held by each upper holding pin and the portion held by the corresponding lower holding pin is significantly increased.

In this spectacle lens frame shape measuring apparatus, since the upper holding pins are set at a same height as the lower holding pins in a vertical direction, the spectacle frame held by the upper and lower holding pins is set while being inclined with respect to a position at which the spectacle frame should be originally set.

If the shape of the lens frames of the spectacle frame is measured with a probe with the spectacle frame being inclined, the result of the measurement includes an axial shift (amount or angle) with respect to the result of measurement for the spectacle frame which is at a normal position without being inclined (a state where the upper holding pins hold the upper rims of the spectacle lens frames at a same position in the right-left direction (assuming that the upper holding pins are provided on extensions of the respective lower holding pins) and at a same height as the lower holding pins hold the lower rims thereof). Accordingly, accurate measurement results may not be obtained.

Swinging the holding device around a predetermined virtual axis by the holding device swing mechanism especially gives a significant effect of the axial shift on the measurement result of the shape of the spectacle lens frames held by the holding pins.

However, in this spectacle lens frame shape measuring apparatus according to the present invention, based on the curved angle of the spectacle lens frames and the inclination angle of the upper or lower rim, the calculation controller calculates the axial shift amount or angle of the spectacle lens frames held by the holding device and properly corrects the shape of the spectacle lens frames obtained by the probe according to the calculated axial shift amount or angle. It is therefore possible to provide highly accurate measurement results of the shape of the spectacle lens frames.

Herein, the inventors of the present invention have found out by research that the axial shift amount or angle $\theta 3$ produced by the aforementioned inclination of the rims was proportional to the curved angle $\theta 1$ of the spectacle lens frames and to the inclination angle $\theta 2$ of the upper or lower rim.

Accordingly, the axial shift amount or angle $\theta 3$ can be quantitatively calculated based on the curved angle $\theta 1$ and inclination angle $\theta 2$.

Figure 40A:
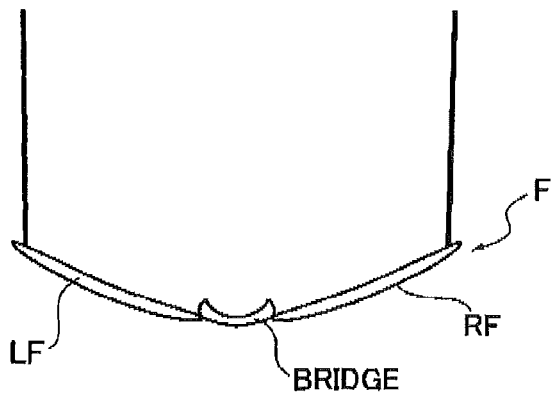
FIGS. 40A, 40B, and 40C are views showing an example of a method of calculating the curved angle of the spectacle frame, FIG. 40A showing a target spectacle frame.
Figure 40B:
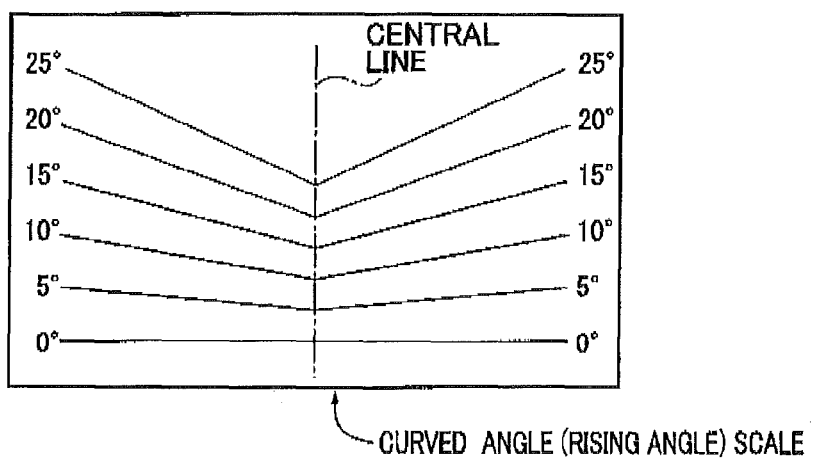
Figure 40C:
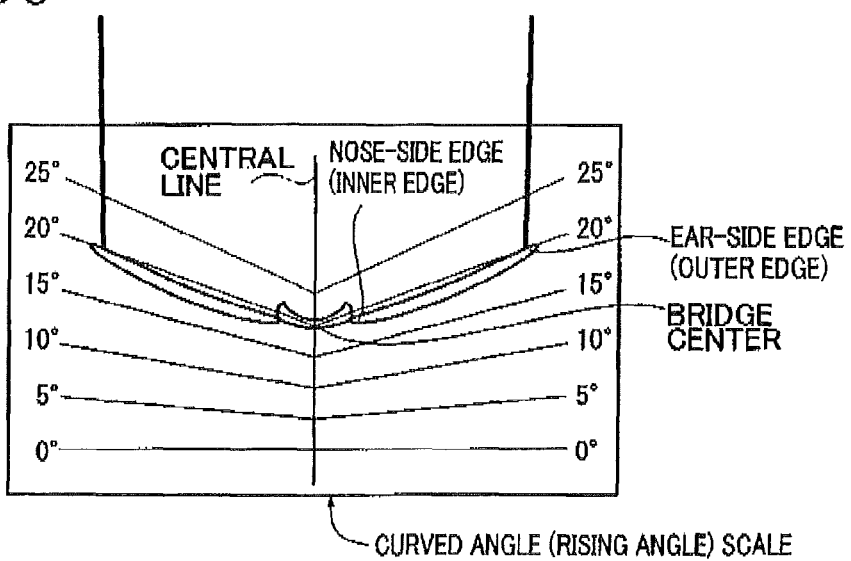
Figure 41A:
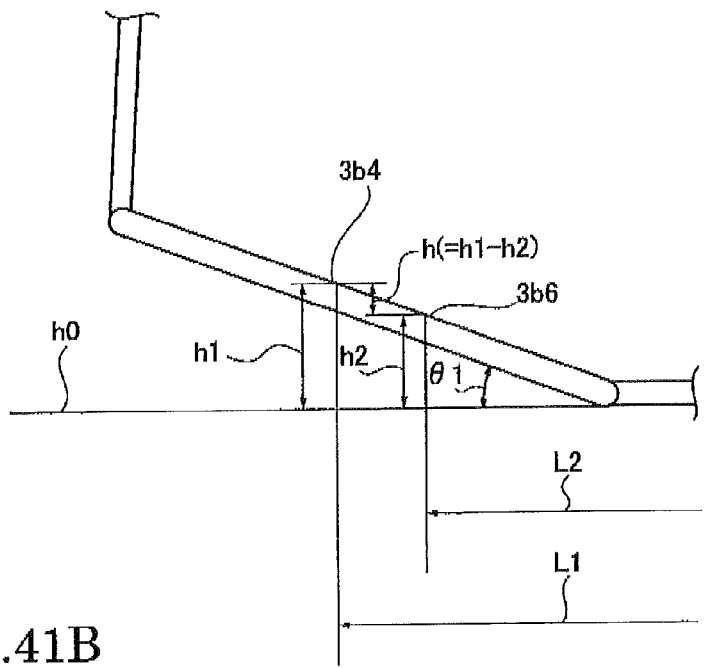
FIG. 41A is a schematic view explaining a correspondence relationship between the curved angle and height of the holding portion held by the holding bars.
Figure 41B:
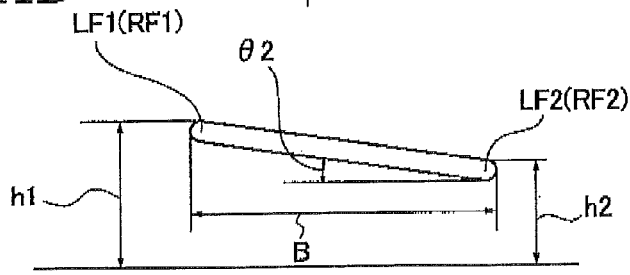
FIG. 41B is a schematic view showing a correspondence relationship between the inclination angle and the height of the holding portion held by the holding bars.

The curved angle $\theta 1$ may be obtained as follows. A spectacle frame F whose curved angle $\theta 1$ is to be examined, as shown in FIG. 40A, is set on a curved angle scale which includes slanted lines at 0°, 5°, 10°, 15°, 20°, and 25°, for example as shown in FIG. 40B so that the center of a bridge of the spectacle frame F way be positioned at the central line indicated on the curved angle scale. One of the slanted lines on which nose side ends (inner ends in the spectacle width direction) and ear side ends of spectacle lens frames RF and LF are both simultaneously positioned is selected (the slanted line at 20° in FIG. 4C), and the value (angle) described corresponding to the selected slanted line is determined as the curved angle θ1.

In the spectacle lens frame shape measuring apparatus according to the present invention, preferably, the calculation controller calculates the inclination angle θ2 of the upper or lower rim by the following formula (1) based on an inclination amount h of the upper or lower rim and a vertical length B of the spectacle lens frames. Moreover, the calculation controller calculates the axial shift amount or angle θ3 by the following formula (2) based on the curved angle θ1 of the spectacle lens frames and the inclination angle θ2 obtained by the formula (1).

$$\theta 2 = \tan^{-1}(h/B) \qquad (1)$$
$$\theta 3 = \alpha \times \theta 1 \times \theta 2$$
$$\quad = \alpha \times \theta 1 \times \tan^{-1}(h/B) \qquad (2)$$

(α is constant)

According to the spectacle lens frame shape measuring apparatus according to the present invention having such a preferred configuration, based on the curved angle θ1, the inclination amount h of the upper or lower rim, and the vertical length B of the spectacle lens frames, the inclination angle θ2 can be obtained by the formula (1) while the axial shift amount or angle θ3 can be obtained by the formula (2).

When the inclination angle θ2 cannot be directly examined, the inclination angle θ2 can be calculated by the formula (1) based on the inclination amount h, which is equal to the height difference (Δh) in FIG. 37A, and the vertical length B of the spectacle lens frames. Moreover, without calculating the inclination angle θ2 itself, the axial shift amount or angle θ3 can be calculated by the formula (2) based on the curved angle θ1, the inclination amount h, the vertical length B of the spectacle lens frames, and a constant α experimentally calculated.

Specific values of the constant α can be calculated by experiments in which specific values are sequentially applied to the curved angle θ1 and inclination angle θ2.

In the spectacle lens frame shape measuring apparatus according to the present invention, preferably, the calculation controller calculates the inclination amount h by the following formula (3) based on the curved angle θ1 and a constant β which corresponds to a difference in holding positions in the spectacle width direction between the upper and lower holding pins. Moreover, the calculation controller calculates the axial shift amount or angle θ3 by the following formula (4) which is obtained by substituting the formula (3) into the formula (2).

$$h=\beta \times \tan \theta 1 \qquad (3)$$

$$\theta 3=\alpha \times \theta 1 \times \tan^{-1}\{(\beta \times \tan \theta 1)/B\} \qquad (4)$$

(β is a constant)

When the inclination amount h cannot be directly examined, the inclination amount h can be calculated by the formula (3) based on the aforementioned curved angle θ1 and the constant β experimentally obtained. Moreover, without calculating the inclination amount h itself or inclination angle θ2 itself, the axial shift amount or angle θ3 can be calculated by the formula (4) based on the curved angle θ1, the vertical length B of the spectacle lens frames, and the constants α and β.

In the spectacle lens frame shape measuring apparatus according to the present invention, preferably, in accordance with the obtained axial shift amount or angle, the calculation controller corrects a distance (FPD) between geometric centers of the spectacle lens frames in the shape of the spectacle lens frames obtained by the probe.

In the spectacle lens frame shape measuring apparatus according to the present invention having the aforementioned preferred configuration, by correcting the distance between the geometric centers of the spectacle lens frames according to the axial shift amount or angle for calculation of an accurate value, it is possible to increase the accuracy of the other measurement results on the shape of the spectacle lens frames based on the obtained accurate distance between the geometric centers of the spectacle lens frames.

At correcting the measurement results of the shape of the spectacle lens frames obtained by measurement using the axial shift amount or angle obtained by the spectacle lens frame shape measuring apparatus according to the present invention, the target of correction is not limited to the above-described distance between the geometric centers of the spectacle lens frames and may include other various data necessary for spectacle lens processing.

Such various data includes an inset amount which is a distance between the geometric center of each spectacle lens frame and the center of the corresponding spectacle wearer's pupil, UP and DOWN values each of which is a distance in a vertical direction between a line connecting the geometric centers of the spectacle lens frames and the right or left pupil center, and a distance between the right or left pupil center and the corresponding lower rim.

According to the spectacle lens frame shape measuring apparatus according to the present invention, the spectacle lens frame is stably held by upper and lower holding pins provided at different positions in the right-left direction. Moreover, even if the shape of the spectacle lens frame calculated after the measurement includes the axial shift amount or angle θ3, the processing data necessary for spectacle processing including the distance FPD between geometrical centers of the right and left spectacle lens frames can be corrected. It is therefore possible to grind a spectacle lens having such high accuracy as to be fit to the spectacle lens frame.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A spectacle lens frame shape measuring apparatus, comprising:
a holding device including upper holding pins and lower holding pins respectively holding upper rims and lower rims of spectacle lens frames, the upper holding pins holding the spectacle lens frames at different positions in a right-left direction from the positions at which the lower holding pins hold the spectacle lens frames and being placed at a same height as the lower holding pins in a vertical direction;
a probe brought into contact with lens fitting grooves of the spectacle lens frames held by the holding device and configured to detect a shape of the spectacle lens frame;
a holding device swinging mechanism swinging the holding device around a predetermined virtual axis; and
a calculation controller configured to receive a detected result of the probe, the calculation controller being configured to calculate an axial shift amount or angle of the spectacle lens frames held by the holding device on the basis of a curved angle of the spectacle lens frames and an inclination angle of any one of the upper and lower rims, and correct the shape of the spectacle lens frames obtained by the probe in accordance with the calculated axial shift amount or angle by the calculation controller.

2. The spectacle lens frame shape measuring apparatus according to claim 1, wherein
in accordance with the calculated axial shift amount or angle, the calculation controller corrects a distance (FPD) between geometric centers of the spectacle lens frames in the shape of the spectacle lens frames obtained by the probe.

3. A spectacle lens frame shape measuring apparatus comprising:
a holding device including upper holding pins and lower holding pins respectively holding upper rims and lower rims of spectacle lens frames, the upper holding pins holding the spectacle lens frames at different positions in a right-left direction from the positions at which the lower holding pins hold the spectacle lens frames and being placed at a same height as the lower holding pins in a vertical direction;
a probe brought into contact with lens fitting grooves of the spectacle lens frames held by the holding device;
a holding device swinging mechanism swinging the holding device around a predetermined virtual axis; and
a calculation controller calculating an axial shift amount or angle of the spectacle lens frames held by the holding device on the basis of a curved angle of the spectacle lens frames and an inclination angle of any one of the upper and lower rims, and correct the shape of the spectacle lens frames obtained by the probe in accordance with the calculated axial shift amount or angle;
wherein the calculation controller calculates the inclination angle $\theta 2$ of any one of the upper and lower rims by the following formula (1) on the basis of an inclination amount h of the one of the upper and lower rims and a vertical length B of the spectacle lens frames, and calculates the axial shift amount or angle $\theta 3$ by the following formula (2) on the basis of the curved angle $\theta 1$ of the spectacle lens frames and the inclination angle $\theta 2$, which is obtained by the formula (1):

$$\theta 2 = \tan^{-1}(h/B) \tag{1}$$

$$\theta 3 = \alpha \times \theta 1 \times \theta 2$$
$$= \alpha \times \theta 1 \times \tan^{-1}(h/B) \tag{2}$$

where $\alpha$ is a constant.

4. The spectacle lens frame shape measuring apparatus according to claim 3, wherein
the calculation controller calculates the inclination amount h on the basis of a constant $\beta$ corresponding to a difference in holding positions in the right-left direction between the upper and lower holding pins by the following formula (3), and calculates the axial shift amount or angle $\theta 3$ by the following formula (4) which is obtained by substituting the formula (3) into the formula (2):

$$h = \beta \times \tan\theta 1 \tag{3}$$

$$\theta 3 = \alpha \times \theta 1 \times \tan^{-1}\{(\beta \times \tan\theta 1)/B\} \tag{4}$$

where $\beta$ is a constant.

5. The spectacle lens frame shape measuring apparatus according to claim 4, wherein
in accordance with the calculated axial shift amount or angle, the calculation controller corrects a distance (FPD) between geometric centers of the spectacle lens frames in the shape of the spectacle lens frames obtained by the probe.

6. The spectacle lens frame shape measuring apparatus according to claim 3, wherein
in accordance with the calculated axial shift amount or angle, the calculation controller corrects a distance (FPD) between geometric centers of the spectacle lens frames in the shape of the spectacle lens frames obtained by the probe.

* * * * *